(12) United States Patent
Skibak et al.

(10) Patent No.: US 7,589,729 B2
(45) Date of Patent: Sep. 15, 2009

(54) IMAGE SYNTHESIS BY RANK-1 LATTICES

(75) Inventors: Sabrina Skibak, Ulm (DE); Alexander Keller, Ulm (DE)

(73) Assignee: Mental Images GmbH, Berlin (DE)

( * ) Notice: Subject to any disclaimer, the term of this patent is extended or adjusted under 35 U.S.C. 154(b) by 319 days.

(21) Appl. No.: 11/474,091

(22) Filed: Jun. 23, 2006

(65) Prior Publication Data

US 2007/0109320 A1    May 17, 2007

Related U.S. Application Data

(63) Continuation-in-part of application No. 10/439,311, filed on May 15, 2003.

(60) Provisional application No. 60/693,232, filed on Jun. 23, 2005, provisional application No. 60/378,115, filed on May 15, 2002.

(51) Int. Cl.
*G09G 5/00* (2006.01)
*H04N 11/46* (2006.01)
*H04N 1/40* (2006.01)
*G06K 9/40* (2006.01)
*G06K 9/32* (2006.01)
*G06F 7/38* (2006.01)
*G06F 17/00* (2006.01)

(52) U.S. Cl. .............. 345/441; 345/581; 345/586; 345/611; 345/643; 382/254; 382/274; 382/300; 382/260; 358/525; 358/448; 708/207; 708/290; 708/318; 708/444

(58) Field of Classification Search .......... 345/611, 345/421, 426, 428, 581, 586, 589, 606, 612, 345/618, 619, 643, 644, 639, 629; 382/282, 382/284, 298, 300, 254, 266, 269, 260, 274, 382/276; 358/540, 450, 538, 525, 452–453, 358/448, 532, 447; 348/36; 708/200, 206–209, 708/270, 274, 290, 300, 318, 444, 490, 622, 708/819
See application file for complete search history.

(56) References Cited

U.S. PATENT DOCUMENTS

| 4,973,111 | A | 11/1990 | Haacke |
| 6,911,976 | B2 | 6/2005 | Abramov |
| 7,006,110 | B2 | 2/2006 | Crisu |
| 7,085,435 | B2 * | 8/2006 | Takiguchi et al. ........... 382/294 |
| 2002/0126129 | A1 | 9/2002 | Snyder |
| 2003/0063082 | A1 | 4/2003 | Abramov |
| 2005/0063596 | A1 * | 3/2005 | Yomdin et al. ............. 382/232 |
| 2005/0232511 | A1 * | 10/2005 | Ziou et al. .................. 382/276 |
| 2005/0264564 | A1 | 12/2005 | Keller |
| 2005/0264565 | A1 | 12/2005 | Keller |

(Continued)

*Primary Examiner*—Wesner Sajous
(74) *Attorney, Agent, or Firm*—Jacobs & Kim LLP; David Jacobs

(57) ABSTRACT

Systems and techniques are described in which rank-1 lattices are used in computerized image processing, in particular in the context of image synthesis. These include systems and techniques for selection of rank-1 lattices, rasterization on rank-1 lattices, anti-aliasing by rank-1 lattices, and adaptive refinement and filtering by rank-1 lattices.

18 Claims, 26 Drawing Sheets

U.S. PATENT DOCUMENTS

| | | |
|---|---|---|
| 2005/0264568 A1 | 12/2005 | Keller |
| 2005/0275652 A1 | 12/2005 | Keller |
| 2005/0275660 A1 | 12/2005 | Keller |
| 2005/0275663 A1 | 12/2005 | Kokojima |
| 2005/0278406 A1 | 12/2005 | Keller |
| 2006/0062487 A1* | 3/2006 | Ouchi ........................ 382/284 |
| 2006/0188175 A1* | 8/2006 | Takiguchi et al. ........... 382/284 |
| 2007/0046686 A1* | 3/2007 | Keller ........................ 345/581 |
| 2007/0109320 A1 | 5/2007 | Skibak |
| 2007/0127101 A1* | 6/2007 | Oldroyd ...................... 359/24 |
| 2007/0271322 A1 | 11/2007 | Keller |

* cited by examiner

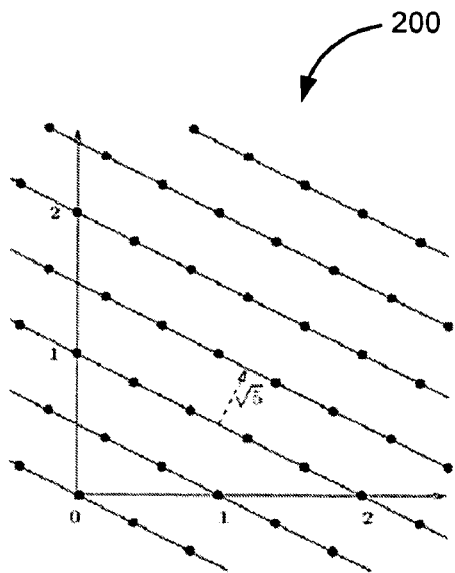
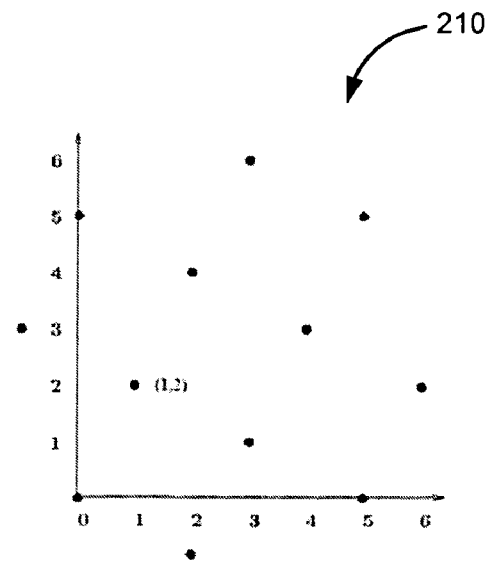
FIG. 3A    FIG. 3B
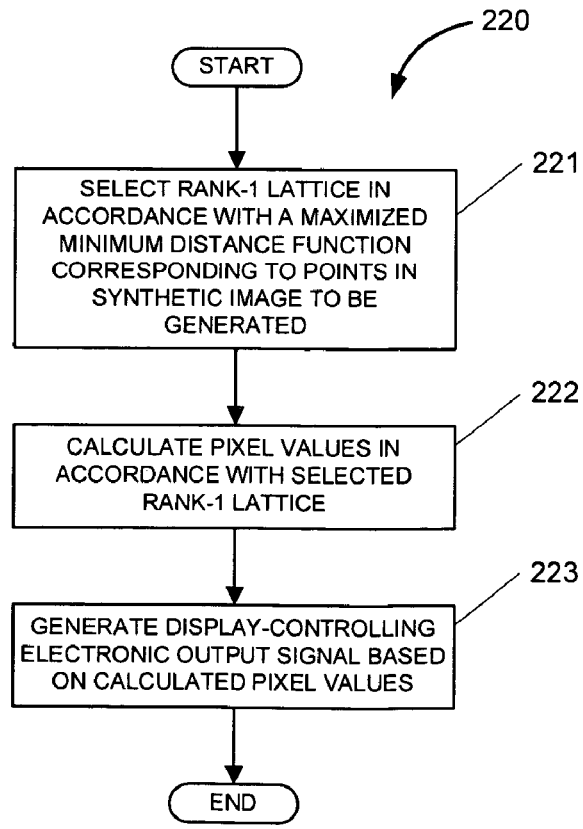
FIG. 4

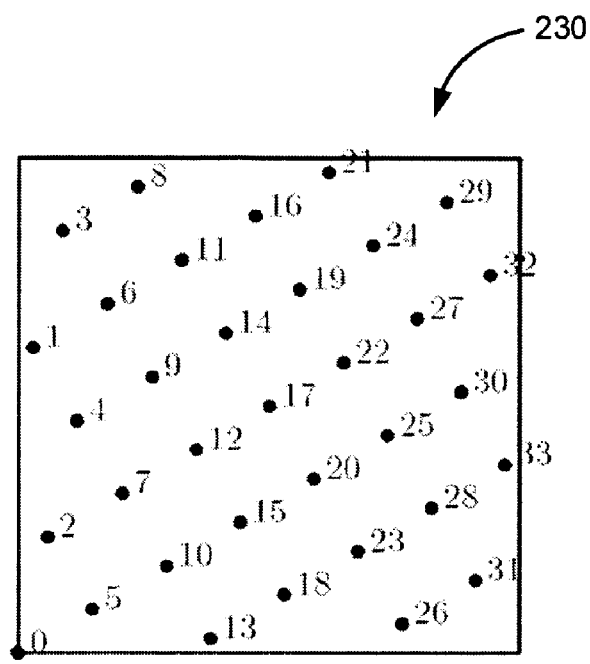
FIG. 5
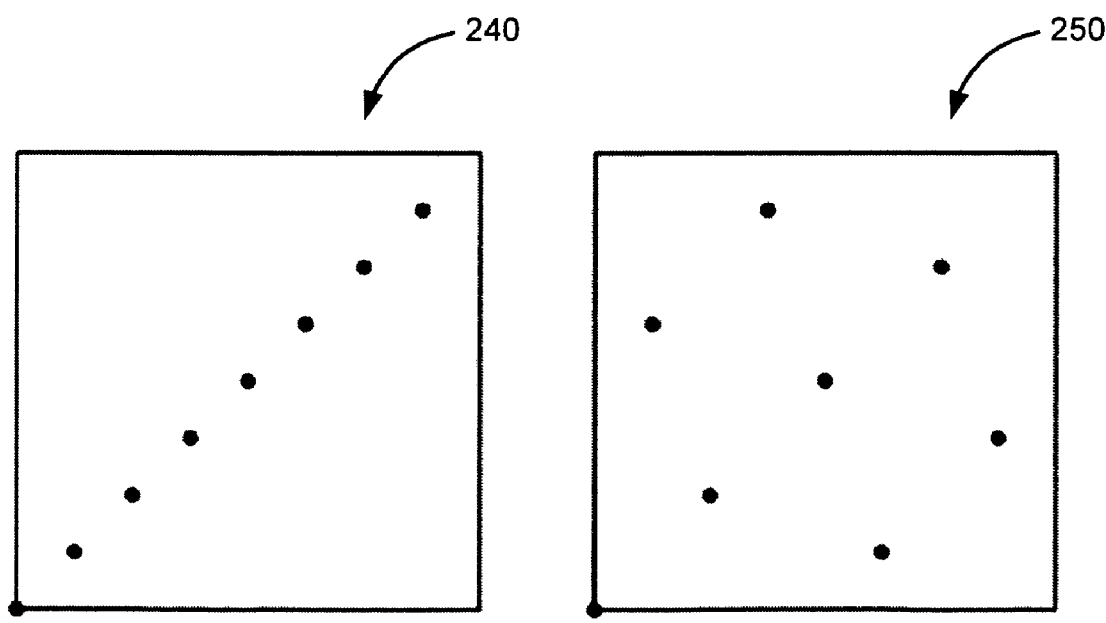
FIG. 6A  FIG. 6B

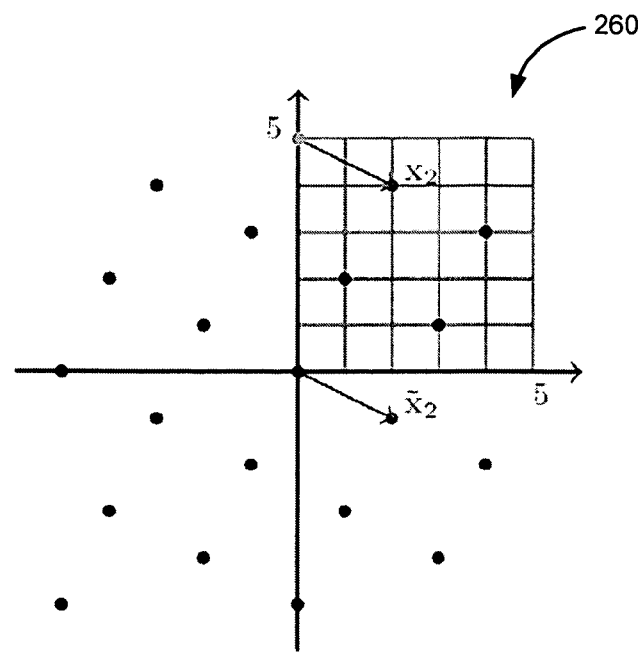
FIG. 7
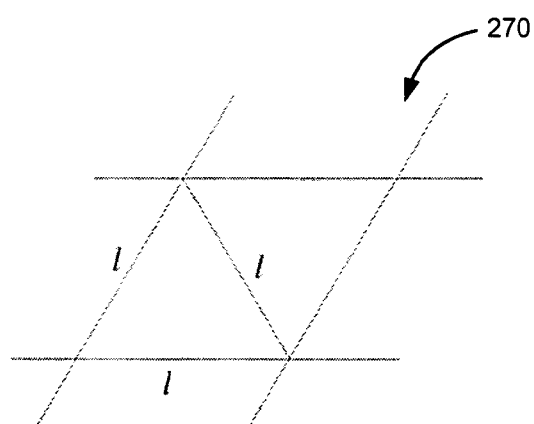
FIG. 8A
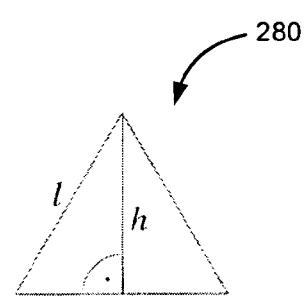
FIG. 8B
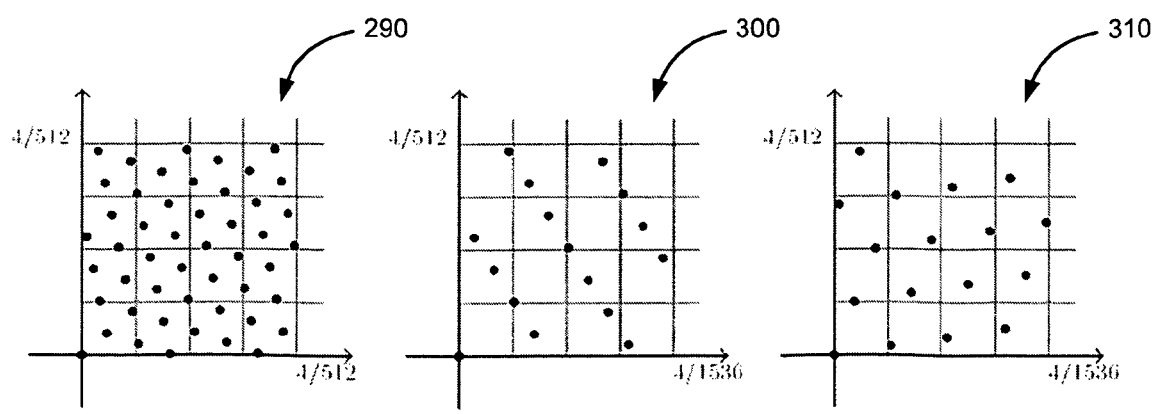
FIG. 9A  FIG. 9B  FIG. 9C

FIG. 10A      FIG. 10B

| $n$ | Resolution | $a$ | Set of shifts $\{(s_x, s_y)\}$ |
|---|---|---|---|
| 16 | 4 × 4 | 3 | {(3,0),(2,1),(1,2),(0,3)} |
|  |  | 5 | {(0,0),(1,1),(2,2),(3,3)} |
| 25 | 5 × 5 | 7 | {(1,0),(4,1),(2,2),(0,3),(3,4)} |
| 36 | 6 × 6 | 5 | {(5,0),(4,1),(3,2),(2,3),(1,4),(0,5)} |
|  |  | 7 | {(0,0),(1,1),(2,2),(3,3),(4,4),(5,5)} |
| 64 | 8 × 8 | 19 | {(1,0),(4,1),(7,2),(2,3),(5,4),(0,5),(3,6),(6,7)} |
|  |  | 27 | {(5,0),(0,1),(3,2),(6,3),(1,4),(4,5),(7,6),(2,7)} |
| 324 | 9 × 9 | 95 | {(14,0),(32,0),(7,1),(25,1),...,(21,35)} |
|  |  | 133 | {(15,0),(33,0),(10,1),(28,1),...,(20,35)} |

| $n$ | Resolution | $a$ | Set of shifts $\{(s_x, s_y)\}$ |
|---|---|---|---|
| 16384 | 128 × 128 | 2193 | {(120,0),....} |
| 65536 | 128 × 128 | 2565 | {(230,0),(486,0),....} |
| 65536 | 256 × 256 | 2565 | {(230,0),(179,1),....} |
| 262144 | 256 × 256 | 37303 | {(259,0),(771,0),....} |
| 262144 | 512 × 512 | 37303 | {(259,0),(266,1),....} |
| 1048576 | 512 × 512 | 10235 | {(921,0),(1945,0),....} |
| 4194304 | 1024 × 1024 | 182183 | {(1035,0),(3083,0),...} |

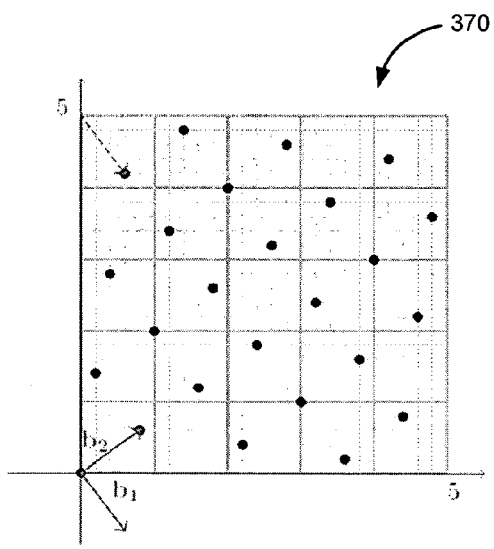
FIG. 14
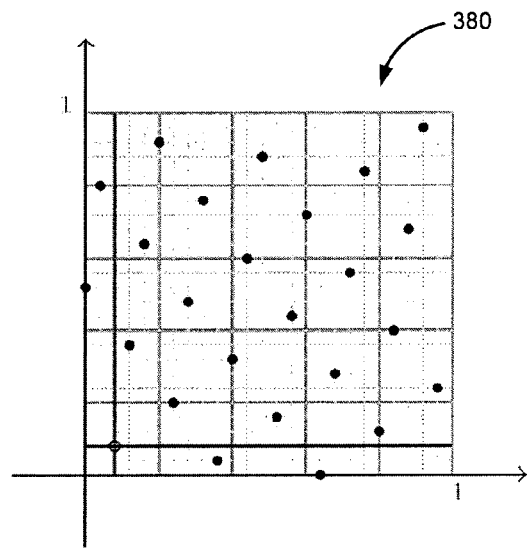
FIG. 15
| $b$ | $u = b^2$ | $a$ | Shift |
|---|---|---|---|
| 2 | 4 | 1 | (1, 0) |
| 3 | 9 | 2 | (1, 1) |
| 7 | 49 | 6 | (5, 1) |
| 11 | 121 | 36 | (5, 5) |
| 13 | 169 | 70 | (6, 6) |
| 17 | 289 | 80 | (2, 4) |
| 19 | 361 | 100 | (14, 15) |
| 23 | 529 | 120 | (0, 2) |
| 29 | 841 | 150 | (7, 8) |
| 31 | 961 | 210 | (7, 9) |
FIG. 16

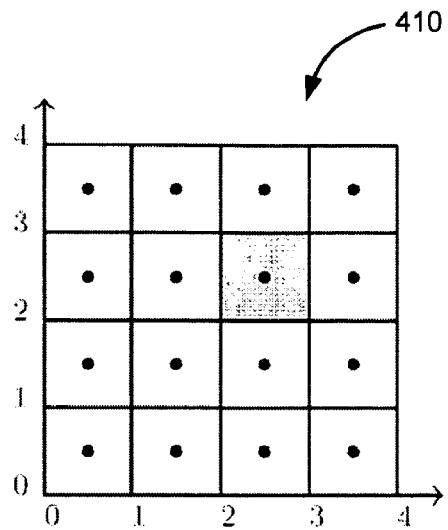
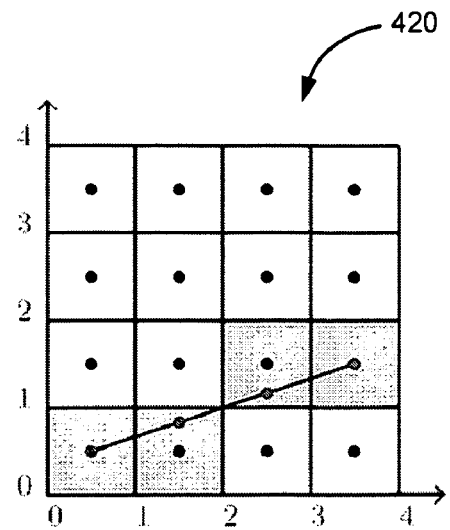
FIG. 18A                    FIG. 18B
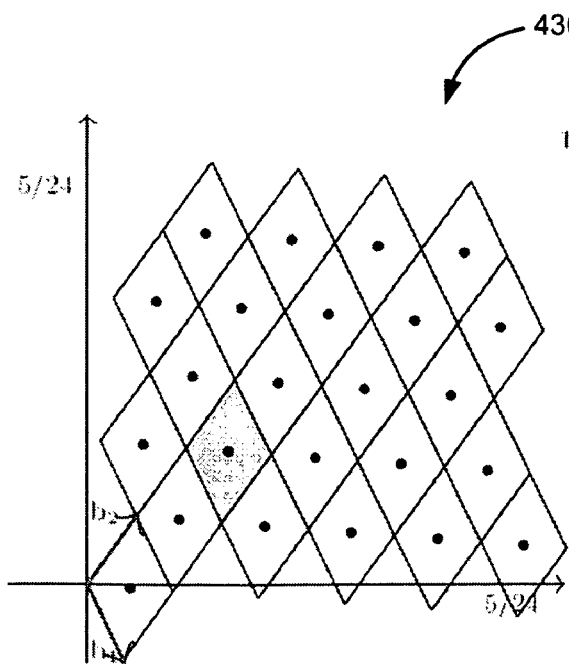
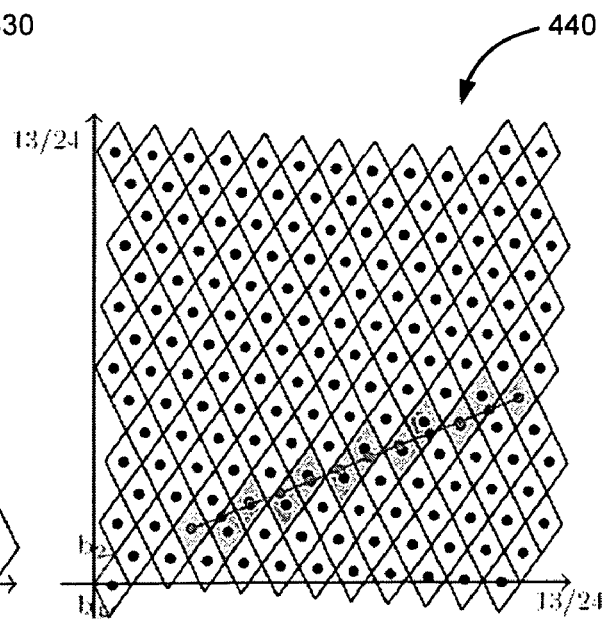
FIG. 19A                    FIG. 19B

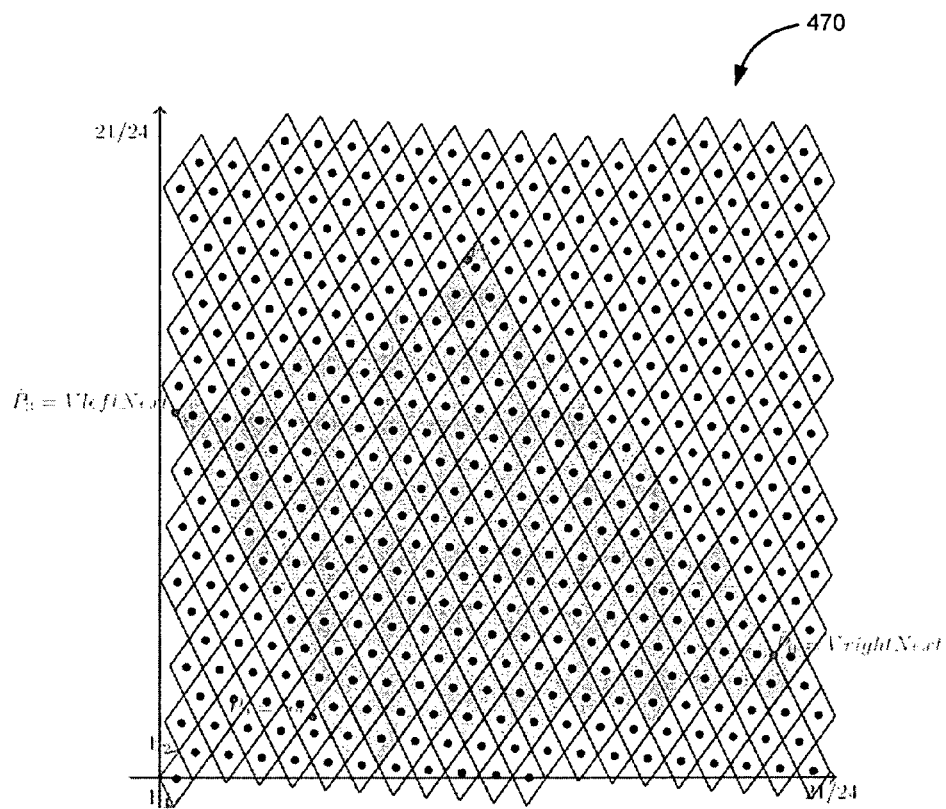
FIG. 22
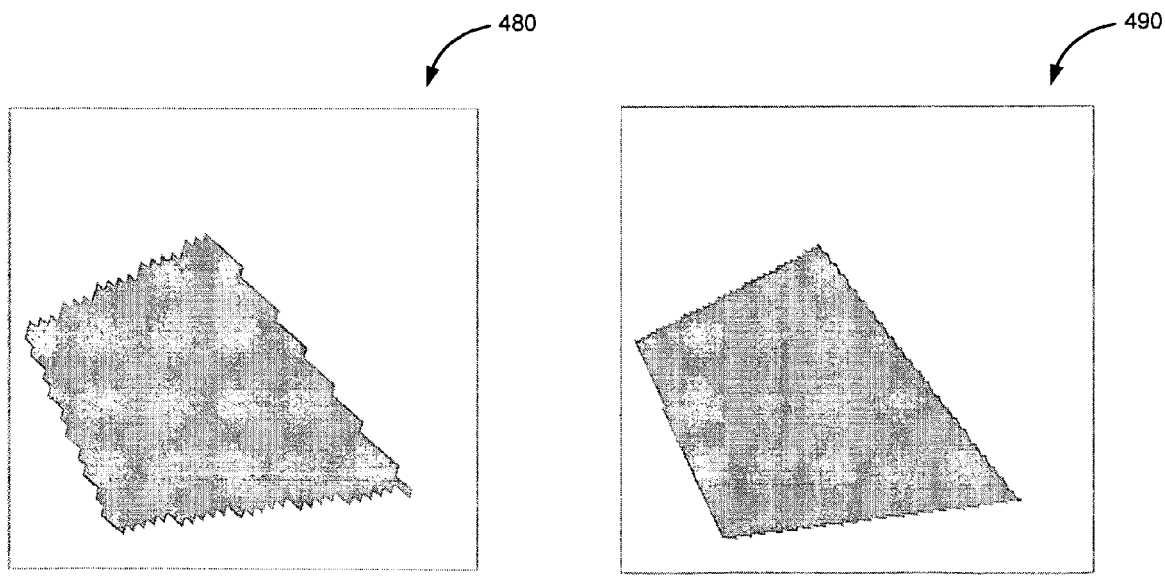
FIG. 23A  FIG. 23B

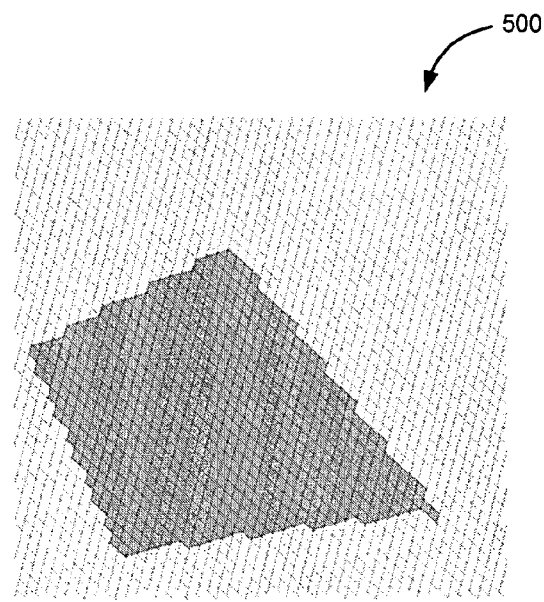
FIG. 24
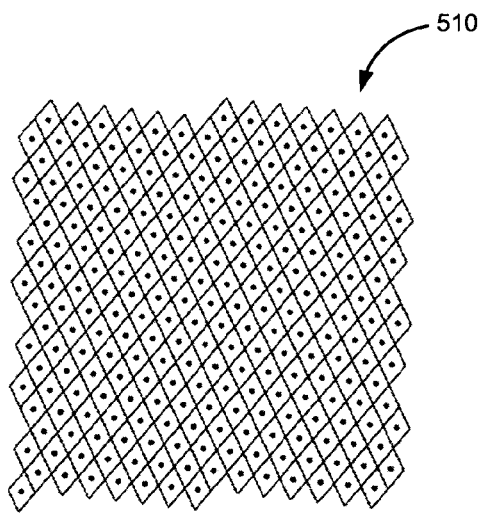
FIG. 25
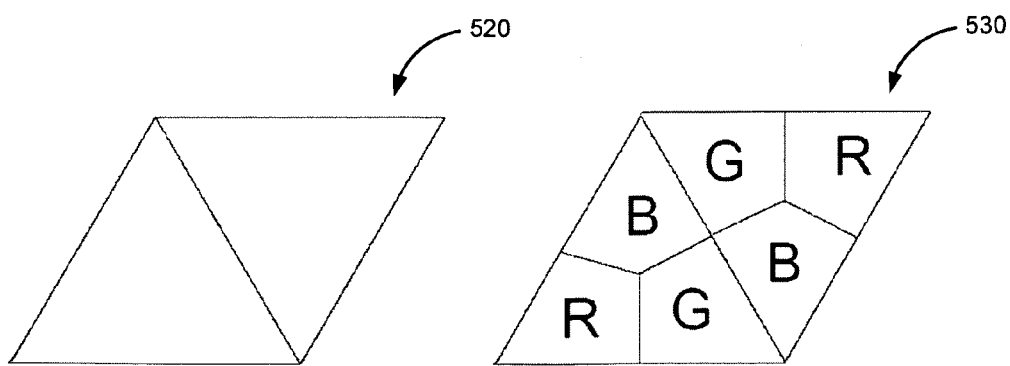
FIG. 26A          FIG. 26B

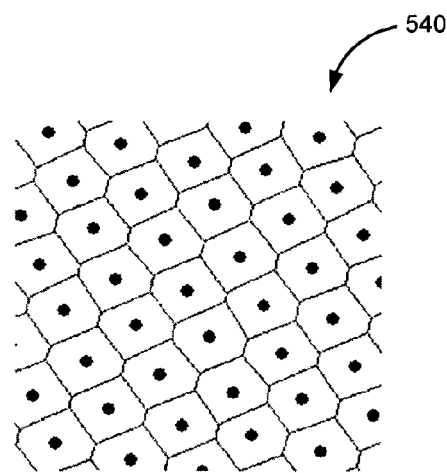
FIG. 27
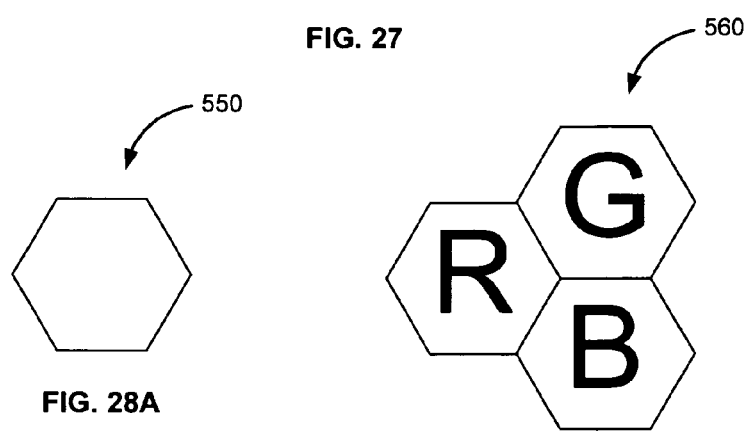
FIG. 28A  FIG. 28B
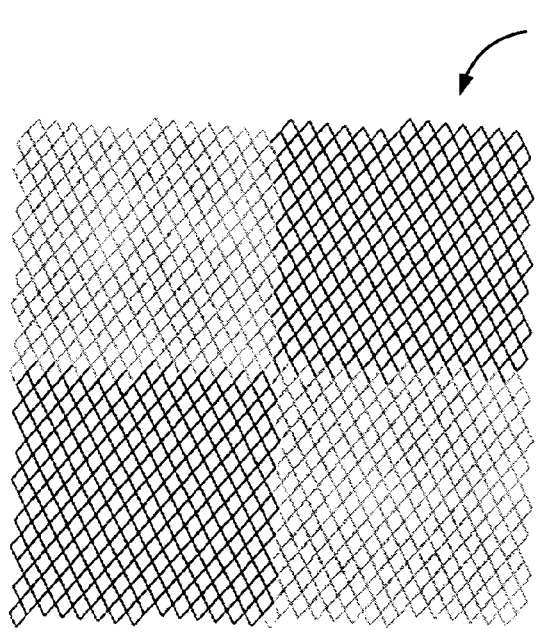 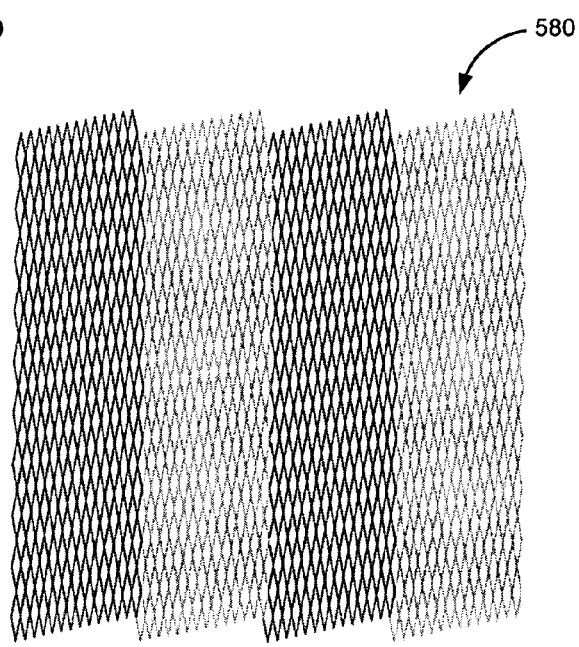
FIG. 29A  FIG. 29B

| n | $2^n$ | a | size |
|---|---|---|---|
| 2 | 4 | 1 | 2 × 2 |
| 3 | 8 | 3 | 2 × 4 |
| 4 | 16 | {3, 5} | 4 × 4 |
| 5 | 32 | 7 | 4 × 8 |
| 6 | 64 | {19, 27} | 8 × 8 |
| 7 | 128 | 9 | 8 × 16 |
| 8 | 256 | {71, 119} | 16 × 16 |
| 9 | 512 | 79 | 16 × 32 |
| 10 | 1024 | {271, 495} | 32 × 32 |
| 11 | 2048 | 41 | 32 × 64 |
| 12 | 4096 | {671, 1697} | 64 × 64 |
| 13 | 8192 | 3631 | 64 × 128 |
| 14 | 16384 | {1635, 6201} | 128 × 128 |
| 15 | 32768 | 1839 | 128 × 256 |
| 16 | 65536 | {23679, 25471} | 256 × 256 |
| 17 | 131072 | 50361 | 256 × 512 |
| 18 | 262144 | {549, 112211} | 512 × 512 |
| 19 | 524288 | 68473 | 512 × 1024 |
| 20 | 1048576 | {33819, 312449} | 1024 × 1024 |

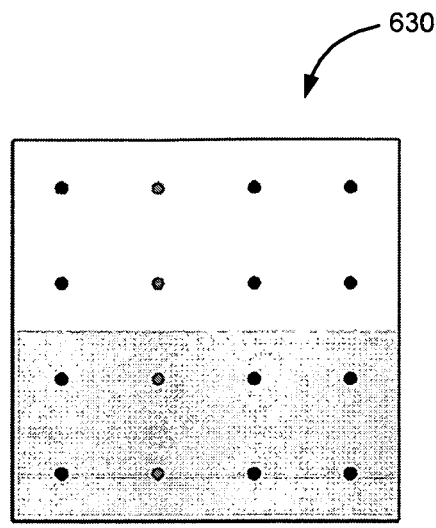
FIG. 34
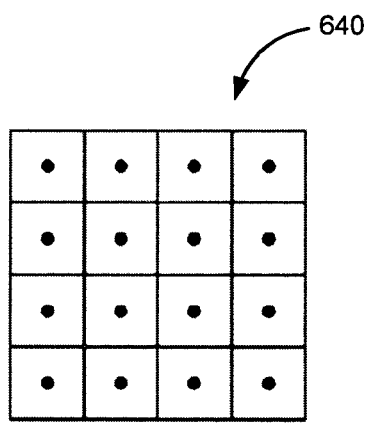
FIG. 35A
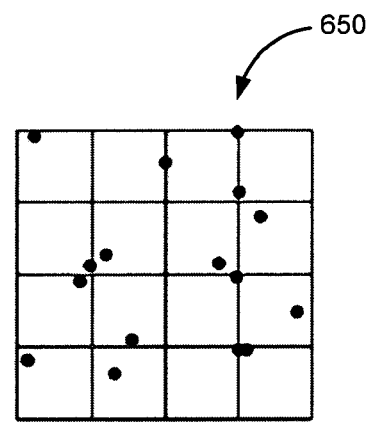
FIG. 35B
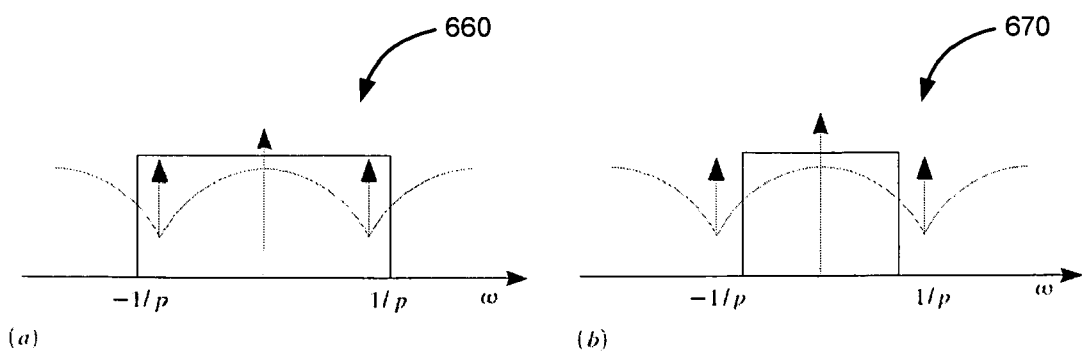
FIG. 36A　　　　　　　　FIG. 36B

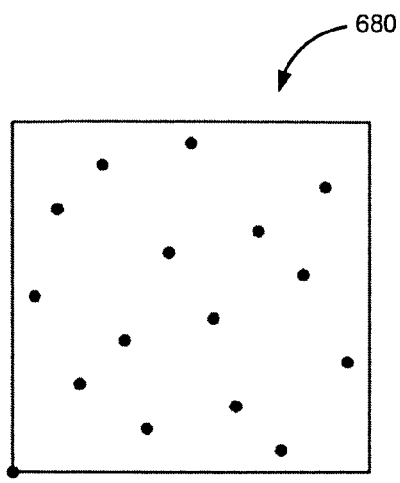
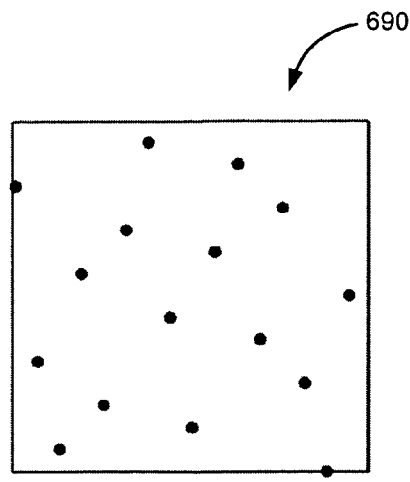
FIG. 37A  FIG. 37B
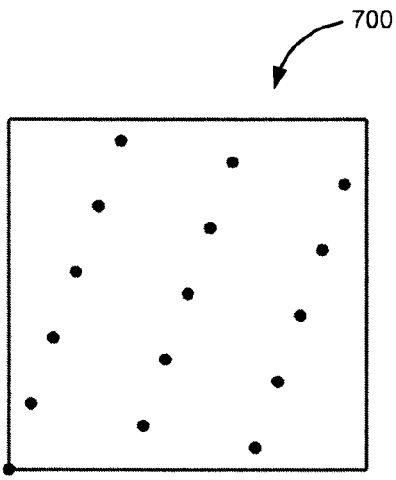
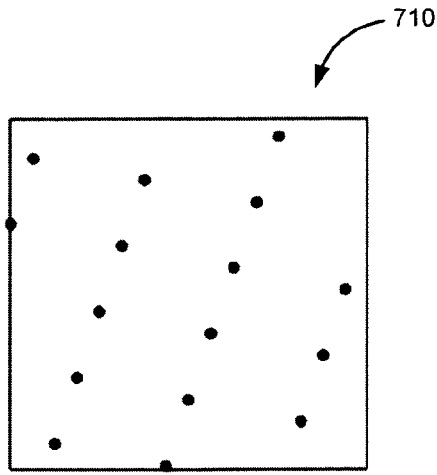
FIG. 38A  FIG. 38B
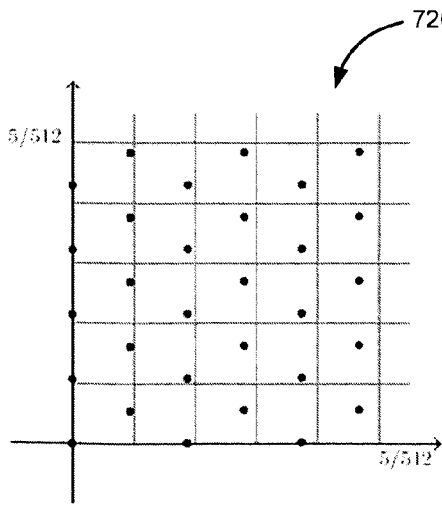
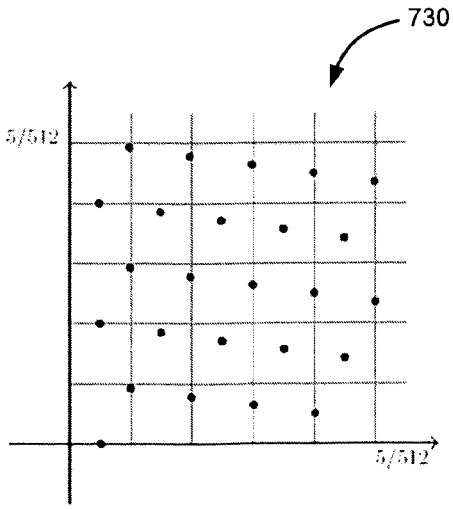
FIG. 39A  FIG. 39B

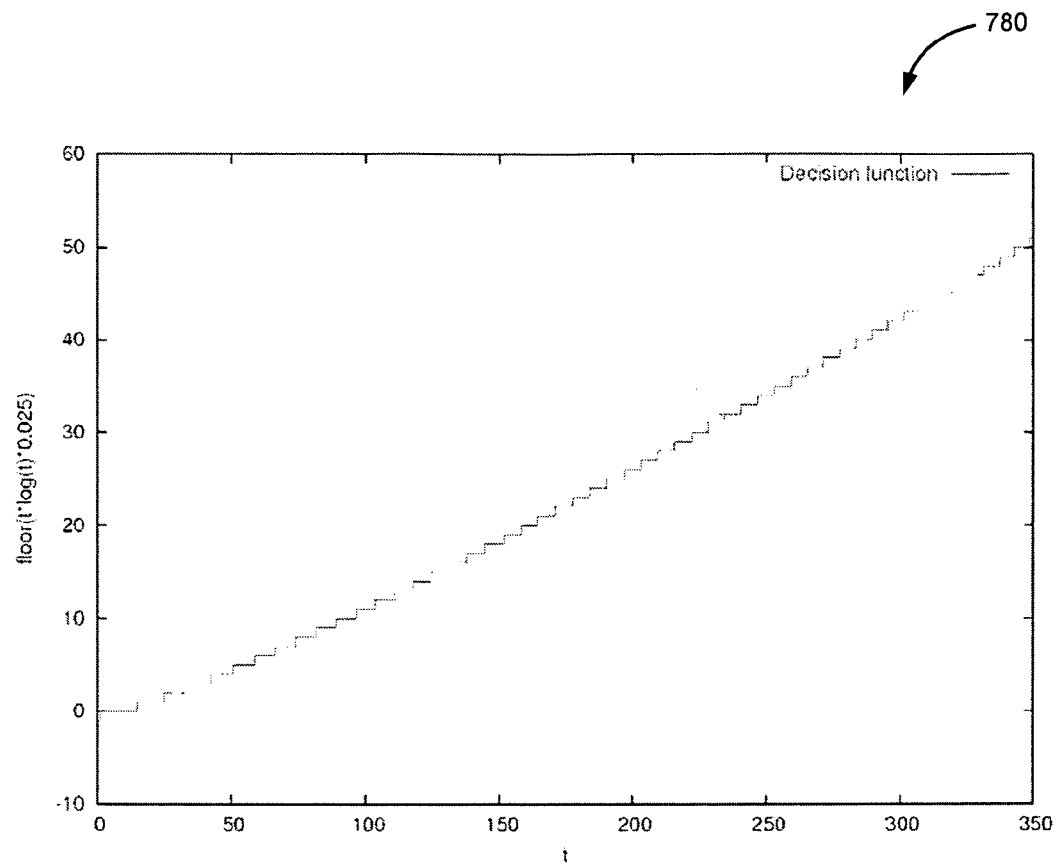
FIG. 44
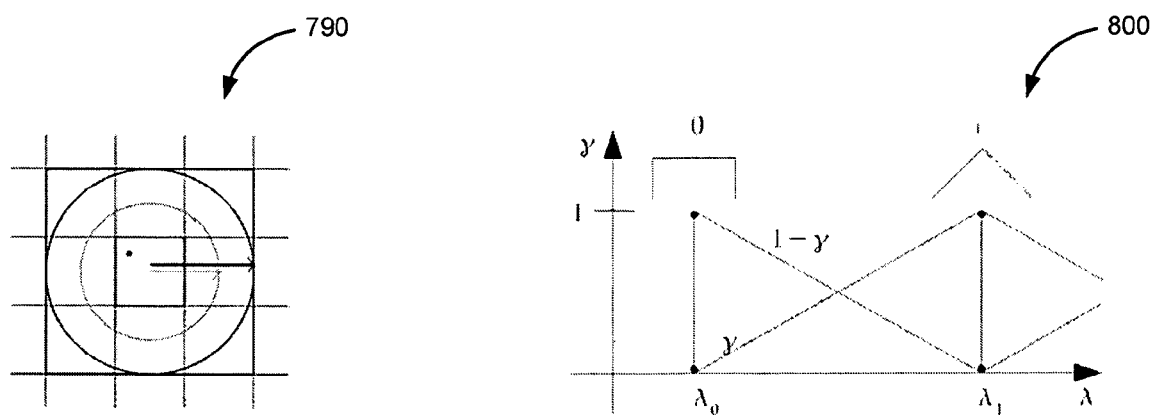
FIG. 45
FIG. 46

IMAGE SYNTHESIS BY RANK-1 LATTICES

CROSS-REFERENCE TO RELATED APPLICATIONS

The present application is a Continuation-in-Part of pending U.S. Patent Application Ser. No. 10/439,311 filed May 15, 2003 entitled "System and Computer-Implemented Method for Evaluating Integrals Using Stratification by Rank-1 Lattices", which claims priority from U.S. Provisional Application Ser. No. 60/378,115 filed May 15, 2002, each incorporated by reference herein in its entirety.

The present application claims the benefit of U.S. Provisional Patent Application Ser. No. 60/693,232, filed on Jun. 23, 2005, which is hereby incorporated by reference in its entirety.

REFERENCE TO COMPUTER PROGRAM APPENDIX

Submitted herewith is a source code listing, which is incorporated herein in its entirety. The source code listing is referred to herein as the "Appendix," and is organized into sections identified by a reference number in the format "1.1.1" or "1.1.1.1."

BACKGROUND OF THE INVENTION

1. Field of the Invention

The present invention relates generally to methods and systems for image synthesis in and by digital computing systems, such as for motion pictures and other applications, and in particular, relates to methods, systems, devices, computer software, and display technology for image synthesis by rank-1 lattices.

2. Description of Prior Art

The use of synthetic images has become increasingly important and widespread in motion pictures and other commercial and scientific applications. A synthetic image typically represents a two-dimensional array of digital values, called picture elements or pixels, and thus is commonly regarded as a two-dimensional function.

Image synthesis is the process of creating synthetic images from scenes. As a general matter, digital images are generated by rasterization or, in the case of photorealistic images of three-dimensional scenes, by ray tracing. Both approaches aim at determining the appropriate color for each pixel by projecting the original function into the pixel basis. Due to the discrete representation of the original function, the problem of aliasing arises, as described below.

In particular, computing the intensity of a single pixel requires an integration function over the pixel area. This integral is often highly complex and cannot be solved analytically, thus requiring numerical methods for solution, which may include Monte Carlo and quasi-Monte Carlo methods. However, typical numerical methods used in such applications have their own limitations and attendant problems.

Another computational approach used in computer graphics is lattice theory. For example, the accumulation buffer typically used in computer graphics exploits the structure of regular grids. In addition, efficient rasterization techniques have been designed by taking advantage of such grids. Certain known sampling techniques employ Fibonacci lattices, which are a type of rank-1 lattice.

It would be desirable to provide methods, systems, devices, and computer software using rank-1 lattices that can be generated rapidly and efficiently, and that are readily adapted to the requirements of image synthesis and other computer graphics applications.

It would also be desirable to provide such methods, systems, devices and software that enable the efficient application of rank-1 lattices to anti-aliasing, rasterization, and other computer graphics functions.

SUMMARY OF THE INVENTION

Aspects of present invention provide a number of techniques in which rank-1 lattices are used in computerized image processing, in particular in the context of image synthesis.

A first aspect of the invention is directed to techniques used to select rank-1 lattices for use in image synthesis. A number of lattice selection techniques are described, including techniques for searching Korobov lattices in two dimensions by maximized minimum distance, thereby achieving maximum uniformity in the sense of (M, µ)-uniform point sets, which is used in quasi-Monte-Carlo theory. Further described are techniques for searching the lattice basis, and analyzing the relation of shifted rank-1 lattices to (t, m, s)-nets.

Another aspect of the invention provides a technique for structuring an image pixel layout using rank-1 lattices, and using the pixel layout as the basis of a rasterization scheme. The described rasterization scheme may be implemented using traditional raster displays. In addition, there is described herein a new display technology based on the rasterization scheme that directly takes advantage of the structure of rank-1 lattices.

A further aspect of the invention provides a technique for anti-aliasing by rank-1 lattices, in which maximum minimum distance lattices are compared with respect to their convergence to other Monte Carlo and quasi-Monte Carlo point sets. The problem of aliasing varies from pixel to pixel. Thus, the described aspect of the invention includes a technique for adaptive refinement by rank-1 lattices. Further described is a scheme for depth adaptive filtering in a ray tracing environment.

BRIEF DESCRIPTION OF THE DRAWINGS

FIGS. 3A and 3B are a pair of graphs respectively illustrating a Fibonacci lattice and its dual lattice.

FIG. 4 is a flowchart illustrating an overall method in accordance with a first aspect of the present invention.

FIG. 5 is a diagram of a Fibonacci lattice L(34, 21).

FIGS. 6A and 6B show, respectively, Korobov lattices L(8, 1) and L(8, 5).

FIG. 7 is a graph illustrating the computation of the distance of the point (2, 4) to the origin for the lattice L(5, 2).

FIG. 8A shows a fundamental parallelepiped of a hexagonal lattice, and FIG. 8B shows an equilateral triangle representing half of the fundamental parallelepiped.

FIGS. 9A-C illustrate a lattice selected, respectively, in the unit square, in the unit square scaled to an actual region, and in the actual region.

FIGS. 10A and 10B illustrate a scaled sampling lattice before and after shifting to obtain exactly one lattice point per pixel.

FIG. 14 shows a graph illustrating a lattice with its Minkowsky reduced basis.

FIG. 15 shows a graph illustrating a (0, 2, 2)-net in basis 5.

FIG. 16 shows a table setting forth lattice parameters for some (0, 2, 2)-nets in base b.

FIGS. 18A and 18B are a pair of graphs respectively illustrating intensification of a pixel and a line on a raster grid.

FIGS. 19A and 19B are a pair of graphs respectively illustrating intensification of a pixel and a line on a lattice grid.

FIG. 22 is a graph illustrating a polygon rasterized on lattice L(576, 155), in a resolution of 24×24.

FIGS. 23A and 23B are diagrams illustrating rasterization on lattice grids at different resolutions.

FIG. 24 is a diagram illustrating the smoothing of a polygon by splitting cells of the lattice into two triangles.

FIG. 25 shows a raster display built using a maximum minimum distance lattice.

FIG. 26A shows a layout of area light sources for monochrome displays, and FIG. 26B shows a layout for color displays, in a system for anti-aliasing by rank-1 lattices.

FIG. 27 shows a Voroni diagram of the maximum minimum rank-1lattice L(64, 19).

FIG. 28A shows a layout of area light sources for hexagonal pixels in a monochrome display. FIG. 28B shows a layout for a color display.

FIGS. 29A and 29B show diagrams of a display comprising four modules, each of which contains 256 cells. FIG. 29A shows a quadratic layout of the individual modules, and FIG. 29B shows a rectangular layout.

FIG. 34 shows a diagram of a pixel samples with a 4×4 grid.

FIG. 35A shows a uniform 4×4 pattern and FIG. 35B shows a jittered grid with one random sample in each of the 4×4 strata.

FIG. 36A is a graph illustrating the reconstruction of an original frequency with additional noise, and FIG. 36B is a graph illustrating the recovery of only noise.

FIG. 37A shows a Larcher-Pillichshammer point set for n=$2^4$ points, and FIG. 37B shows a randomized Larcher-Pillichshammer point set.

FIG. 38A shows a max-min-dist lattice for n=16 and a=3, and FIG. 38B shows a randomized lattice with the same parameters.

FIG. 39A is a graph showing the first 5×5 pixels of a screen with a resolution of 512×512 covered by the max-min-dist lattice L(252144, 549). FIG. 39B shows the shifted lattice with shift (259, 0).

FIG. 44 shows a graph of a decision function for the B-spline degree.

FIG. 45 shows a diagram illustrating the influence of a sampling point for both a support of 1 pixel radius and 1.5 pixel radius.

FIG. 46 shows a graph illustrating interpolation between successive B-spline filters of degree d and d+1 for d=0.

DETAILED DESCRIPTION

The present invention relates to the generation and synthesis of images, such as for display in a motion picture or other dynamic display, using rank-1 lattices. The techniques described herein are practiced as part of a computer graphics system, in which a pixel value is generated for each pixel in an image. The pixel value is representative of a point in a scene as recorded on an image plane of a simulated camera. The computer graphics system is configured to generate the pixel value for an image using a selected methodology.

The following discussion describes methods, structures, systems, and display technology in accordance with these techniques. It will be understood by those skilled in the art that the described methods and systems can be implemented in software, hardware, or a combination of software and hardware, using conventional computer apparatus such as a personal computer (PC) or equivalent device operating in accordance with (or emulating) a conventional operating system such as Microsoft Windows, Linux, or Unix, either in a standalone configuration or across a network. The various processing means and computational means described below and recited in the claims may therefore be implemented in the software and/or hardware elements of a properly configured digital processing device or network of devices. Processing may be performed sequentially or in parallel, and may be implemented using special purpose or reconfigurable hardware.

Figure 1:
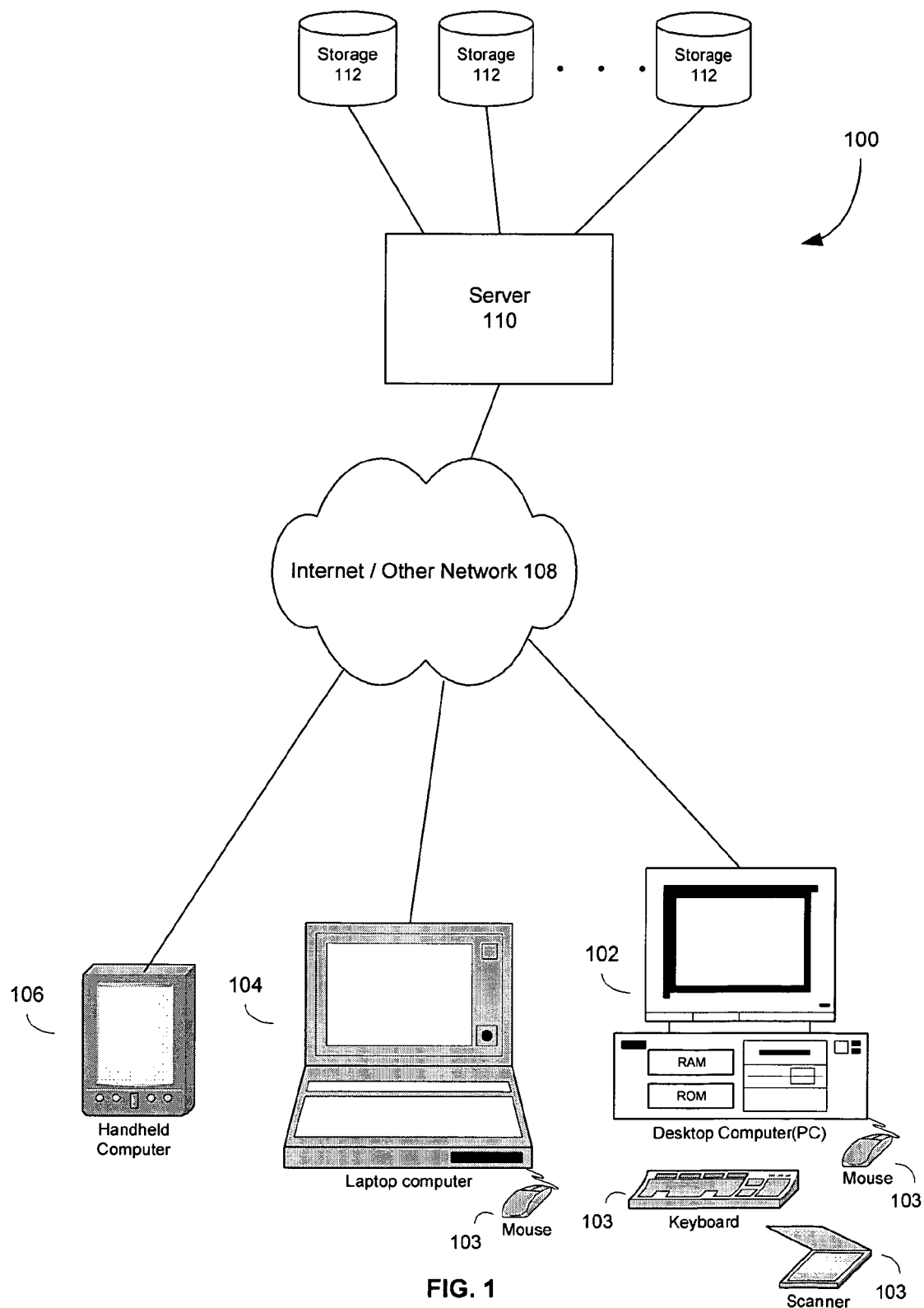
FIG. 1 is a schematic diagram of a conventional digital processing system in which the present invention can be deployed.

Methods, devices or software products in accordance with the invention can operate on any of a wide range of conventional computing devices and systems, such as those depicted by way of example in FIG. 1 (e.g., network system 100), whether standalone, networked, portable or fixed, including conventional PCs 102, laptops 104, handheld or mobile computers 106, or across the Internet or other networks 108, which may in turn include servers 110 and storage 112.

Figure 2:
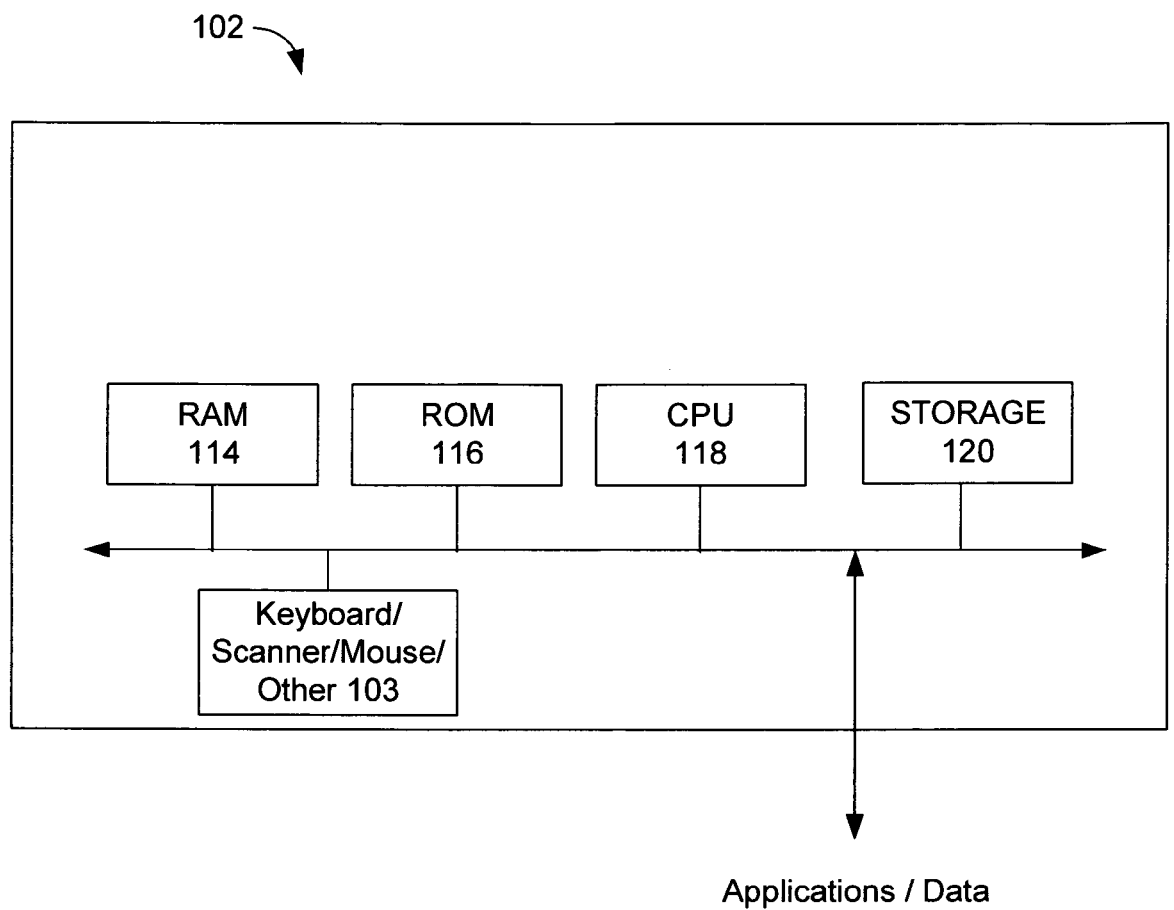
FIG. 2 is a schematic diagram of a conventional personal computer, or like computing apparatus, in which the present invention can be deployed.

In line with conventional computer software and hardware practice, a software application configured in accordance with the invention can operate within, e.g., a PC 102 like that shown in FIG. 2, in which program instructions can be read from CD ROM 116, magnetic disk or other storage 120 and loaded into RAM 114 for execution by CPU 118. Data can be input into the system via any known device or means, including a conventional keyboard, scanner, mouse or other elements 103.

The present discussion is divided into the following sections:
1. Introduction
2. Selection of Rank-1 Lattices
3. Rasterization on Rank-1 Lattices
4. Anti-Aliasing by Rank-1 Lattices
5. Adaptive Refinement and Filtering by Rank-1 Lattices
6. Conclusion It is noted that these section headings are used in order to provide organization and clarity to the following discussion. It is not intended for the use of headings to define or otherwise limit the scope of the invention.

1. INTRODUCTION

A synthetic image represents a two-dimensional array of digital values, called picture elements or "pixels" and thus can be regarded as a two-dimensional function. As used herein, the term "image synthesis" refers to the process of creating synthetic images from scenes.

In general, digital images are generated by a process known as "rasterization," or in the case of photorealistic images of three dimensional scenes, by a process known as "ray tracing." Both approaches aim at determining the appropriate color for each pixel by projecting the original function into the pixel basis. Due to the discrete representation of the original function the problem of aliasing arises, discussed below.

Computing the intensity I(x) of a single pixel P requires the following integration over the pixel area:

$$\text{pixel color} = I(x) = \frac{1}{|P|} \int_P f(x) dx.$$

Typically, this integral is quite complicated and cannot be solved analytically. Therefore numerical methods have to be used. As the integrands are very likely to be discontinuous, the standard tensor product quadrature does not work well, especially for higher dimensions. The square integrability of the underlying functions allows for computing these integrals by means of the so-called "Monte Carlo method," independent of dimension. This approach uses probability theory for approximating the integral $$\int_{I^s} f(x) dx, \quad (1.2)$$

where $I^S = [0,1)^S$ represents the s-dimensional unit cube. The estimation of the above integral is based on constructing a random variable Y, a so called "estimator," whose expectation EY corresponds to the desired integral. Choosing $$Y := \frac{f(X)}{p(X)},$$

for some random variable X with probability density function $$p: I^s \to \mathbb{R}_0^+$$

yields $$EY = \int_{I^s} \frac{f(x)}{p(x)} p(x) dx = \int_{I^s} f(x) dx$$

as the desired result. Considering n independent identically distributed (i.i.d.) variables $Y_i$, the central limit theorem states that the sum $$\sum_{i=0}^{n-1} Y_i$$

becomes asymptotically $$N(n \cdot EY, n \cdot VY)$$

distributed for large n. Then the 3σ rule $$P\left(\left\{n \cdot EY - 3VY\sqrt{n} < \sum_{i=0}^{n-1} Y_i < nEY + 3VY\sqrt{n}\right\}\right) =$$

$$P\left(\left\{\left|\sum_{i=0}^{n-1} Y_i - EY\right| < \frac{3VY}{\sqrt{n}}\right\}\right) \approx 0.997$$

gives a method of computation for the integral 1.2 by $$EY = \int_{I^s} f(x) \approx \sum_{i=0}^{n-1} \frac{f(x_i)}{p(x_i)}$$

This means that the Monte Carlo method performs numerical integration by random sampling and averaging. According to the 3σ rule the approximation error is below $$\frac{3VY}{\sqrt{n}}$$

with high probability for large n with the convergence rate being $$O\left(\frac{1}{\sqrt{n}}\right).$$

Let $t_Y$ be the time spent for one realization $y_i$ of Y. As the computational cost $C_Y = t_Y VY$ of the Monte Carlo algorithm depends on the variance of the estimator, there exist various variance reduction techniques, like separation of the main part or jittering to increase efficiency. Since there are no assumptions about smoothness or the dimension of the integrand, the Monte Carlo algorithm overcomes the problems of the standard tensor product quadrature. However, this method has only a slow convergence and there are no real random numbers on computers anyway. The quasi-Monte Carlo method exploits the fact that the independence of the sampling points being essential for the error bound of the Monte-Carlo method is not required for convergence. Instead the uniform distribution of the sampling pattern represents the crucial factor. Whereas independence, unpredictability and uniformity are characteristic for real random numbers on the unit interval, the so-called quasi-Monte Carlo points are deterministically generated by discarding the first two properties. These deterministic points are much more uniform than is possible for real random numbers. Examples for such constructions are the Hammersley point set or (t, m, s)-nets, which are based on radical inversion and rank-1 lattices, discussed below.

These point sets share the property of partitioning the unit cube in a uniform way. This kind of uniformity has been formalized as follows:

Definition 1 Let $(X, B, \mu)$ be an arbitrary probability space and let M be a nonempty subset of B. A point set $P_n$ of n elements of X is called $(M, \mu)$-uniform if $$\sum_{i=0}^{n-1} \chi_M(x_i) = \mu(M) \cdot n \text{ for all } M \in M,$$

where $\chi_M(x_i)=1$ if $x_i \in M$, zero otherwise.

Known examples for $(M, \mu)$-uniform point sets include radical inversion based points, points from the Cartesian product midpoint rule and rank-1 lattices. Using the probability space $$([0, 1)^s, B, \lambda_s),$$

where B corresponds to the Borel-sets and $\lambda_S$ to the s-dimensional Lebesgue-measure, this definition also applies in the context of computer graphics.

The quasi-Monte Carlo method principally looks like the Monte Carlo method, but uses deterministic points for numerical integration. This means that integral 1.2 is approximated as follows:

$$\int_{I^s} f(x)dx \approx \frac{1}{n}\sum_{i=0}^{n-1} f(x_i).$$

By means of the $(M, \mu)$-uniformity a deterministic error bound on $L^2$ can be obtained as follows:

Theorem 1 Let $(X, B, \mu)$ be an arbitrary probability space and let $M=\{M_1 \ldots M_k\}$ be a partition of X with $M_j \in B$ for $1 \leq j \leq k$. Then for any $(M, \mu)$-uniform point set $P=\{X_0 \ldots X_{n-1}\}$ and any function $f$ on X we have $$\left| \int_X f(x)d\mu(x) - \frac{1}{n}\sum_{i=0}^{n-1} f(x_i) \right| \leq \sum_{j=1}^{k} \mu(M_j)(sup_{x \in M_j} f(x) - inf_{x \in M_j} f(x)).$$

The above discussion applies to the intensity of a single pixel. Simultaneously computing all pixels $$g(y) := \int_{I^s} f(x, y)dx$$

is an integro-approximation problem, typically addressed by generalizing to a parametric integration. The generalization of the Monte Carlo method for random fields yields the so-called "method of dependent tests." A whole function is estimated as follows:

$$g(y) := \int_{I^s} f(x, y)dx \approx \frac{1}{n}\sum_{i=0}^{n-1} f(x_i, y),$$

with the computational cost being $$n \cdot t_s \cdot E \left\| \int_{I^s} f(x, y)dx - \frac{1}{n}\sum_{i=0}^{n-1} f(x_i, y) \right\|_2^2.$$

Considering the quasi-Monte Carlo method, Theorem 1 has been generalized to parametric integration:

Theorem 2 Let $(X, B, \mu)$ be an arbitrary probability space and let $M=\{M_1, \ldots M_k\}$ be a partition of X with $M_j \in B$ for $1 \leq j \leq k$. Then for any $(M, \mu)$-uniform point set $P=\{X_0 \ldots X_{n-1}\}$ and any function $f$ on X we have $$\left\| \frac{1}{n}\sum_{i=0}^{n-1} f(x_i, y) - \int_X f(x_i, y)d\mu(x) \right\| \leq$$

$$\sum_{j=1}^{k} \mu(M_j)(sup_{x \in M_j} f(x, y) - inf_{x \in M_j} f(x, y)).$$

A lattice L is a discrete subset in $\mathbb{R}^s$ $$L := P_n + \mathbb{Z}^s \subset \mathbb{R}^s$$

which is closed under addition and subtraction. For example, regular axis-aligned grids represent one type of simple lattices. Every lattice in $\mathbb{R}^S$ can be generated from a set of linear independent vectors $\{b_1, \ldots, b_s\}$ by considering all integer linear combinations of $b_1, \ldots, b_s$, where $b_j \in \mathbb{R}^s$ for $j=1, \ldots, s$ $$L(b_1, \ldots, b_s) = \left\{ \sum_{j=1}^{s} \lambda_j b_j : \lambda_1, \ldots, \lambda_s \in \mathbb{Z} \right\}.$$

The vectors $\{b_1, \ldots, b_s\}$ are one basis of the lattice. As they generate the lattice, they are also said to be generator vectors. The number s of basis vectors yields the dimension of L.

The absolute value of the determinant of the basis or rather "generator" matrix B whose row vectors are formed by $b_1^T, \ldots, b_s^T$ corresponds to the s-dimensional volume of the fundamental parallelepiped $$\Lambda = \Lambda(b_1, \ldots, b_s) = \{\gamma_1 b_1 + \ldots + \gamma_s b_s : 0 \leq \gamma_i \leq 1, 1 \leq i \leq s\}$$

which is spanned by the basis vectors and the origin. By means of the fundamental parallelepiped $\mathbb{R}^s$ can be partitioned into lattice cells of the same volume and orientation:

$$\{x+\Lambda\} = \{y \in \mathbb{R}^s | y=x+z, \text{ where } z \in \Lambda\} \text{ for } x \in L$$

While the basis is not unique for a specific lattice, its determinant det L=|det B| represents an invariant quantity. This means that a set of linear independent vectors generates the lattice L if the determinant of the corresponding basis matrix equals the lattice determinant.

The row vectors of $(B^{-1})^T$ build a basis of the dual, or polar, lattice of L, which is defined by $$L^{\perp} := \{h \in \mathbb{R}^s : h \cdot x \in \mathbb{Z} \forall x \in L\}$$

The determinant of $L^{\perp}$ arises from the reciprocal of the determinant of L. The following interpretation of the dual lattice $L^\perp$ is useful for the spectral test, discussed below. Every point h in the dual lattice $L^\perp$ defines a set of (s−1) dimensional hyperplanes $$\{x : h \cdot x = \delta\}, \text{ for } \delta = 0, \pm 1, \pm 2, \ldots,$$

so that the following properties hold: Every point in L lies on one of the hyperplanes and every hyperplane contains at least one point of L. These hyperplanes are parallel and equidistant. Their distance equals $$\|h\|_2^{-1}.$$

FIG. 3A shows a Fibonacci lattice 200 containing the family of hyperplanes of the dual lattice point h=(1, 2), and FIG. 3B shows its dual lattice 210.

Typical problems in lattice theory are the closest-point and the shortest vector problem, discussed below. The closest-point problem arises, for example, in communication theory where lattices are applied both for modulation and quantization. The shortest vector problem has been used, for example, in order to measure the quality of random number generators. Another application of this problem is found in cryptography. A further problem, discussed below, is that of lattice basis reduction and the related search for a lattice basis. Other lattice problems include determining the kissing number or finding the Voronoi-relevant vectors.

2. SELECTION OF RANK-1 LATTICES FOR USE IN IMAGE SYNTHESIS

Aspects of the present invention provide techniques for using rank-1 lattices in image synthesis. FIG. 4 is a flowchart illustrating a method 220 according to the present invention. In step 221, a rank-1 lattice is selected in accordance with a maximized minimum distance function corresponding to pixels in a synthetic image to be generated. In step 222, pixel values are calculated in accordance with the selected rank-1 lattice. In step 223, a display-controlling electronic output signal is generated, based on the calculated pixel values.

Lattices are now discussed in greater detail, particularly techniques for selecting rank-1 lattices, including techniques for searching Korobov lattices in two dimensions by maximized minimum distance, thereby achieving maximum uniformity in the sense of (M, µ)-uniform point sets.

Some applications of rank-1 lattices in accordance with other aspects of the invention described herein require a "lattice basis," i.e., a set of linearly independent vectors capable of generating the subspace defined by a selected rank-1 lattice. The following discussion therefore includes a technique for searching the lattice basis. In addition, the relation of shifted rank-1 lattices to (t, m, s)-nets is analyzed.

The "rank" of a lattice L in $\mathbb{R}^S$ is defined to be the minimum number of vectors which are necessary to generate L. Given only one s-dimensional generator vector $g \in \mathbb{N}^S$, $$x_i = \frac{1}{n} \cdot g = \frac{1}{n}(g_1, \ldots, g_s)$$

describes an s-dimensional lattice. Thus, such lattices are known as "rank-1-lattices."

"Korobov lattices" provide an example of s-dimensional rank-1-lattices. Their generator vector has the form $g=(1, a, a^2, \ldots, a^{s-1})$. n being the number of points, it follows that a Korobov lattice is uniquely determined by the tuple (n, a):

$$L(n, a) = \left\{\frac{i}{n}(1, a, a^2, \ldots, a^{s-1}) \bmod 1 \,\middle|\, 0 \le i < n\right\}$$

Thereby, the mod 1 operation restricts the lattice to the unit square resulting in a one-periodic pattern. This means that rank-1 lattices are point symmetric to the origin. One advantage of such lattices is that they can be tiled seamlessly in order to fill the s-dimensional space and that they can be generated very quickly.

The "Fibonacci lattices," which represent a two-dimensional Korobov lattice, are another example of rank-1-lattices. Based on the Fibonacci sequence $F_k := F_{k-1} + F_{k-2}$ with $F_2 := F_1 := 1$, the number of points is set to $n = F_k$, $k \ge 2$ and the generator vector is defined as $$g = (1, F_{k-1})$$

FIG. 5 shows a Fibonacci lattice 230 on the unit square with $n = F_9 = 34$ points and generator vector $g = (1, F_8)$. The quality of rank-1 lattices is significantly influenced by the integer generator vector $(g_1, \ldots, g_s) \in \mathbb{N}^S$. Lattices in Korobov form, which do not differ very much from other lattices in two dimensions, reduce the choice of the generator vector to one parameter. Therefore these lattices are of particular interest in the present discussion with respect to the search for two-dimensional lattices with predefined properties.

As described in detail below, rank-1-lattices are applied in the contexts of anti-aliasing and rasterization. The present discussion addresses the question as to what kind of rank-1-lattices to use.

The generator vector g of a rank-1-lattice can be chosen such that the resulting point set is of low discrepancy. In that case, the elements of this point set are called "good lattice points." For example, Fibonacci lattices for s=2 and lattices whose generator vector is in Korobov form are of low discrepancy. However, few explicit constructions for good lattice points exist.

As mentioned above, rank-1 lattices are (M, µ)-uniform point sets. This property of rank-1 lattices can be seen by considering the partitions $\{x+\Lambda\}$ of $I^S$ which are induced by the fundamental parallelepiped. Maximum uniformity in this sense can be achieved by maximizing the mutual minimum distance $$d_{min}(P_n) := \min_{0 \le i < n} \min_{0 \le j < n} \|x_j - x_i\|_2$$

among all sample points $P_n$. Thereby, the Euclidean norm is calculated on the unit torus.

Hence, rank-1-lattices are used herein in the Korobov form:

$$x_i = \left(\frac{i}{n}, \frac{a \cdot i}{n} \bmod 1\right) \in [0, 1)^2, \text{ for } 0 \le i < n \quad (2.3)$$

featuring a so-called "max-min-dist-property" and identify them by search. Since a lattice in Korobov form is uniquely determined by the tuple (n, a), this means that for a fixed number of points n the search is conducted for such an $a \in \{1, \ldots, n-1\}$ that the minimum distance between two lattice points achieves the maximum on the unit torus. The more the minimum distance between two lattice points grows, the more the resulting lattice approximates a hexagonal lattice, thereby increasing the uniform distribution of the point set.

FIG. 6A shows a Korobov lattice 240 for L(8, 1), in which a=8 and n=1, and FIG. 6B shows a Korobov lattice 250 for L(8, 5), in which a=8 and n=5. For the FIG. 6A lattice 240, the points lie on the diagonal of the unit square, whereas the points of the max-min-dist lattice shown in the FIG. 6B lattice 240 are more uniformly distributed.

The task of calculating the minimum distance between two lattice points is related to a well known problem in lattice theory. The "closest-point problem" consists in finding a vector c for a given lattice L and a given input point $x \in \mathbb{R}^S$ such that $$\|x-c\| \leq \|x-y\| \forall y \in L$$

Calculating the minimum distance in a lattice L corresponds to determining the shortest vector in L which can be accomplished by a simple modification of the closest-point problem. For that purpose, only vectors $v \neq 0$ are considered. Then the closest point to the origin yields the shortest vector, that is, the minimum distance in L. Closest-point search methods have been described in the literature for lattices without a regular structure. But the methods presented there are not appropriate to rank-1 lattices, as they provide a special structure and are only considered for low dimensions. In the following discussion, several approaches for lattice searching are described that exploit both the periodic and regular structure and the application of these lattices.

There is now described a technique for searching for rank-1 lattices on the unit square. Section 2.1.1 of the Appendix, sets forth a code listing for a basic search on the unit square which, for a given $n \in \mathbb{N}$, considers all possible lattices (n, a), $2 \leq a < n-1$. Values for a>n do not need to be taken into account because they produce the lattices (n, a), $1 \leq a < n$ due to the modulo operation. Furthermore, assuming n>3, a=1 and a=n−1 are excluded from search, since the lattice points lie on the two diagonals of the unit square. a=0 would cause the lattice to collapse to the origin and therefore is omitted as well.

The choice of the parameter a for a max-min-dist lattice is not unique, that is, there exist several possibilities that result in the same maximum minimum distance. Therefore, a set $a_{opt}$ is used in order to store the set $$a_{opt} := \{a | \max_a \{\min_{\|x\|} \{\|y\|, y \in L(n,a)\}\}, 2 \leq a < n-1\}$$

found so far.

For each lattice, the algorithm determines the length of the shortest vector by looping over all lattice points $x_i$, $1 \leq i < n$. Although according to equation 2.3 the lattice is defined on the unit torus, all computations in the § 2.1.1 code listing are performed in integer arithmetic in order to avoid rounding errors due to floating point imprecision. This means that the present discussion focuses on integer lattices on $[0, n)^2$ instead of $[0, 1)^2$:

$$x_i = (i, a \cdot i \bmod n) \qquad (2.4)$$

Due to the modulo operation the lattice $L(n, a) \subset [0, n)^2$ is periodic. In order to find the length of the shortest vector, there is now computed the distance from the lattice point $x_i$ to the origin. Calculating on the unit torus, it is necessary to consider the point $\bar{x}_i$ from a different quadrant if i>n−i or $a \cdot i > n - a \cdot i \bmod n$:

sponds to calculating the Euclidean norm of the point $\bar{x}_2 = (2, 4-5)$ relative to the origin of the first quadrant at the point (0, 0).

The distance of the lattice point $\bar{x}_i$ to the origin is computed by means of the squared Euclidean norm $\|x\|_2^2 = x_1^2 + x_2^2$. Both the squares and their sum might produce an integer overflow during computation which is handled in the following way:

The data type for the variables is either chosen to be unsigned int (UINT), especially for the tuple (n,a), or unsigned long long int (ULLINT) for the entities involved in the Euclidean norm calculation.

An integer overflow for $x_j^2$ will occur if $x_j > \sqrt{MAX\_ULLINT} = 0xFFFFFFFF$.

As $x+y \geq x$ and $x+y \geq y$ holds true for the sum of two elements and $$MAX\_ULLINT+1=0, z+MAX\_ULLINT=z-1$$

an overflow is evident if x+y<x or x+y<y.

In the last two cases, the § 2.2.1 code proceeds to the next lattice point. The multiplication a·i mod n in equation 2.4 might also be problematic with respect to overflow. Therefore it is resolved into the incremental sum $$a \cdot i = \sum_{i=0}^{n-1} a$$

being computed iteratively and the modulo operation is applied in each iteration of the inner for-loop by $$\text{var mod } n = \begin{cases} \text{var} & \text{if var} < n \\ \text{var} - n & \text{else} \end{cases}$$

Once the shortest vector is found, its length is compared to the length of the vector having maximum minimum distance maxmindist so far and possibly remember the related parameter a. But this is not done until the Boolean flag noOverflow is set true the first time in order to assure the new maxmindist not to become MAX_ULLINT which is the initial value for mindist in the § 2.2.1 code listing. Depending on whether the new maxmindist is greater or equal to the old one the vector $a_{opt}$ is cleared before storing the new value.

The complexity of the § 2.2.1 code listing is $O(n^2)$ which turns out to be far too slow when the lattice search is executed for large n. Hence, it is desirable to restrain the search domain. In the first place, it is possible to further reduce the number of a's being examined. If a=â is a valid solution to the search $$\text{mindist}(x_i) = \|\bar{x}_i\| = \begin{cases} \|(i, a \cdot i)\| \bmod n & \text{if } i \leq n-i \text{ and } a \cdot i \leq n - a \cdot i \bmod n \\ \|(i, a \cdot i - n)\| \bmod n & \text{if } i \leq n-i \text{ and } a \cdot i > n - a \cdot i \bmod n \\ \|(i-n, a \cdot i)\| \bmod n & \text{if } i > n-i \text{ and } a \cdot i \leq n - a \cdot i \bmod n \\ \|(i-n, a \cdot i - n)\| \bmod n & \text{if } i > n-i \text{ and } a \cdot i > n - a \cdot i \bmod n \end{cases} \qquad (2.5)$$

FIG. 7 shows a graph 260 illustrating the above technique for the lattice L(5, 2). In order to compute the distance of the point $x_2=(2, 4)$ to the origin, due to the periodicity, the point (0, 5) is taken as the new origin. Using the new origin correproblem, so is a=n−â having the same max-min-dist because of symmetry. Thus it is sufficient to range a from 2 to n/2.

In addition, it is not necessary to loop over all lattice points in order to determine the length of the shortest vector because of the "sphere packing" argument. "Sphere packing" means to find an arrangement of spheres, or circles in two dimensions, which do not overlap each other with some or all of them being mutually tangent. In the present case, the circles are centered at the lattice points, and their radius is chosen such that they just touch each other. This is accomplished by r=mindist/2. Hence, finding the maximum minimum distance is a sphere packing problem. In terms of sphere packing, it is necessary to maximize the ratio of the volume of the sphere to the volume of the fundamental parallelepiped (in two dimensions)

$$\frac{r^2\pi}{|det\,B|} = \frac{mindist^2\pi}{4|det\,B|},$$

where B is the basis matrix. As the hexagonal lattice solves the sphere packing problem in $\mathbb{R}^2$, the largest maximum minimum distance is achieved in this type of lattice. Therefore it is not necessary to examine lattice points which are outside the circle around the origin with radius l, where l is the distance between two points in the hexagonal lattice. This quantity can be evaluated in the following way:

Each lattice cell, i.e., the fundamental parallelepiped, is divided into two equilateral triangles. The lattice covers an area of $n^2$. Hence each of the n lattice cells (one for each point) has an area of $$|det(B)| = \frac{area}{number\ of\ lattice\ points} = \frac{n^2}{n} = n.$$

So the area A of an equilateral triangle is n/2. Now it is possible to calculate the length l of the triangle sides which is the sought quantity:

$$A = \frac{h \cdot l}{2} = \frac{\sqrt{l^2 - \left(\frac{l}{2}\right)^2} \cdot l}{2} = \frac{n}{2} \Rightarrow l = \sqrt{\sqrt{\frac{4}{3}} \cdot n}$$

FIGS. 8A and 8B are a pair of diagrams summarizing the above-described process. FIG. 8A shows a fundamental parallelepiped 270 of a hexagonal lattice. As shown in FIG. 8B, one half of the fundamental parallelepiped represents an equilateral triangle 280. h indicates the height of the triangle. l represents the length of one triangle side.

Thus, the outer for-loop in the § 2.2.1 code listing can be stopped at $$\sqrt{\sqrt{\frac{4}{3}} \cdot n}, i.e\ 1 \le i \le \sqrt{\sqrt{\frac{4}{3}} \cdot n}.$$

In combination, complexity of the basic search algorithm has been reduced from $O(n^2)$ to $$O\left(\frac{n}{2} \cdot \sqrt{\sqrt{\frac{4}{3}} \cdot n}\right) = O(n^{1.5}).$$

Thus far, no conditions have been imposed on the lattice parameter a apart from maximizing the minimum distance in L(n, a). If we demand that n and a are relatively prime, which means that their greatest common divisor equals 1, that is $$gcd(n,a)=1,$$

the resulting lattice points will be stratified equidistantly on each coordinate axis. Hence the minimum distance can be bounded to $$mindist \ge \frac{1}{n}.$$

However, this condition represents a restriction in regard to finding the maximum minimum distance lattice for a given $n \in \mathbb{N}$.

For some n the basic search algorithm yields quite a huge number of max-min-dist lattices. In order to reduce the number of possible lattices, the § 2.2.1 code listing is extended such that also the distance of the second shortest vector is maximized. In the present case, considering the third shortest vector brings no further improvement.

There is now discussed the use of weighted norms. The discussion up to this point has focused on the search for max-min-dist lattices on the unit square. The resulting lattice points can be applied for numerical integration on a quadratic domain, for example. In the technique described further below, lattices are used covering an entire computer screen, which is usually not scaled quadratically. But simply scaling a lattice $\in [0, 1)^2$ to a rectangular region may not result in a uniform distribution of the points in the sense of (M, μ)-uniformity. Non-uniform distribution is illustrated in FIGS. 9A-C. FIG. 9A shows a graph 290 illustrating the lattice with n=786432 points, selected in the unit square. FIG. 9B shows a graph 300 illustrating the lattice in the unit square, scaled to the actual region. FIG. 9C shows a graph 310 illustrating the lattice in the actual region.

It is thus necessary to account for the scale of the actual region when calculating the distance of the lattice points to the origin. For that purpose, the Euclidean norm is replaced by a weighted norm. Therefore, the described technique is conducted as if on the unit square, but with the squared Euclidean norm $$\|z\|_2^2 = z_x^2 + z_y^2$$

modified by two scaling factors in order to make up for the region size. These scaling factors are derived by dividing both the x- and y-Resolution through their greatest common divisor (gcd)

$$\|z\|_2^2 = \lambda_x^2 \cdot z_x^2 + \lambda_y^2 \cdot z_y^2,$$

where $$\lambda_x = \frac{xRes}{gcd(xRes, yRes)}$$

and $$\lambda_y = \frac{yRes}{gcd(xRes, yRes)}$$

The introduction of scaling factors brings about only a small modification of the basic search algorithm. Section 2.1.2 of the Appendix shows a code listing including an extended search considering the actual region size. The § 2.1.2 code listing incorporates the search on an arbitrary region size as well as the improvements discussed above. The dots in the § 2.1.2 code listing represent the unchanged part of the § 2.1.1 code listing.

As mentioned above, one use of the described lattices is to sample an entire display screen. Assuming a screen resolution of xRes×yRes and a number of lattice points n=xRes·yRes, it is possible to encounter the situation of not sampling every pixel, that is, the situation that there are pixels left without any sample. FIG. 10A shows a graph 320 illustrating this situation. In FIG. 10A, the lattice L(25, 7) ⊂ [0,1)² is scaled to [0,5)² and samples the screen with a resolution of 5×5. Pixel (0, 1) is missed, while pixel (0, 0) contains two samples.

Similarly, the same number of samples per pixel will not always be achieved, when the number of lattice points is set to n=xRes·yRes·α with α≧1. More generally, it is desirable to obtain the same number of points ∈L(n, a) ⊂ [0,1)² per interval $$E := \prod_{j=0}^{1} \left[ \frac{a_j}{xRes}, \frac{a_j+1}{yRes} \right). \text{ for integers } 0 \leq a_0 < xRes, 0 \leq a_1 < yRes,$$

where xRes and yRes refer to the screen resolution.

There are a number of solutions to this problem. The solutions have in common the search for a valid shift of the whole lattice. In this context, "valid" means that for the shifted lattice, there is an equal number of lattice points per interval being described in the above equations. In order to prevent rounding errors, calculations will again be performed on [0, n)² instead of on [0, 1)².

Due to the periodicity of the lattice it is sufficient to consider shifts of maximally one pixel width which is easier than searching in the fundamental parallelepiped. The search domain, i.e., one pixel, is discretized by looking at the low dimensional projections of the lattice points. If these are perfect in the sense of equally stratifying each coordinate axis, the distance between two lattice points is xRes/n on the x-axis and yRes/n on the y-axis, respectively. This means that there are $$numX = \left(\frac{xRes}{n}\right)^{-1} = \frac{n}{xRes}$$

projected lattice points on the x-axis and $$numY = \left(\frac{yRes}{n}\right)^{-1} = \frac{n}{yRes}$$

projected lattice points on the y-axis within one pixel. The discretization provided by those projections is highlighted by the small grid at the lower left corner of the FIG. 10A graph 320, which represents the shifts to be examined. In the following we discuss three potential search strategies.

Ideally for a given max-min-dist lattice L(n, a) we find a valid shift s=($s_x$, $s_y$). For that purpose all possible shifts are looped over and the number of lattice points per pixel are counted. After that, the number of points in pixel (0, 0) is compared to the other count buffer entries. As soon as one of them does not equal the number of lattice points in the first pixel, comparing can be aborted, and a switch is made to the next lattice shift. The procedure stops as soon as a valid shift is found and returns the shift on [0, n)². Section 2.1.3 of the Appendix shows a code listing of a search shift for a given lattice.

Figures 11, 12:
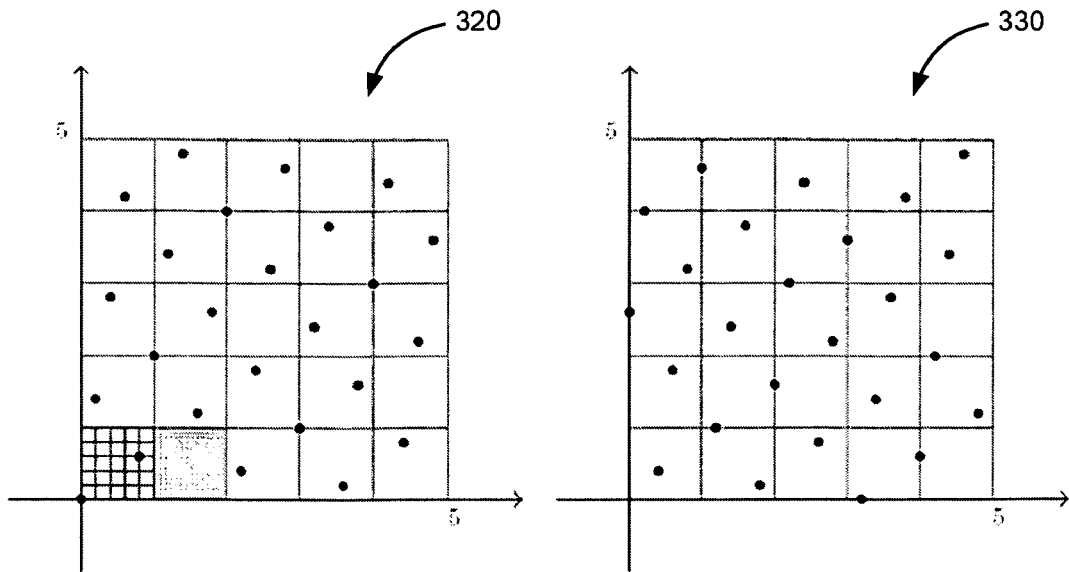
FIG. 11 shows a table setting forth max-min-dist lattices with valid shifts.
FIG. 12 shows a table setting forth lattices produced according to a search technique under the condition of a valid shift.

FIG. 10B shows a graph 330, in which a shift of (10/25, 10/25) has been added to the lattice L(25, 7) before scaling it from [0, 1)² to [0, 5)². After the shift is added, there is exactly one lattice point per pixel. However, lattice shifts can be found only for very few n, and the bigger n grows, the less probable it is that there will be a valid shift. FIG. 11 shows a table 340 listing some maximum minimum distance lattices, for which valid shifts have been found, ad well as the underlying screen resolution.

Thus, a different way to search is needed. One possibility is to first search for a set of a's for which the resulting lattices contain at least one valid shift and then perform the max-min-dist search among these candidates. But since there is sought a lattice $$\tilde{L}(\hat{n}, a)$$

which approximates the max-min-dist lattice

L($\hat{n}$,a)

best for a given n=$\hat{n}$∈ ℕ the following strategy turns out to be significantly better. In a first step the list of a's

[a|2≦a<n−1]

is sorted with respect to the minimum distance in L(n, a) using heap sort. After that, the sorted list is passed through in descending order and the shift search is performed for each a. Thereby, the first a with a valid shift yields the desired result. The implementation of this search strategy is incorporated in the code listing set forth in section 2.1.4 of the Appendix.

In the § 2.1.4 code listing, the number of lattice points per pixel is counted again. If one pixel holds more than n/(xRes·yRes) points, the process can switch over to the next lattice shift at once because in this case one pixel will surely contain less than n/(xRes·yRes) samples. The dots in the § 2.1.4 code listing represent unchanged parts of the previous code listings.

Due to the three nested for-loops, the § 2.1.4 code listing has a complexity of O($n^3$) and is very slow for large n. But the search for shifts can be shortened considerably by exchanging loop (1) and (2). That means that the search domain is passed through in a different order. This is based on the observation that the y-component of at least one shift is zero in all examined cases. FIG. 12 sets forth a table 350 listing lattices that result from the § 2.1.4 code listing. In the FIG. 12 table, shifts which have a non-zero y-component were obtained by not stopping the shift search after the first shift was found. It took approximately five days to compute the lattice L(4194304, 182183) on a Intel Pentium 4, 2.8 GHz, despite switching loops (1) and (2).

Though achieving the same number of lattice points per pixel, it should be borne in mind that the resulting lattices mostly will not satisfy the maximum minimum distance property, but rather will approximate it as well as possible.

There is now discussed the use of the so-called "spectral test" in the selection of rank-1 lattices. The "spectral test" measures the quality of linear congruential random number generators which are defined by a tuple (a, c, m, $X_0$) and a recurrence formula $X_{n+1}=(aX_n+c) \bmod m, n \geq 0$ where m∈ ℕ is the modulo, a∈{1, . . . , m−1} is the multiplier, c∈{0, . . . m−1} is the increment and $X_0$∈{0, . . . , m−1} is the starting value. Numbers between 0 and 1 are given by $u_n=X_n/m$.

Based on a sequence $\langle U_n \rangle$ of period m, for all t>0 the spectral test analyzes the set of all m points $$\{(u_n, u_{n+1}, \ldots, u_{n+t-1}) | 0 \le n < m\}$$

which is formed by successive overlapping t-tuples of $\{u_0, u_1, \ldots\}$ thereby considering all possible starting values. To simplify theory, the spectral test makes the assumption that there is either a linear congruential sequence of full period m with $c \ne 0$ or that m is prime and $c=0$ and the period length is $m-1$. In order to assure that there are always m points, the origin is added to the point set in the latter case because $X_0=0$ must be excluded as starting value. Now the above point set can be written as $$L_t = \left\{ \frac{1}{m}(x, s(x), s(s(x)), \ldots, s^{t-1}(x)) \,\middle|\, 0 \le x < m \right\}, \quad (2.17)$$

where $$s(x) = (ax + c) \bmod m \quad (2.18)$$

It will be seen that the pattern generated by the point set $L_t$ has lattice structure. The set for $t=2$ and $c=0$ yields the two-dimensional Korobov lattice. In general $L_t$ for $c=0$ corresponds to the point set which is produced by a rank-1 lattice with generator vector $(1, a, a^2, \ldots, a^{t-1}) \bmod m$. In two dimensions the lattice points can be covered by a small number of parallel lines which can be chosen from many different families. In higher dimensions the families of lines generalize to families of hyperplanes. The goal of the spectral test is to determine the t-dimensional accuracy $v_t$ which is defined as the reciprocal of the maximum distance between hyperplanes, taken over all families of parallel (t-1)-dimensional hyperplanes covering all points. In the following discussion, it will be derived that $v_t$ corresponds to the length of the shortest vector in the lattice which is dual to the lattice of equation 2.17. This means that the spectral test can be applied for the search for max-min-dist lattices.

The parameter c of a linear congruential random number generator does not have any effect on the spectral test, since it only brings about a shift of all elements of $L_t$ so that their relative distances are kept. This can be seen when resolving the recurrence $$s^t(x) = s(s(\ldots s(x) \ldots)) = (a^t x + (1 + a + \ldots + a^{t-1})c) \bmod m$$
$$= a^t x \bmod m + (1 + a + \ldots + a^{t-1})c \bmod m$$
$$= a^t x \bmod m + \gamma,$$

with $$\gamma = (1 + a + \ldots + a^{t-1})c$$

being constant. Therefore we can set $c=0$ which means that we directly deal with lattices in Korobov form.

Since it is two-dimensional max-min-dist lattices that are being searched for, it is sufficient to examine the two-dimensional point set $$L_2 = \left\{ \frac{1}{m}(x, s(x)) \,\middle|\, 0 \le x < m \right\}, c = 0 \quad (2.19)$$

and to calculate $v_2$, i.e., the reciprocal of the maximum distance between lines, taken over all families of parallel straight lines that cover the points of $L_2$. At first, the mod m-operation which is hidden in equation 2.18 is exchanged with mod 1 by writing $$L_2 = \left\{ \left( \frac{x}{m}, \frac{ax}{m} \right) \bmod 1 \,\middle|\, 0 \le x < m \right\}$$

Then, the mod 1-operation is disposed of by extending the set $L_2$ periodically, i.e., by covering the whole $\mathbb{R}^2$ with copies of the two dimensional hypercube:

$$\tilde{L}_2 = \left\{ \left( \frac{x}{m} + k_1, \frac{ax}{m} + k_2 \right) \,\middle|\, \text{interger } x, k_1, k_2 \right\} \quad (2.21)$$

Figure 13:
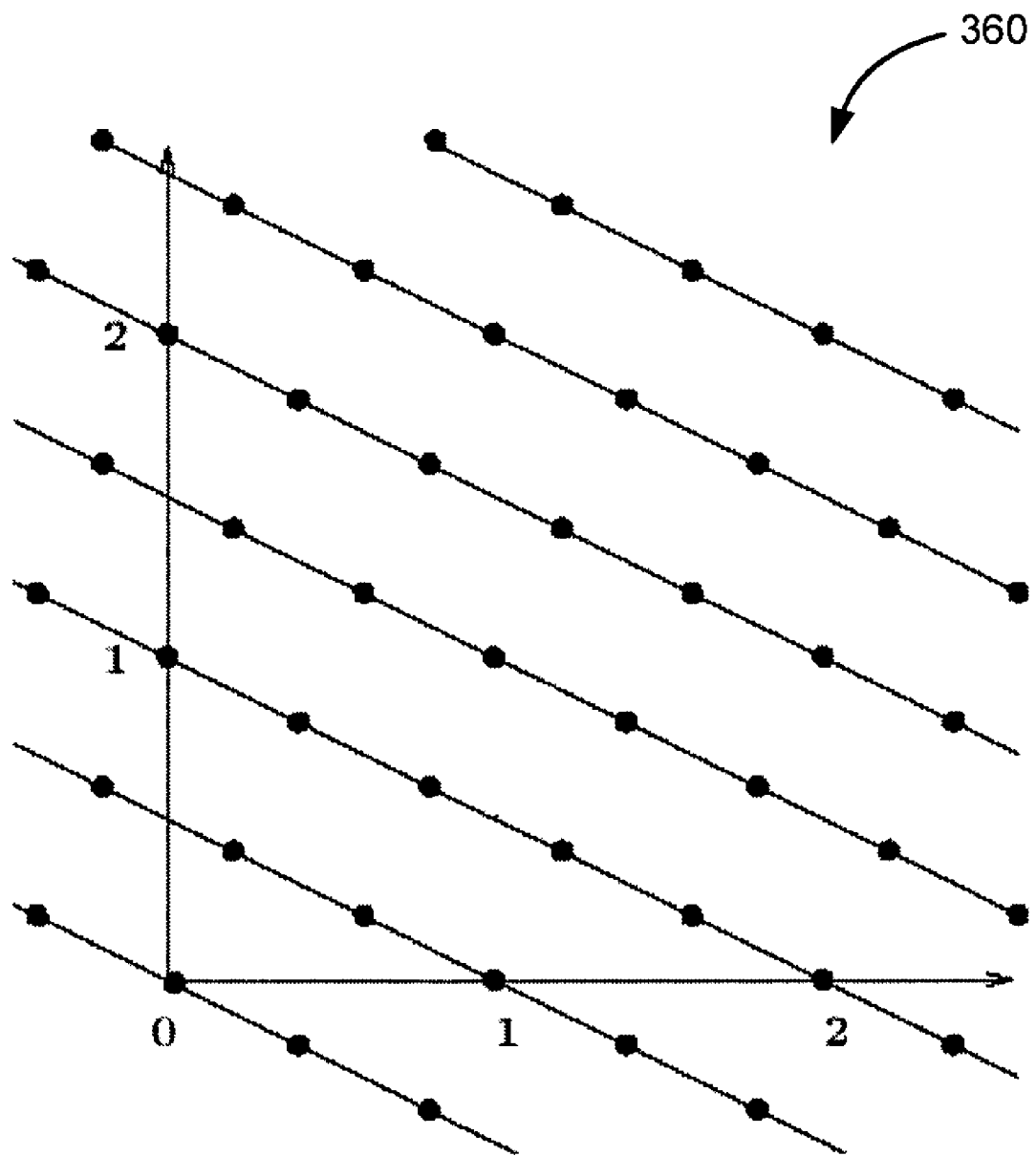
FIG. 13 shows a graph of a periodically extended lattice covered with a family of equidistant parallel lines.

This is illustrated in the graph 300 shown in FIG. 13, in which the point set $$\left\{ \left( \frac{i}{5}, \frac{ai}{5} \right) \bmod 1 \,\middle|\, 0 \le i < 5 \right\}$$

is extended periodically, and in which the periodically extended lattice is covered with one family of equidistant parallel lines. The set 2.21 can further be simplified by changing $(x, k_1, k_2)$ to $(x+k_1 m, 0, k_2 - a k_1)$ since $$\frac{x + k_1 m}{m} = \frac{x}{m} + k_1$$

and $$\frac{a(x + k_1 m)}{m} + k_2 - a k_1 = \frac{ax}{m} + k_2$$

thereby setting the variable $k_1$ to zero. Doing so allows the above point set to be described by $$\tilde{L}_2 = \{y_1 v_1 + y_2 v_2 \mid \text{interger } y_1 \cdot y_2\}, \quad (2.22)$$

where $$v_1 = \frac{1}{m}(1, a) \text{ and } v_2 = (0, 1).$$

It will be seen that set 2.22 contains the m points of the original set 2.19 which satisfy $$L_2 = \tilde{L}_2 \cap [0,1)^2.$$

It is now desired to find the maximum distance between adjacent parallel lines among those families of lines that cover all the points of $\tilde{L}_2$. Such a family can be defined by a non-zero vector $u=(u_1, u_2)$ which is perpendicular to all contained lines. Then the set of points on a particular line can be described by $$\{(x_1, x_2) | x \cdot u = x_1 u_1 + x_2 u_2 = q\},$$

where q is a unique constant for each line. Since the lines are equidistant with one of them passing through the origin it is possible to adjust the length of u so that now $q \in \mathbb{Z}$ defines all the lines in the family. This means that we can calculate the distance between adjacent lines as the minimum distance from the origin to the line for q=1:

$$\min_{real\, x_1,x_2}\{\sqrt{x_1^2+x_2^2}\,|x_1u_1+x_2u_2|\}. \quad (2.25)$$

According to Cauchy's inequality, $$(x_1u_1+x_2u_2)^2 \leq (x_1^2+x_2^2)(u_1^2+u_2^2)$$

$x_j=u_j/(u_1^2+u_2^2)$ for j=1, 2 yields the minimum in equation 2.25, since $$x_1^2+x_2^2 \geq \frac{(x_1u_1+x_2u_2)^2}{u_1^2+u_2^2} \geq \frac{1^2}{u_1^2+u_2^2}.$$

Hence, the distance between neighboring lines is $$\frac{1}{\sqrt{u_1^2+u_2^2}} = \frac{1}{\text{length}(u)} =_{def} \frac{1}{v_2}.$$

The distance will achieve its maximum if $$\sqrt{u_1^2+u_2^2}$$

is minimal. For this reason the two-dimensional accuracy $v_2$ corresponds to the length of the shortest vector u which defines a family of hyperplanes $\{x \cdot u | \text{integer } q\}$ covering all elements of the point set 2.22. Such a vector $u=(u_1, u_2)$ must satisfy the following conditions:

1. $u \neq 0$,
2. $v \cdot u = \text{integer } \forall v \in \tilde{L}_2$,
3. in particular $u_1$ and $u_2$ must be integers, because $(0,1) \in \tilde{L}_2$ and $(1,0) \in \tilde{L}_2$ 4. $v_1 \in \tilde{L}_2 \Longrightarrow v_1 \cdot u = \frac{1}{m}(u_1+au_2) = \text{integer},$ i.e. $u_1 + au_2 \equiv 0 (\text{mod } m).$ Conversely, given any non-zero integer vector $u=(u_1,u_2)$ which fulfills condition 4, the corresponding family of lines will cover all elements of $\tilde{L}_2$, since the dot product $(y_1v_1+y_2v_2) \cdot u$ will result in an integer for all integers $y_1, y_2$. The spectral test thus needs to find the minimal value $$v_2^2 = \min_{(u_1,u_2)\neq(0,0)}\{u_1^2 = u_2^2 \,|\, u_1+au_2 \equiv 0\} \quad (2.28)$$
$$= \min_{(x_1,x_2)\neq(0,0)}\{(mx_1-ax_2)^2+x_2^2\},$$

where $u_1=mx_1-ax_2$ and $u_2=x_2$ is a parametric and general solution of the basic congruence, since $mx_1-ax_2+ax_2 \equiv 0 (\text{mod } m)$.

In order to find the minimal value $v_2=\min_{(x_1,x_2)\neq(0,0)}\{(mx_1-ax_2)^2+x_2^2\}$ this problem is formulated as the more general problem of minimizing the quadratic form $$f(x_1,x_2)=(w_{11}x_1+w_{21}x_2)^2+(w_{12}x_1+w_{22}x_2)^2=(x_1w_1+x_2w_2) \cdot (x_1w_1+x_2w_2) \quad (2.29)$$

over all non zero integer vectors $(x_1, x_2)$, where $$W = \begin{pmatrix} w_1^\top \\ w_2^\top \end{pmatrix}, w_1 = \begin{pmatrix} w_{11} \\ w_{12} \end{pmatrix} \text{ and } w_2 = \begin{pmatrix} w_{21} \\ w_{22} \end{pmatrix}$$

is any non-singular matrix. $w_{11}=m$, $w_{12}=0$, $w_{21}=-a$ and $w_{12}=1$ yield the special form of equation 2.28.

Section 2.1.5 of the Appendix sets forth a code listing of a technique for determining the value of the two-dimensional accuracy $v_2$. It incorporates a "Euclidean step," which represents a simplification of the two-dimensional spectral test with respect to higher dimensions and is based on Gauss's notion of a reduced binary quadratic form. It can be proved that all integer solutions to the congruence $u_1+au_2 \equiv 0$ have the form $u_1=x_1w_{11}+x_2w_{21}$ and $u_2=x_1w_{12}+x_2w_{22}$ for integers $x_1$, $x_2$, given the matrix W such that $w_{11}+aw_{12} \equiv w_{21}+aw_{22} \equiv 0$ and $\det(W)=m$. If additionally W satisfies the condition $$2|w_{11}w_{21}+w_{12}w_{22}| \leq w_{11}^2+w_{12}^2 \leq w_{21}^2+w_{22}^2,$$

$(u_1, u_2)=(w_{11}, w_{12})$ minimizes $u_{21}+u_{22}$ over all non-zero integer solutions.

The technique in the § 2.1.5 code listing takes advantage of these considerations by reducing the quadratic form shown in equation 2.29 until $(w_{11},w_{12})$ represents the minimal solution of $u_{21}+u_{22}$ as stated above.

As $v_2$ is the length of the shortest vector which defines a family of lines covering all elements of $\tilde{L}_2$ and due to condition 2, the two-dimensional accuracy can also be regarded as the length of the shortest vector in $$L^\perp = \{u | u \cdot v \in \mathbb{Z} \forall v \in \tilde{L}\},$$

i.e., in the lattice which is dual to $\tilde{L}$:

$$v_2 = \min_{0 \neq u \in L^\perp} \|u\|_2$$

Since every point u in $L^\perp$ defines a set of parallel and equidistant lines such that every point in $\tilde{L}$ lies on one of the lines, the shortest vector $u \in L^\perp$ defines the family of lines with maximum distance. Every other choice of u brings the lines closer together. There are now selected two neighboring lines of a family and one lattice point on each of them such that for one fixed point $p_1$ on the first line the other point $p_2$ on the second line is closest to $p_1$. Then the distance between $p_1$ and $p_2$ decreases as the distance between two adjacent lines increases. Therefore the shortest vector in $L^\perp$ also indicates the shortest vector in $\tilde{L}_2$. In fact, $v_2$, i.e., the length of the shortest vector in $L^\perp$, equals the length of the shortest vector in $\tilde{L}$ up to some scaling factor. This can be proved by considering the basis B of $\tilde{L}$ and the basis $B^\perp$ of $L^\perp$. Let $$B = \frac{1}{m}\begin{pmatrix} a & c \\ b & d \end{pmatrix}, \text{ with } b_1 = \frac{1}{m}\begin{pmatrix} a \\ c \end{pmatrix} \text{ and } b_2 = \frac{1}{m}\begin{pmatrix} b \\ d \end{pmatrix}$$

be the Minkowsky reduced basis matrix of $\tilde{L}$. Then the column vectors of $(B^{-1})^T$ represent the basis of the dual lattice $L^\perp$. With $$\frac{ad}{m^2} - \frac{cd}{m^2} = \frac{1}{m} = \det(B) = \text{volume}(A)$$

being the determinant of B, the inverse of the basis matrix of $\tilde{L}$ can be calculated by $$B^{-1} = \frac{1}{m}\begin{pmatrix} d & -c \\ -b & a \end{pmatrix}\left(\frac{1}{m}\right)^{-1} = \begin{pmatrix} d & -c \\ -b & a \end{pmatrix}$$

Therefore the basis matrix of $L^\perp$ is $$B^\perp = \begin{pmatrix} d & -b \\ -c & a \end{pmatrix}, \text{ with } b_1^\perp = \begin{pmatrix} d \\ -c \end{pmatrix} \text{ and } b_2^\perp = \begin{pmatrix} -b \\ a \end{pmatrix}$$

Computing the length of the basis vectors of the dual lattice, we notice that they differ from $b_1$ and $b_2$ just by the factor $1/m$:

$$\|b_1^\perp\| \cdot \frac{1}{m} = \sqrt{b^2 + d^2} = \|b_2\|,$$

$$\|b_2^\perp\| \cdot \frac{1}{m} = \sqrt{c^2 + a^2} = \|b_1\|.$$

The basis vectors of the dual lattice result from both rotating $b_1 \cdot n$ and $b_2 \cdot n$ by $\pm 90°$ $$b_2^\perp = \begin{pmatrix} 0 & -1 \\ 1 & 0 \end{pmatrix} \cdot \begin{pmatrix} a \\ c \end{pmatrix} = \begin{pmatrix} -c \\ a \end{pmatrix} \text{ and } b_1^\perp = \begin{pmatrix} 0 & 1 \\ -1 & 0 \end{pmatrix} \cdot \begin{pmatrix} b \\ d \end{pmatrix} = \begin{pmatrix} d \\ -b \end{pmatrix}$$

which means that the relative distances between the lattice points in the dual lattice correspond to those in $\tilde{L}$. Since $b_1$ is the shortest vector in $\tilde{L}$, so is $b_2^\perp$ in $\tilde{L}^\perp$. Conversely, if we find the shortest vector in the dual lattice $L^\perp$, its length yields the length of the shortest vector in $\tilde{L}$ multiplied by m. This fact is exploited in the search for max-min-dist lattices on the unit square, as set forth in the § 2.1.1 code listing. Instead of calculating the minimum distance by looping over all lattice points, the two-dimensional spectral test is applied. As $[0, m)^2$ is computed, the two-dimensional accuracy delivers the sought quantity. The rest of the basic search technique remains unchanged, as shown in the code listing set forth in Section 2.1.6 of the Appendix.

As the spectral test only needs a few cycles to determine $v_2$, the technique set forth in the § 2.1.6 code listing is much faster than the basic search technique set forth in § 2.1.1, even when the § 2.1.1 technique incorporates the optimizations discussed above. However, by using the § 2.1.5 technique, the § 2.1.6 technique is restricted to the unit square.

There is now described a technique for searching the basis for a lattice. So far, the description of the invention has focused on techniques for lattice search. As described in further detail below, aspects of the invention include rasterization on rank-1 lattices and adaptive sampling. Thus, it is necessary to select a good basis for a given lattice. The process of determining a lattice basis according to a given criterion is called "reduction." For the present purposes, it is advantageous if the basis vectors are as short as possible, resulting in reasonably hexagonal lattice cells. However, as a general matter, it is possible to simply choose the two shortest vectors because they do not necessarily form a basis.

This problem has been formalized in the following way. A basis $G = (g_1, \ldots, g_s)^T$ with $g_1, \ldots, g_s$ being row vectors is said to be "Hermite reduced" if $L(g_1, \ldots, g_s) = L(g_1', \ldots, g_s')$ and $\|g_j'\| = \|g_j\|$ for $j \in \{1, \ldots, i-1\} \Rightarrow \|g_i\| \leq \|g_i'\|$ holds true for all $i \in \{1, \ldots, s\}$ and for all $G' = (g_1', \ldots, g_s')^T$. This means that a generator matrix G is reduced if the sequence $\|g_1\|, \ldots, \|g_s\|$ is the first element in a list where the corresponding sequences of all generator matrices of the same lattice are lexicographically ordered. In such a reduced basis the first basis vector conforms to the shortest non-zero lattice vector. Although a Hermite reduced basis exists for every lattice, no explicit construction is known.

A less strict reduction criterion is used for the presently described basis search. A basis $G = (g_1, \ldots, g_s)^T$ is reduced according to this criterion if 1. $g_1$ is the shortest non-zero vector in L and
2. for $2 \leq i \leq s$ $g_i$ is the shortest vector in L such that $(g_1, \ldots, g_i)$ may be extended to a basis of L.

This so-called "Minkowsky reduced basis" always contains the shortest non-zero lattice vector.

There are still other reduction techniques that may be used, including the "Korkine-Zolotareff reduction" and the "LLL-reduction." The choice of reduction technique depends on the underlying problem. Although the problem of finding a Minkowsky reduced basis is NP-hard, for the present purposes it is sufficient to use this reduction, since it is restricted to the two dimensional case and can exploit the special structure of rank-1 lattices.

To find a Minkowsky reduced basis in two dimensions, a search is first conducted for the shortest non-zero lattice vector $g_1$. Then, the subsequent basis vector $g_2$ is determined by searching the second shortest lattice vector in L which is linearly independent of $g_1$. This can be done by modifying the basic search technique. For a given lattice L(n, a) all lattice points $x_i$ are looped over in order to calculate mindist($x_i$) like in equation 2.5, discussed above. The length of both the shortest and the second shortest vector are checked for, updating the basis vectors if necessary. But before updating the second basis vector, it is necessary to make sure that it is linearly independent to the first basis vector so that the conditions of a Minkowsky reduced basis hold. Special care has to be taken for this test because the simple computation of the determinant of the two two-dimensional basis vectors might produce an integer overflow. By definition two vectors $x = (x_1, x_2)$ and $y = (y_1, y_2)$ are linearly dependent if there exists a scalar $\lambda \neq 0$ such that $$x = \lambda \cdot y.$$

In other words, that means that they are linearly dependent if one vector is a multiple of the other one. This is the case if for $$\tilde{x} = \left(\frac{|x_1|}{gcd(|x_1|, |y_1|)}, \frac{|x_2|}{gcd(|x_2|, |y_2|)}\right) \text{ and }$$

$$\tilde{y} = \left(\frac{|y_1|}{gcd(|x_1|, |y_1|)}, \frac{|y_2|}{gcd(|x_2|, |y_2|)}\right).$$

$$\tilde{x}_1 = \tilde{x}_2 \text{ and } \tilde{y}_1 = \tilde{y}_2$$

the two resulting vectors $\tilde{x}$ and $\tilde{y}$ are equal and if in addition $sgn(x_1) = sgn(y_1)$ and $sgn(x_2) = sgn(y_2)$ or $sgn(x_1) \neq sgn(y_1)$ and $sgn(x_2) \neq sgn(y_2)$.

Section 2.2.1 of the Appendix sets forth a code listing that checks for the linear independence of two basis vectors. If the signs of the vector components were not involved, the § 2.2.1 code listing would take the vectors (1, 1) and (1,−1) for linearly dependent, for example. FIG. 14 shows a graph 370 illustrating the lattice L(25, 7) and the two basis vectors that result from the basis search algorithm. As shown in FIG. 15, $b_1=(3, -4)$ and $b_2=(4, 3)$.

Section 2.2.2 of the Appendix shows a code listing in which a search is conducted for a Minkowsky reduced basis. It should be remembered that computations are always performed on $[0, n)^2$ and therefore also get the basis vectors on $[0, n)^2$. Concerning shifted lattices, the basis search algorithm can be applied in the same way because a shift just represents a translation of the whole lattice and does not influence the basis.

There is now discussed the use of (0, m, 2)-nets in conjunction with rank-1 lattices. The present description of the invention has already set forth one motivation for shifted lattices with regard to sampling a whole screen in section. A closer look at the lattice in the FIG. 10B graph 330. FIG. 15 shows a graph 380 illustrating a refinement of the grid structure of FIG. 10B and shows the lattice $L(25, 7) \subset [0, 1)^2$ shifted by (10/25, 10/25). The lattice points perfectly fill the fine grid structure in a low dimensional projection. This is indicated by the hollow lattice point which is projected onto the x- and y-axis with no other lattice point lying on these lines. Furthermore, each interval $$\left[\frac{i}{5}, \frac{i+1}{5}\right) \times \left[\frac{j}{5}, \frac{j+1}{5}\right), \quad 0 \leq i, j < 5$$

also contains exactly one lattice point. Hence the lattice has the characteristics of both stratified and Latin hypercube sampling points.

This can be formalized by (0, m, 2)- or more generally (t, m, s). An elementary interval is defined by $$E := \prod_{j=1}^{s} \left[\frac{a_j}{b^{n_j}}, \frac{a_j+1}{b^{n_j}}\right),$$

where $s \geq 1$ is the dimension, $b \geq 2$ represents the base and $n_j \geq 0$ and $0 \leq a_j < b^{n_j}$ are integers. The volume of E is given by $$\lambda_s(E) = \frac{1}{b^{\sum_{j=1}^{s} n_j}}.$$

For two integers $0 \leq t \leq m$, a finite point set of $b^m$ points in s dimensions is called a (t, m, s)-net in base b, if every elementary interval of volume $$\lambda_s(E) = b^{t-m}$$

contains exactly $b^t$ points. As smaller values of t assure a better uniform distribution, t is said to be the quality parameter.

Keeping these definitions in mind, the lattice shown in the FIG. 15 graph 380 represents a (0, 2, 2)-net in base 5, since every elementary of volume $$b^{t-m} = 5^{0-2} = \frac{1}{25}$$

contains exactly one lattice point. This observation led to a search of all possible shifts for the lattices $$L(n, a), n = 2^m, m \in \{4, 6, 8, 10\}$$

and test them for (0, m, 2)-nets in base 2, i.e., check if every elementary interval of volume $$2^{-m} = \frac{1}{n}$$

contains exactly one point. It will be seen that the examined lattices need to fulfill the condition gcd(n, a)=1, since otherwise it would not be possible to obtain perfect one dimensional projections. But none of the above lattices turned out to be a (0, m, 2)-net in base 2, which means that (0, m, 2)-nets cannot simply be found by shifting rank-1 lattices. Nevertheless (0, m, 2)-nets for m=2 are readily obtained if the base b is prime and $gcd(b^2, a)=1$ for the shifted lattices $L(b^2, a)$, as it is the case for the lattice shown in the FIG. 15 graph 380. This is because then there are only three different elementary intervals of volume $1/b^2$ 1. $\left[\frac{i}{b}, \frac{i+1}{b}\right) \times \left[\frac{j}{b}, \frac{j+1}{b}\right), \quad 0 \leq i, j < b$ 2. $\left[\frac{i}{b^2}, \frac{i+1}{b^2}\right) \times [0, 1), \quad 0 \leq i < b$ 3. $[0, 1) \times \left[\frac{i}{b^2}, \frac{i+1}{b^2}\right), \quad 0 \leq i < b$ which naturally contain just one lattice point. FIG. 16 shows a table 390 listing some further (0, 2, 2)-nets in base b.

3. RASTERIZATION ON RANK-1 LATTICES

A raster display is typically formed from a matrix of picture elements (pixels) representing the whole screen. In order to render an image correctly, a rasterizer approximates the mathematical ideal primitives, such as lines, triangles or circles described in terms of vertices, on a Cartesian grid by assigning the appropriate colors to sets of pixels. The rasterizer converts the two-dimensional vertices in screen space into pixels on the screen. In current approaches, a pixel is typically represented as a square on the integral raster [0, . . . , ResX)× [0, . . . , ResY).

Figure 17:
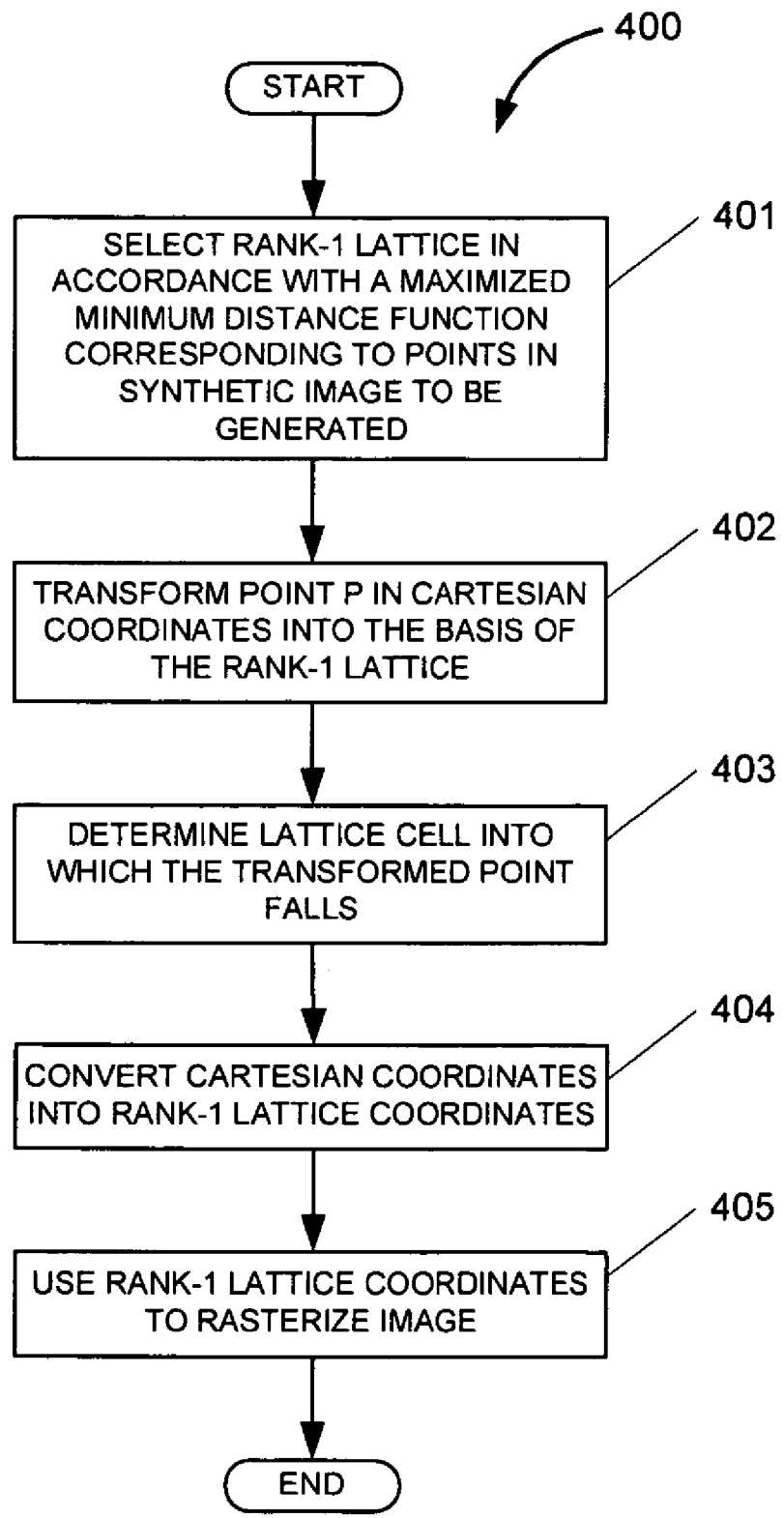
FIG. 17 shows a flowchart of a rasterization method using rank-1lattices in accordance with a further aspect of the invention.

An aspect of the present is directed to a rasterization technique based on rank-1 lattices. According to this approach, rasterization is performed on the lattice cells of a rank-1 lattice instead of on a rectangular grid; i.e., the pixel layout is structured by rank-1 lattices. FIG. 17 is a flowchart of a method 400 according to this aspect of the invention.

In step 401, a rank-1 lattice is selected in accordance with a maximized minimum distance function corresponding to points in a synthetic image to be generated. In step 402, a point p in Cartesian coordinates is transformed into the basis of the rank-1 lattice. In step 403, it is determined the lattice cell into which the transformed point falls. In step 404, the Cartesian coordinates are converted into rank-1 lattice coordinates. In step 405, the rank-1 lattice coordinates are used to rasterize the image.

In the following discussion, the rasterization technique is described in conjunction with a Digital Differential Analyzer (DDA), which is a scan conversion technique for lines, and in conjunction with Crow's algorithm, which is a rasterization technique for convex polygons. The described technique can be performed using traditional raster displays. In addition, as discussed below, the technique may also form the basis of a new concept of display technology.

A scan-conversion technique for lines is based on computing the coordinates of those pixels that best approximate an ideal, straight line drawn on the two-dimensional raster. Typically, a line is characterized by a start point, an end point, a width, and by and additional style attributes. The present discussion focuses on lines having a width of one pixel, without additional attributes and without anti-aliasing.

The simplest technique for scan-converting lines is a Digital Differential Analyzer (DDA), which is based on the Taylor series expansion of a function $$P(t+\tau) = P(t) + \tau \frac{dP(t)}{dt} + O(\tau^2). \qquad (3.1)$$

Since rasterization is performed on an integer grid, the endpoints of the lines are assumed to be integer coordinates. For a given pair of (integer) points $P_0=(x_0, y_0)$ and $P_1=(x_1, y_1)$, a straight line can explicitly described by $$P(t) = \begin{pmatrix} x_0 + t(x_1 - x_0) \\ y_0 + t(y_1 - y_0) \end{pmatrix}, \text{ for } t \in [0, 1].$$

Using equation 3.1, a point (t+T, P(t+T)) on the line can incrementally be calculated from its preceding point (t, P(t)):

$$P(t+\tau) = P(t) + \tau \frac{dP(t)}{dt} = P(t) + \tau \begin{pmatrix} x_1 - x_0 \\ y_1 - y_0 \end{pmatrix} = P(t) + \tau \begin{pmatrix} \Delta x \\ \Delta y \end{pmatrix}$$

In order to draw the line incrementally from its start to end point, the rasterization process has to be discretized in n steps, where $n=\max\{|x_1-x_0|, |y_1-y_0|\}$. This means that the pixel coordinates approximating the ideal line are incrementally computed by $$x_i + 1 = x_i \frac{\Delta x}{n} \text{ and}$$

$$y_i + 1 = y_i \frac{\Delta y}{n}, \text{ for } 0 \le i < n.$$

If for example $|\Delta x|>|\Delta y|$, $n=|x_1-x_0|$. Hence $x_i$ is incremented by ±1 in each step, whereas $y_i$ is incremented by a fraction $$0 \le \left|\frac{\Delta y}{n}\right| \le 1.$$

After calculating the coordinates, the pixel $(\lfloor x_i \rfloor, \lfloor y_i \rfloor)$, which is closest to the ideal line, is colored. For visualization, a pixel is interpreted as a sample in the center of the cell formed by two adjacent grid lines. FIG. 18A shows a graph 410, in which the pixel (2, 2) is intensified on the raster grid. FIG. 18B shows a graph 420 illustrating the rasterization of the line with integer endpoints (0, 0) and (3, 1). The rasterization process consecutively intensifies the pixels $$(0,0), \left(1, \left\lfloor \frac{1}{3} \right\rfloor\right), \left(2, \left\lfloor \frac{2}{3} \right\rfloor\right),$$

and (3,1), since n=3, dx=3 and dy=1. Section 3.1.1 of the Appendix sets forth a source code listing for the DDA.

In the above discussion, the DDA has been described with respect to traditional raster displays. According to an aspect of the invention, the rasterization technique is converted to rank-1 lattices by changing the basis in which the rasterization is performed. This change means that the rasterizer switches from a Cartesian coordinate system to a coordinate system formed by the basis of a corresponding rank-1 lattice. Hence, it will be seen that, according to the present aspect of the invention, the rasterization process does not operate on pixels any more, but rather on lattice cells.

For visualization, each lattice cell is interpreted as a sample in the center of the fundamental parallelepiped spanned by the Minkowsky reduced lattice basis. Each cell (x, y) is addressed in lattice coordinates, i.e., in the coordinate system formed by the lattice basis. The use of lattice coordinates is illustrated in FIGS. 19A and 19B. FIG. 19A shows a graph 430 illustrating the intensification of lattice cell (0, 2) on the lattice grid. FIG. 19B shows a graph 440 illustrating rasterization of the line extending from (1, 3) to (7, 14) on the max-min-dist lattice L(576, 155). The intensified (shaded) lattice cells in FIG. 19B represent the scan-converted line.

Figure 20:
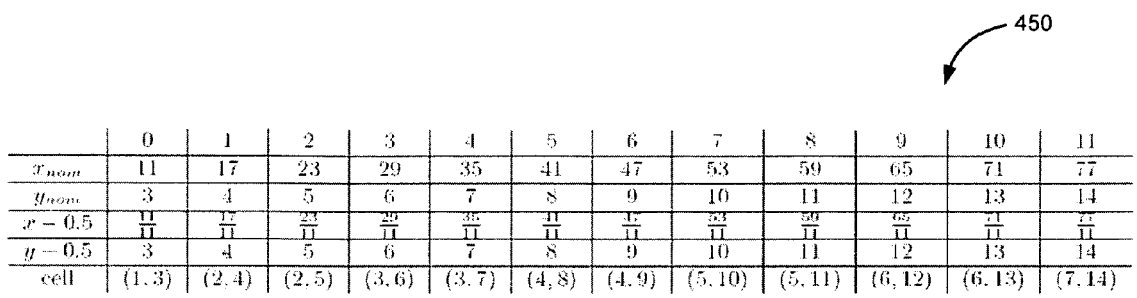
FIG. 20 is a table setting forth single steps performed in the rasterization of a line on a lattice grid.

In order to specify a line as simple as possible and independent of the lattice on which the rasterization is performed, the scan-conversion technique assumes that its endpoints are given in Cartesian coordinates on the unit square. The lattice coordinates are obtained by transforming these points into the lattice basis and by determining the lattice cells into which the transformed points fall. The coordinates of these two lattice cells then define the start and endpoint of the line. Section 3.1.2 of the Appendix sets forth a source code listing for DDA rasterization on rank-1 lattices. FIG. 20 shows a table 450 setting forth the single steps performed by the § 3.1.2 code listing for the rasterization of the line in FIG. 19B from (1, 3) to (7, 14). The last line of the FIG. 20 table 450 contains the lattice cells approximating the ideal line.

In FIG. 19B, the ideal line is originally defined by the points $$P_0 = \left(\frac{2.5}{24}, \frac{1.5}{24}\right)$$

and $$P_1\left(\frac{12.5}{24}, \frac{5.5}{24}\right).$$

The transformation in lattice coordinates yields $\tilde{P}_0=(1.25, 3.0833)$ and $\tilde{P}_1=(7.4999, 14.5)$. As $\tilde{P}_0$ lies within the lattice cell (1, 3) and $\tilde{P}_1$ within (7, 14), the line is identified by the start point (1, 3) and the end point (7, 14).

Given a point (x, y) in Cartesian coordinates and the lattice basis (b1 b2) with $$b1 = \begin{pmatrix} b_{11} \\ b_{12} \end{pmatrix} \text{ and } b2 = \begin{pmatrix} b_{21} \\ b_{22} \end{pmatrix},$$

$$\begin{pmatrix} x \\ y \end{pmatrix} = \begin{pmatrix} b_{11} & b_{21} \\ b_{12} & b_{22} \end{pmatrix}\begin{pmatrix} u \\ v \end{pmatrix},$$

where (u, v) represents the coordinates of the point (x, y) in the lattice basis. As the basis matrix (b1 b2) is not singular, the coordinates (u, v) are the result of $$\begin{pmatrix} u \\ v \end{pmatrix} = \begin{pmatrix} b_{11} & b_{21} \\ b_{12} & b_{22} \end{pmatrix}^{-1}\begin{pmatrix} x \\ y \end{pmatrix} = \begin{pmatrix} xb_{22} - yb_{21} \\ yb_{11} - xb_{12} \end{pmatrix} \cdot \frac{1}{b_{11}b_{22} - b_{21}b_{b12}}.$$

This is implemented in the code listing set forth in section 3.1.3 of the Appendix, which additionally handles the transformation into the coordinate system of a shifted lattice. As a lattice shift only translates the whole lattice without affecting the basis, the shift vector $(sx, sy) \in [0, n)^2$ is also transformed into the lattice basis. Then the transformed shift is applied to (u, v). The lattice cell ($c_x$, $c_y$) which a point (u, v) in lattice coordinates belongs to is computed by rounding down its components, i.e, $$c_x = \lfloor u \rfloor \text{ and } c_y = \lfloor v \rfloor.$$

This technique is as a method called determineLatticeCell that is implemented in the code listing set forth in section 3.1.4 of the Appendix. Once both the start and end point of the line are converted into lattice coordinates, the rasterization is realized the same way as in the § 3.1.1 code listing, discussed above. The only difference consists in the computation of the next point ($x_{i+1}$, $y_{i+1}$) on the line. Instead of $$x_{i+1} = xi + \frac{\Delta x}{n}$$

and $$y_{i+1} = y_i + \frac{\Delta y}{n},$$

there are calculated $$x_{i+1} = \frac{x_{i \cdot n} + \Delta x}{n} \text{ and}$$

$$y_{i+1} = \frac{y_{i \cdot n} + \Delta y}{n}.$$

As the denominator never changes, only the nominator has to be accumulated in every step. The division is only performed to determine the lattice cell which has to be intensified. That way the accumulation of rounding errors can be avoided. Assuming that $|\Delta y| > |\Delta x|$, it follows that $n = |\Delta y|$.

$$y_{i+1} = \frac{y_i \cdot n + \Delta y}{n}$$

$$= \frac{y_i \cdot n + \text{sgn}(\Delta y) \cdot n}{n}$$

$$= y_i + \text{sgn}(\Delta y).$$

where $$\text{sgn}(x) = \begin{cases} 1 & \text{if } x \geq 0 \\ -1 & \text{else} \end{cases}$$

In that case $y_i$ just has to be incremented by sgn($\Delta y$) in each step, wherefore $y_{nom}$ is initialized by $y_0$ and $y_{denom}$ by 1 in the above algorithm. The same applies if $|\Delta x| \geq |\Delta y|$. Applying the § 3.1.2 code to the line shown in the FIG. 19B graph 390, yields:

$$\Delta x = 7 - 1 = 6; \Delta y = 14 - 3 = 11; n = \max\{6, 11\} = 11,$$
$$x_{nom} = 1 \cdot 11 = 11, x_{denom} = 11, y_{nom} = 3 \text{ and } y_{denom} = 1.$$

Due to the representation of a lattice cell as the center of the fundamental parallelepiped 0.5 is added to both $x_{i+1}$ and $y_{i+1}$ in the § 3.1.2 code, i.e., $$x = x_{i+1}$$

$$= \frac{x_{nom}}{x_{denom}} + 0.5 \text{ and}$$

$$y = yi + 1$$

$$= \frac{y_{nom}}{y_{denom}} + 0.5.$$

The coordinates of the lattice cells which approximate best the ideal line are identified analog to the code set forth in § 3.1.1, namely, by ($\lfloor x \rfloor, \lfloor y \rfloor$).

The lattice-based rasterization technique is now described with respect to Crow's algorithm. A polygon is rasterized by finding the pixels which fill the polygon given by a set of vertices and edges. Crow's algorithm assumes that the vertices are ordered in a consistent way and that the polygons to be converted are convex. However, because every polygon can be decomposed into convex polygons, this requirement does not present a limitation.

Crow's algorithm takes advantage of the coherence in both the horizontal and the vertical scanline. Looping over a horizontal scanline from bottom to top, the algorithm determines in each scanline which pixels are inside the polygon by means of an incremental Jordan test for horizontal coherence. The Jordan test is based on the Jordan curve theorem, which states that any ray from inside a polygon will intersect the edges of a polygon an odd number of times. As only convex polygons are considered, there is just one span per scanline which is bordered by points V scanLeft and V scanRight on the current left and right edges. These points are found by exploiting the vertical coherence by means of a DDA approach.

Figure 21:
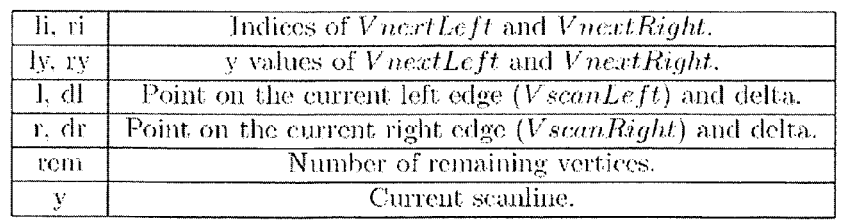
FIG. 21 is a table setting forth variables used in Crow's rasterization algorithm for convex polygons.

This technique starts by finding the vertex bot with the smallest y-value. As long as there are vertices not having been considered yet the algorithm proceeds by determining an appropriate left edge V left→V nextLeft and an appropriate right edge V right→V nextRight, where V left=V right=bot at the beginning. While scanning upward, it is checked whether these edges span the current scanline and the appropriate span is drawn. Crow's algorithm for a standard pixel display is set forth in the code listing shown in section 3.2.1 of the Appendix, which assumes the vertices to be ordered counterclockwise. FIG. 21 shows a table 420 setting forth a description of the variables used in the § 3.2.1 code listing.

In order to rasterize convex polygons on rank-1 lattices the same approach is used as above. This means that the algorithm is performed in the coordinate system spanned by the basis of the particular rank-1 lattice L(n, a) instead of the Cartesian coordinate system. Thereby the first basis vector $b_1$ of the Minkowsky reduced basis of L(n, a) corresponds to the horizontal and the second basis vector $b_2$ to the vertical coordinate axis. The rasterization algorithm takes as arguments an array of vertices and the size of this array.

According to the code listing set forth in § 3.1.2, the vertices which have to be ordered counterclockwise are assumed to be given in Cartesian coordinates on the unit square. After transforming these vertices into the lattice basis, the rasterization can be implemented the same way as in the code listing of § 3.2.1 up to one exception, i.e., the basic rasterization algorithm remains the same, as shown in the code listing in § 3.2.4. After finding the vertex bot with the smallest y-value, the algorithm scans upwards by maintaining the active edges V left→V nextLeft and V right→V nextRight. Due to the assumption that the vertices are ordered counterclockwise, the indices of V nextLeft and V nextRight are calculated by li=(li+n−1) mod n and ri=(ri+1) mod n. But as the vertices are originally specified on the unit square of the Cartesian coordinate system, this order may change in the lattice basis. Although the vertices will still be ordered in a consistent way after the coordinate system transformation, it might be necessary to exchange V scanLeft and V scanRight in order to assure that lx≦rx when drawing the current polygon span. This means that $$lx = \text{ceil}(l.m\_X);$$

$$rx = \text{ceil}(r.m\_X);$$

has to be changed to $$lx=l.m\_X<r.m\_X?ceil(l.m\_X):ceil(r.m\_X);$$

$$rx=l.m\_X<r.m\_X?ceil(r.m\_X):ceil(l.m\_X);$$

in the code listing set forth in section 3.2.2 of the Appendix. Furthermore, it is necessary to call drawLatticeCell (x, y) instead of drawPixel (x, y).

FIG. 22 shows a graph 470 of a polygon defined by the points $$P_0 = \left(\frac{10}{48}, \frac{4}{48}\right),$$

$$P_1 = \left(\frac{40}{48}, \frac{8}{48}\right),$$

$$P_2 = \left(\frac{20}{48}, \frac{34}{48}\right) \text{ and}$$

$$P_3 = \left(\frac{1}{48}, \frac{24}{48}\right)$$

on the unit square. After transformation into the basis of the lattice L(576, 155) the polygon is specified by $\tilde{P}_0=(3.125, 5.708)$, $\tilde{P}_1=(15, 21)$, $\tilde{P}_2=(-1.875, 17.375)$ and $\tilde{P}_3=(-7.062, 5.979)$. FIGS. 23A and 23B show graphs 480 and 490 displaying the same polygon rendered in higher resolutions.

The principle for the rasterization on rank-1 lattices, which has been described in this chapter considering as example the DDA and the algorithm of Crow, can also be applied for other rasterization algorithms, like for example for the Bresenham algorithm for lines and the y-x rasterization algorithm for polygons. One disadvantage of this rasterization approach is that edges being almost vertical or rather horizontal appear very jagged due to the shape of the lattice cells. One possible solution to that problem consists in anti-aliasing, as it is done for traditional raster displays. Taking a closer look at the fundamental parallelepiped reveals another possibility. Using Delaunay triangulation, by splitting the lattice cells along their shorter diagonals, i.e., into two triangles, the overall resolution can be doubled which results in considerably smoother edges. This is shown in FIG. 24, which shows a graph 500, where this approach has been applied to the polygon shown in FIG. 23A.

As mentioned above, the described techniques provide the basis for a new display technology. The first computer monitors created images by moving an electron beam directly along the paths between specified points on the display. Thus these vector displays were able to generate sharp and smooth lines. However they only drew wire frames and could only display scenes of limited complexity. Even commonly used for scientific instruments like oscilloscopes, they have been replaced by raster displays. Such a display usually is constituted by a rectangular grid of pixels which are represented as squares on this raster. In contrast to vector displays images are created by scan line algorithms. Moreover the pixels can be addressed individually and they can be colored by means of individual red, green and blue phosphors, in the case of a CRT display.

Instead of rasterizing on a rectangular grid, the rasterization can be performed on lattice points, as discussed above. Whereas this method can be simulated on traditional raster displays by means of a software solution, it can even be performed on current graphics hardware in the following way. Since the rasterizer is only capable of operating on rectangular grids, in a first step the scene has to be transformed into the lattice basis, which in fact corresponds to a shear of the rectangular grid. After this change of frame the rasterization can be performed on the graphics hardware as usual. In order to display the rasterized scene, the resulting image has to be transformed back into the pixel basis. This procedure yields the same results as if the rasterization would have directly been performed on a rank-1 lattice.

On the basis of these considerations we introduce a new concept of display technology. Instead of a matrix of square pixels the raster display is conceived as a matrix of lattice cells, i.e., the single picture elements are represented as the cells which are induced by the Delaunay triangulation of the rank-1 lattice points, i.e., the Voronoi diagram. This means that the raster display is conceptualized as a rank-1 lattice which is selected by maximized minimum distance. Thus the picture elements approximate the hexagonal grid for an increasing number of pixels. By structuring the pixel layout by rank-1 lattices, the display takes advantage of the filter properties of rank-1 lattices, discussed below, featuring smaller wave vectors as the traditional rectangular grids. Hence functions whose Fourier coefficients decrease with increasing frequency can be approximated in an especially good way. Since rank-1 lattices are available for any number n of points or rather lattice cells, the number of pixels can be chosen freely. FIG. 25 illustrates a layout 510 of a display module consisting of 256 lattice cells.

This concept can technically be implemented in a number of ways. A first implementation comprises a display of point light sources, for example RGB LEDs, which are arranged in the center of each lattice cell, indicated by the small black dots in FIG. 25. Since the rank-1 lattice is chosen by maximum minimum distance, the RGB-LEDs are distributed over the screen in an optimal way. A second implementation composes the display of area light sources covering the single picture elements. This yields a technique for thin-film transistor (TFT) displays and liquid crystal displays (LCDs), respectively, which may be realized by means of organic light-emitting diodes (OLEDs) for instance.

As mentioned above, the overall resolution of a rank-1 lattice display can be doubled by splitting the lattice cells along their shorter diagonal, thus reducing aliasing artifacts, as shown in the FIG. 24 graph 500. This principle can directly be realized in hardware by adapting the layout of the area light sources. This is shown in FIGS. 26A and 26B for a monochrome display 520 and a color display 530.

So far the pixel layout has been determined by the cells induced by the Delaunay triangulation of the rank-1 lattice points. By means of the Voronoi diagram, which is dual to the Delaunay triangulation in $\mathbb{R}^2$, the $\mathbb{R}^2$ can be partitioned into almost hexagonal cells centered around each lattice point. FIG. 27 shows a Voronoi diagram 540 of the maximum minimum distance rank-1 lattice L(64, 19). Structuring the pixel layout in this sense leads to substantially hexagonal pixel lattices. As a principle of nature, ommatidia in compound eyes or the visual sensors in the retina are arranged in this manner, for example. The concept of hexagonal pixels has already been studied in the context of hexagonal image processing and is used, for example, in SmartSlab LED panels.

One advantage of the described pixel layout is the smoother representation of curved objects. This is due to the fact that all neighbors have a uniform distance from each other, i.e., they are connected in a consistent way. By means of this pixel layout, color displays can simply be realized by adapting the number of pixels to the number of basis colors used by the display. This means that the total number of pixels is computed by number of pixels·color cells.

FIG. 28A shows a layout 550 of area light sources for hexagonal pixels for a monochrome display. FIG. 28B shows a layout 560 of area light sources for hexagonal pixels for a color display.

In a third implementation, the layout of the sensors, i.e., the photosites, of a charge-coupled device (CCD) camera take the form of a rank-1 lattice cell which is either induced by the Delaunay triangulation or the Voronoi diagram.

In a fourth implementation, rank-1 lattice patterns are used in projector technology. As an example, the hinge-mounted microscopic mirrors of digital light processing (DLP) integrated circuits could be arranged in this manner.

In a fifth implementation, the described patterns can be applied in the context of 3D displays, such as the Sharp LL-151-3D monitor, and other monitors disclosed at www.sharpsystems.com, in order to realize both the display layout and the parallax barrier, by which the 3D mode is enabled.

Figures 30, 31:
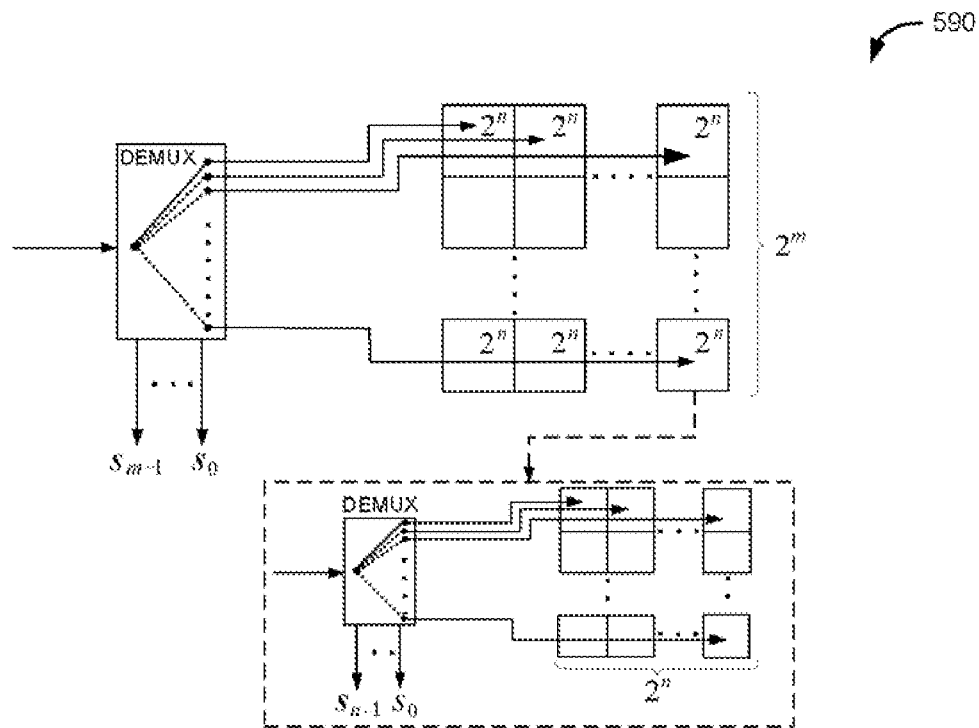
FIG. 30 shows a diagram of a system in which display modules are addressed by a demultiplexer.
FIG. 31 shows a table setting forth parameters for $2^n$ displays and images.

Since rank-1 lattices can be tiled seamlessly, it is possible to compose a display of k modules, each of which having the same number of lattice cells. FIGS. 29A and 29B show displays 570 and 580 according to this aspect of the invention. In a "$2^n$ display," the number of cells for a display module is selected to be a power of 2. This type of display module has the advantage that the single cells easily can be addressed by means of a demultiplexer. If the number k of modules is set to a power of 2 as well, the single modules can be controlled the same way. FIG. 30 is a diagram of a system 590 according to this aspect of the invention. Such displays can be produced economically by fabricating small modules of the same layout and the same number of lattice cells which can easily be assembled to a display of desired resolution.

More generally, the concept of $2^n$ displays perfectly fits all aspects of computer technology, taking advantage of memory layout, cache lines, addressing, and the like. Storing images according to this scheme leads to the concept of "$2^n$ images," which equally benefit from the advantages of $2^n$ displays. So the $O(2^n)$ memory requirements ideally fit paging (memory alignment). As a further example, storing a sequence of textures as $2^0 \ldots 2^n$ images naturally supports MipMapping which thus can be performed in a very efficient way.

FIG. 31 shows a table 600 that lists the parameters for some $2^n$ display modules and images, respectively. The listed sizes represent the proposed resolution for the single modules according to which the maximum minimum distance rank-1 lattices have been selected.

4. ANTI-ALIASING BY RANK-1 LATTICES

Figure 32:
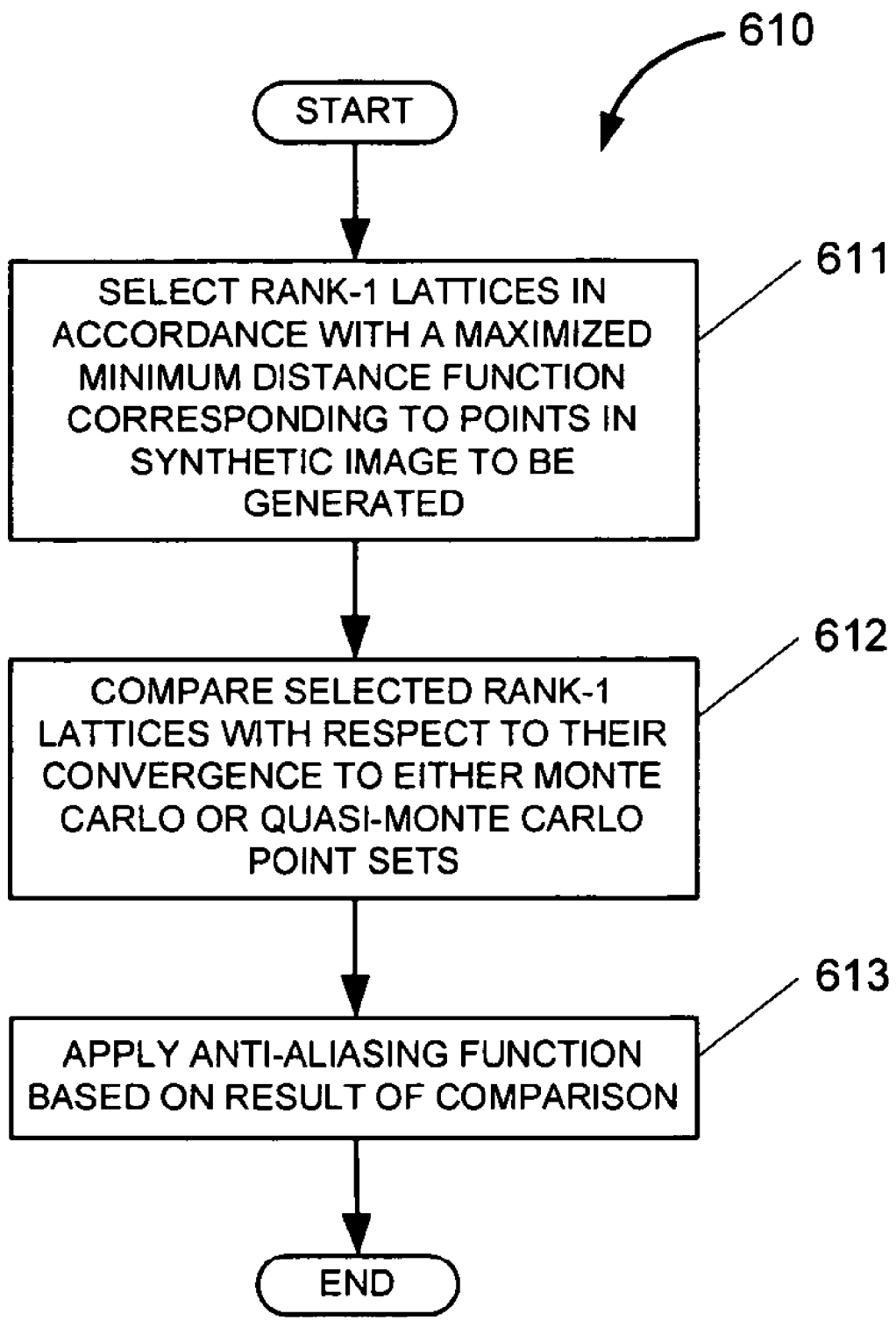
FIG. 32 shows a flowchart of a method for anti-aliasing by rank-1 lattices according to a further aspect of the invention.

FIG. 32 shows a flowchart of a method 610 according to a further aspect of the invention for anti-aliasing by rank-1 lattices. In step 611, rank-1 lattices are selected in accordance with a maximized minimum distance function corresponding to points in a synthetic image to be generated. In step 612, the selected rank-1 lattices are compared with respect to their convergence to either Monte Carlo or quasi-Monte Carlo point sets. In step 613, an anti-aliasing function is applied, based on the result of this comparison. The following discussion develops the theoretical basis for the method, and describes further aspects of the present invention relating to anti-aliasing.

Figure 33:
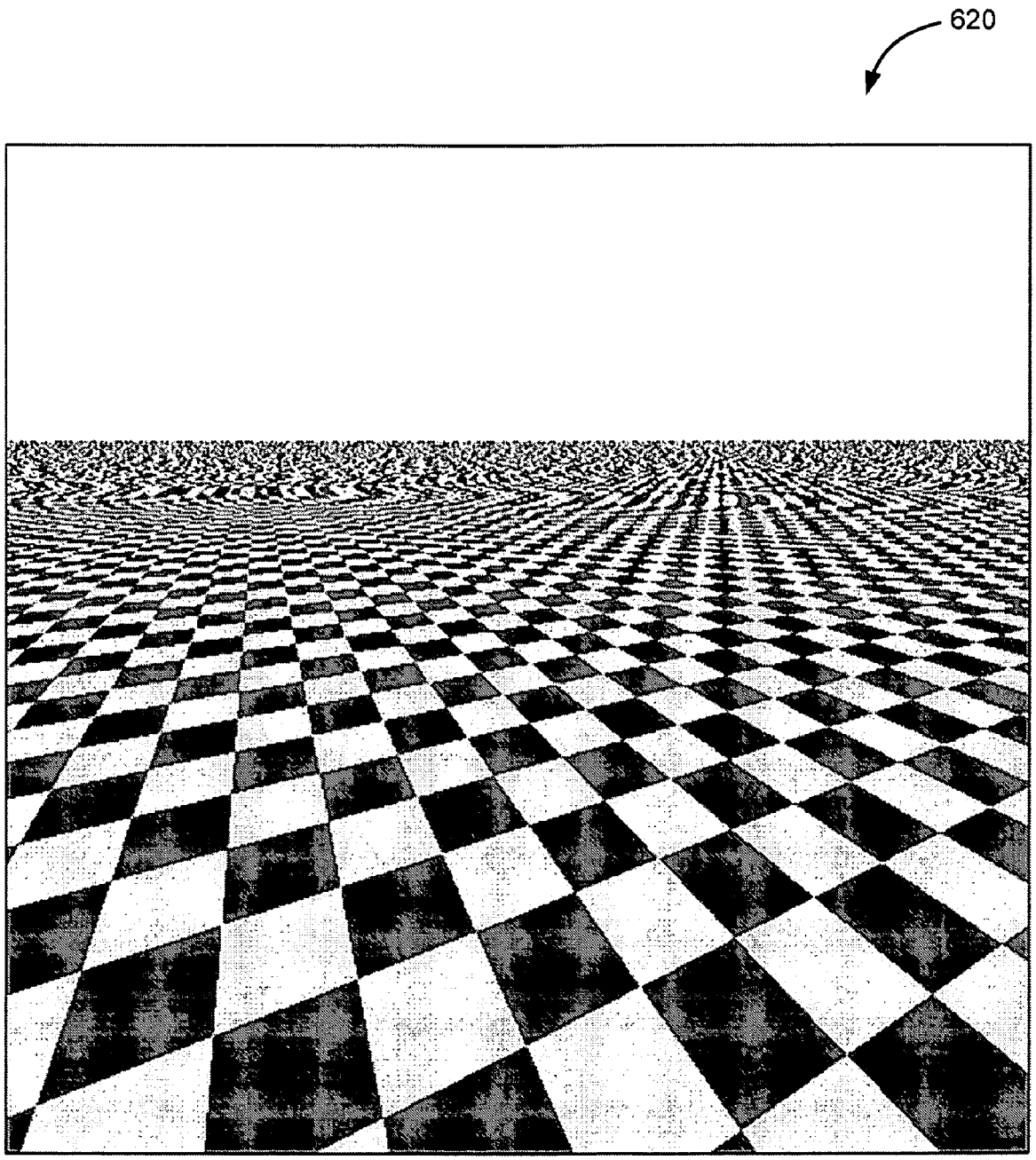
FIG. 33 shows an image of an infinite checkerboard used to illustrate anti-aliasing by rank-1 lattices.

FIG. 33 shows a synthesized image 620 of a checkerboard of infinite size that has been used to develop and illustrate techniques for anti-aliasing by rank-1 lattices. Given a "real" checkerboard of infinite size, ideally, one would perceive a smooth and continuous image averaged to half grey at the horizon. However, a synthesized image generated by a computer is a digital signal. Since a computer is only capable of storing discrete values of finite precision, a computer-generated image must perforce also be discrete. Thus, in generating an image, a signal that is typically aperiodic and discontinuous must be converted into a digital signal.

In order to generate an image of the checkerboard it is necessary to sample the original signal. This transition from continuous to discrete may induce artifacts, e.g., in form of jaggies or Moiré patterns. These effects are known as "aliases." The general process of displaying a continuous signal a begins by gathering samples of a at specific positions. That is, a sample pattern s is multiplied with a. The resulting signal b consists of a zero-valued function with spikes at the sampling positions. In order to recover the original signal, b is convolved with a reconstruction filter r yielding the signal c=b*r. In order to reproduce the signal on a display, the resulting signal c is resampled with a set of samples reflecting the frame buffer memory locations. Finally, the convolution of r with the display reconstruction filter gives the actually displayed signal. In practice, the sampled signal b is directly reconstructed for each single pixel, thereby omitting the resampling step.

The following discussion begins with an overview of the signal processing theory relating to aliasing. The overview followed by a description of anti-aliasing by rank-1 lattices, including a comparison of the convergence of test-patterns. A method is then described for adaptive sampling by rank-1 lattices. In addition, the filter properties of rank-1 lattices are described, and a method is presented for depth adaptive filtering in a ray tracing environment. As described below, this method provides a technique for automatically choosing the appropriate reconstruction filter depending on the distance between camera and objects. Finally, anti-aliasing by rank-1 lattices is examined on patterned displays by means of the Clear-Type technology, which incorporates a filtering technique called RGB-decimation.

The ideal sampling and reconstruction of a one-dimensional continuous signal is now discussed. The two-dimensional case is very similar to the one-dimensional case, from which it differs only in its complexity. By "ideal sampling and reconstruction," it is meant that the continuous, band-limited signal is uniformly sampled and reconstructed in such a way that the original signal is re-obtained in the end.

The process of ideal sampling and reconstruction can be summarized by the following equation:

$$f(x) \cdot s(x) * r(x) = f(x),$$

where $f$ is the original signal or function, respectively, s is the uniform sampling function and r is the reconstruction filter. As already mentioned, the signal $f$ needs to be band-limited. The reason for this requirement is that the Fourier transform of a uniformly sampled signal turns out to be periodic in frequency space. A function $f$ is said to be band-limited if $$F(\omega) = 0 \text{ for } |\omega| > \omega_0,$$

where $F(\omega)$ is the Fourier transform of $f(x)$. This means that the spectrum $$F(\omega) = \mathcal{F}(f(x))$$

of $f$ has finite support. The frequency $\omega_0$ is called the cutoff frequency for $f$. If $\omega_0 = \infty$, the function $f$ is not band-limited.

In the first step, the function $f$ is uniformly sampled by the Shah-function, as given in the next equation:

$$s(x) = \sum_{k=-\infty}^{\infty} \delta(x - k\Delta x).$$

The sampling is done by multiplying $f$ with the Shah-function:

$$f_s(x) = f(x) \cdot s(x)$$

$$= f(x) \cdot \sum_{k=-\infty}^{\infty} \delta(x - k\Delta x).$$

To calculate the Fourier transform of $f_s(x)$, according to the convolution theorem the Fourier transforms of $f(x)$ and $s(x)$ have to be convolved in frequency space.

$$\mathcal{F}(f_s(x)) = F(\omega) * S(\omega)$$

$$= F(\omega) * \frac{1}{\Delta x} \sum_{k=-\infty}^{\infty} \delta\left(\omega - \frac{k}{\Delta x}\right)$$

$$= F_s(\omega)$$

Calculating the convolution integral we get $$F(\omega) * S(\omega) = \int_{-\infty}^{\infty} F(\hat{\omega}) S(\omega - \hat{\omega}) d\hat{\omega}$$

$$= \frac{1}{\Delta x} \sum_{k=-\infty}^{\infty} \int_{-\infty}^{\infty} F(\hat{\omega}) \delta\left(\omega - \hat{\omega} - \frac{k}{\Delta x}\right) d\hat{\omega}$$

$$= \frac{1}{\Delta x} \sum_{k=-\infty}^{\infty} F\left(\omega + \frac{k}{\Delta x}\right)$$

So the Fourier transform of $f_s(x)$ is a periodic repetition of the spectrum of $f(x)$ with repetition period $1/\Delta x$. If $$\frac{1}{\Delta x} \geq 2\omega_0,$$

the copies of $F(\omega)$ will not overlap. Therefore $F(\omega) = \Delta x F_s(\omega)$ holds true for $\omega \in [-\omega_0, \omega_0]$. But if $$\frac{1}{\Delta x} < 2\omega_0$$

the periodic repetition of $F(\omega)$ will overlap and accumulate. In order to reconstruct $f(x)$ from its discrete samples, it does not suffice to perform the inverse Fourier transform $\mathcal{F}^{-1}$ due to the periodic repetition of $F(\omega)$. $\mathcal{F}^{-1}(F_s(\omega))$ would result in a signal being zero everywhere but at $\lambda\Delta x$, $\lambda \in \mathbb{Z}$. Therefore the center copy of $F(\omega)$ needs to be isolated. Since $F(\omega) = \Delta x F_s(\omega)$ for $\omega \in [-\omega_0, \omega_0]$, if $$\frac{1}{\Delta x} \geq 2\omega_0,$$

$F(\omega)$ can be recovered by multiplying $F_s(\omega)$ with a box spectrum $$R(\omega) = \begin{cases} \Delta x, & \text{for } \omega \in [-\omega_0, \omega_0] \\ 0, & \text{otherwise.} \end{cases}$$

In frequency space the reconstruction is performed by $$F_s(\omega) \cdot R(\omega) = \frac{1}{\Delta x} \sum_{k=-\infty}^{\infty} F\left(\omega + \frac{k}{\Delta x}\right) \cdot R(\omega)$$

$$= \begin{cases} 0, & |\omega| > \omega_0 \\ \frac{1}{\Delta x} \sum_{k \;\forall |\omega + \frac{k}{\Delta x}| \leq \omega_0} F\left(\omega + \frac{k}{\Delta x}\right) \Delta x, & \text{otherwise} \end{cases}$$

$$= \begin{cases} 0, & |\omega| > \omega_0 \\ F(\omega), & \text{otherwise} \end{cases} = F(\omega)$$

As the inverse Fourier transform of the box spectrum results in the sinc-function, we reconstruct $f(x)$ in time space by convolving $f_s(x)$ with the sinc-function $$\mathcal{F}^{-1}(F_s(\omega) \cdot R(\omega)) =$$

$$f_s(x) * r(x) = 2\omega_0 \Delta x \sum_{k=-\infty}^{\infty} f(k\Delta x) \mathrm{sinc} 2\pi\omega_0(x - k\Delta x) = f(x).$$

However, this only works if $$\frac{1}{\Delta x} \geq 2\omega_0.$$

When the sampling frequency is too low, i.e.

$$\frac{1}{\Delta x} < 2\omega_0,$$

the box filtering will cut out $F(\omega) + F(\omega')$, for $\omega' \neq 0$ instead of $F(\omega)$. This means that some additional energy, a so called "alias," is added to $F(\omega)$, which makes it impossible to recover $F(\omega)$ from its samples. These considerations are summarized in Shannon's sampling theorem:

Theorem 3 (One dimensional uniform Sampling Theorem) A continuous function $f$ may be perfectly reconstructed from its uniform samples with sampling frequency $1/\Delta x$, if $f$ is bandlimited with cut-off frequency $\omega_0$ and $$\frac{1}{\Delta x} \geq 2|\omega_0|.$$

Simplified, the theorem states that a band-limited function $f$ may be perfectly reconstructed from its uniform samples if the sampling frequency is at least twice as high as the maximum frequency $\omega_0$ in the spectrum of $\omega_0$. $\omega_0$ is also knows as the "Nyquist frequency." As used herein, the term "undersampling" refers to sampling below the Nyquist frequency. If a signal is sampled above the Nyquist frequency, it is said to be "oversampled." The reconstruction filter depends on whether we calculate in time or in frequency space. In time space it is necessary to convolve the correctly sampled signal with the sinc-function, whereas in frequency space, it is necessary to multiply $F_s(\omega)$ with a box spectrum.

Even if the sampling theorem is fulfilled, artifacts may occur in the reconstructed signal. Let for example $$R(\omega) = \begin{cases} 2\Delta x, & \text{for } \omega \in [-\omega_0, \omega_0] \\ 0, & \text{otherwise} \end{cases}$$

be the reconstruction filter used in frequency space. Then obviously, $F_s(\omega) \cdot R(\omega) \neq F(\omega)$, since energy from above $\omega_0$ adds up to $F(\omega)$. In such a case, the term used is "reconstruction errors" because of poor reconstruction filters, as opposed to aliasing due to an improper sampling rate.

However, it is necessary to consider that the sampling theorem deals with continuous functions, which usually is not the case for the functions used in computer graphics. This is demonstrated by the simple example of rendering a checkerboard.

The checkerboard image 620 displayed in FIG. 33 was uniformly sampled with one sample placed in the center of every pixel and a resolution of 512×512. So the sample pattern represents a regular grid, such as the grid 670 shown in FIG. 35A. In terms of the sampling theorem, this means that we have a sampling frequency of 1/p, where p stands for the space between two pixels. In order to meet the sampling theorem 1/p should be twice as high as the cutoff frequency in the signal. But since the checkerboard provides many sharp edges, the problem arises of having a signal with compact support in signal space which cannot simultaneously have a compact support in frequency space. This means that the signal cannot be band-limited, thereby featuring increasingly high frequencies. Hence there are frequencies >1/p which cannot be represented directly and which turn into aliases, as shown in FIG. 33. In the following discussion, there are described various techniques for anti-aliasing by comparing different sampling and filtering schemes.

As discussed above, the majority of cases feature $$\frac{1}{\Delta x} \leq \omega_0,$$

because typically signals of finite width need to be handled in computer graphics. Generating a synthetic image, it is necessary to somehow determine one single color for each pixel. One approach for reconstructing $f(x)$ as exactly as possible is to compute the area of all the polygon fragments visible in the pixel $x_p$ analytically and to average their colors according to the resulting area proportion. However, this approach has proven to be expensive to calculate or, in some cases, impossible due to a missing analytic expression of the visible area. Hence, an alternative approach is to use a numerical solution. This can be done by choosing a number of sampling points N per pixel and estimating the area of the polygon fragments in $x_p$ from these samples. Since the samples are taken at a higher frequency than once per pixel, the described sampling is referred to herein as "supersampling." One common supersampling scheme is to use an n×n grid as sampling pattern within each pixel and average the samples to one value by weighting them appropriately. This can by described by the "pixel integral"

$$(f \cdot \tilde{s} * \tilde{r})(x_p) = \int_{-\infty}^{\infty} f(x) \left( \frac{1}{N} \sum_{i=0}^{N-1} \delta(x - x_i) \right) dx$$

$$= \frac{1}{N} \sum_{i=0}^{N-1} \int_{-\infty}^{\infty} f(x) \delta(x - x_i) dx$$

$$= \frac{1}{N} \sum_{i=0}^{N-1} f(x_i),$$

where in this case the sampling function $\tilde{s}$ represents the fine uniform grid and the reconstruction filter $\tilde{r}$ weights each sample equally with 1/N.

Taking a close look at the one-dimensional case reveals what happens during supersampling. Let $$s(x) = \sum_{k=-\infty}^{\infty} \delta(x - kp)$$

be the sampling function which takes one sample in the center of each pixel with p being the distance between pixel centers. According to the sampling theorem, any energy above the frequency 1/2p cannot be represented properly in the reconstructed signal and will therefore result in aliasing. Taking N samples per pixel means to apply the sampling function $$\tilde{s} = \sum_{k=-\infty}^{\infty} \delta\left(x - k\frac{p}{N}\right)$$

with the sampling frequency N/p. According to the sampling theorem, the new Nyquist frequency is N/2p. As only one color can be displayed at each pixel, it is necessary to reconstruct the supersampled signal with a perfect low-pass filter $\tilde{R}(\omega)$ with cutoff frequency N/2p. Before resampling the reconstructed signal at pixel rate, a low-pass filter is applied to prevent new aliasing. In order to obtain a correctly band-limited signal with respect to the pixel raster, a low-pass filter $G(\omega)$ is chosen with cutoff frequency 1/2p. It is now possible to resample the resulting signal at pixel rate and recover it by the display reconstruction filter. As already mentioned, any energy above 1/2p turns into aliases, when the image function is sampled only at pixel rate. The effect of supersampling with sampling frequency N/p along with the subsequent reconstruction and low-pass filtering is that any energy below N/2p is prevented from turning into aliases. Hence energy from the range $$\frac{1}{2p} < \omega < \frac{N}{2p}$$

which contributed to aliasing before, has been treated correctly in the supersampled image. As $\tilde{R}(\omega)G(\omega) = \tilde{R}(\omega)$ by construction, the reconstruction filter $\tilde{R}(\omega)$ usually is not applied in practice. Instead, only a low-pass filter is deployed. It is important to keep in mind that the perfect reconstruction filter in time space is given by the sinc-function having an infinite support. Hence we have to work with approximations like box-, Gauss- or truncated sinc-filters which may introduce new reconstruction errors.

Up to now the classical tensor product approach has been used in order to solve the pixel integral. Each pixel is sampled by an n×n grid. Looking more deeply at such a sample pattern, it is very likely for the n×n sampling points to behave as just n. The sampling grid 630 shown in FIG. 34 demonstrates that it would have been sufficient to sample with only 4 points, one in each horizontal scanline, instead of 16 points. Another disadvantage of the supersampling method described above is that the rendering time increases quadratically with n. Alternatively the sampling points could be placed randomly in every pixel. This approach is known as "stochastic supersampling." The following section analyzes one possible random sampling pattern, which is based on independent, identically distributed (i.i.d.) (pseudo) random numbers.

One important property of such random sampling patterns is that they turn highly structured aliasing artifacts into noise. Since the human eye is less sensitive to noise than to aliasing, the resulting image will look better, though still containing errors. Care has to be taken if the noise is of low frequency because this will result in more structured artifacts. By using i.i.d. random numbers for integration, the expected value of each pixel color is computed. Hence we evaluate the pixel integral simultaneously for all pixels by means of the parametric Monte Carlo method, described above. In addition to the random sampling distributions, the following section also presents two quasi-Monte Carlo point sets, namely Larcher-Pillichshammer points and rank-1 lattices, which are of special interest for anti-aliasing. Further below, these sampling patterns are used to compute anti-aliased images of the checkerboard 620 in FIG. 33 and compare their convergence according to the error norms introduced below.

As already mentioned, boundary edges, texture discontinuities, and the like, cause high frequencies in the synthetic images to be rendered. Thus, it is typically necessary to deal with signals not being band-limited. Prefiltering the input data would allow band-limited signals to be obtained. Thus, the sampling theory, as discussed above, could be implemented in a straightforward way. But complex geometry, textures, shading models, motion blur, and the like, make prefiltering hardly possible. Hence most rendering systems reduce aliasing artifacts by means of supersampling.

The basic test pattern used herein is given by the regular grid with one or n×m samples within each pixel. This sampling pattern has already been discussed in detail above, since the sampling theory is based on the uniform grid. Taking one sample in the center of each pixel generally introduces aliasing. Also, using an n×n grid per pixel cannot avoid aliasing in the case of a signal being not band-limited. But this sampling scheme is easy to implement, as shown in the code listing set forth in Section 4.2.1 of the Appendix. Furthermore it can efficiently be realized in graphics hardware by means of the accumulation buffer which integrates every pixel at the same time. But since n points are needed in each dimension, the complexity of the tensor product quadrature increases quadratically with the number of samples in the two-dimensional case. In other words, the number of samples and the convergence rate depend on the dimension, which is known as the "curse of dimension."

"Jittered grid" sampling is one technique to reduce the variance of the Monte Carlo estimator. This technique includes breaking down the unit cube, for s=2, into n strata (subdomains) of equal size and taking one random sample inside each subdomain. An example of this technique is illustrated by the grids 640 and 650 shown in FIGS. 35A and 35B. For that purpose the number n of strata has to be factorized which means that not any choice of n yields a good division of $I^s$. Due to the stratification, the samples cannot clump together in one place, as might happen for purely random samples. Therefore, the uniform distribution of the samples is improved over the whole unit cube. Section 4.2.2 of the Appendix sets forth the source code to generate a pattern with n×m samples within the unit cube. Moreover jittering trades aliasing artifacts for noise, which can easily be seen in the one-dimensional case.

The Larcher-Pillichshammer point set forms a (0, m, 2)-net in base b=2. This means that it consists of a point set of $n=2^m$ points of low discrepancy and every elementary interval of volume $2^{-m}$ contains exactly one point, as discussed above. This sample pattern is based on the Larcher-Pillichshammer radical inverse function, which is a (0, 1)-sequence in base b=2. For t>0, an infinite point sequence is defined to be a (t, s)-sequence in base b, if $\forall k \geq 0$ and $m \geq t$ the vectors $x_{kb^m+1}, \ldots, x_{(k+1)b^m} \in I^s$ form a (t, m, s)-net. The Larcher-Pillichshammer radical inverse function is calculated by the code listing set forth in section 4.2.3 of the Appendix. Adding the component $i/b^m$ to the first $b^m$ points of a (t, s)-sequence in base b yields a (t, m, s+1)-net. In our case a (0, m, 2)-net is extended from the Larcher-Pillichshammer radical inverse function by adding the component 1/n, with n=2m. This is shown in the code listing set forth in section 4.2.4 of the Appendix.

As a further quasi-Monte-Carlo sampling pattern, the max-min-dist lattices described above are applied. In contrast to stratification, where a factorization of n is required, there is no restriction to the sampling rate, since rank-1 lattices can be generated for any number of points. Since there is interest both in pixel sampling and in sampling the whole screen, use is also made of the shifted lattices described above. As lattice parameters, the results are used from the above lattice search techniques. The code listing set forth in section 4.2.5 of the Appendix creates both max-min-dist and shifted lattices. In the case of max-min-dist lattices the parameters for the x and y-resolution have to be set to 1. Moreover, shiftX and shiftY must be zero.

So far, sampling patterns for Monte Carlo and quasi-Monte Carlo integration have been presented. The combination of these two techniques yields the so-called randomized quasi-Monte Carlo integration. This technique provides an unbiased estimator for all square-integrable functions and is almost as fast as the traditional quasi-Monte Carlo integration. The random digit scrambling randomizes a (t, m, s)-net in such a way, that the randomized point set keeps its net properties and is uniformly distributed on $[0, 1)^s$. In the two-dimensional case the unit square is divided into b equal volumes for one coordinate axis. These volumes are permutated with one random permutation on each level of recursion. Then the division and permutation steps are recursively repeated for each volume with the whole procedure being performed for the x- and y-coordinate axis. Section 4.2.3 of the Appendix sets forth a code listing of an efficient implementation of the described technique. If the parameter r is given by a random integer, the point set is randomized by the XOR-operation. The randomized Larcher-Pillichshammer point set is generated by the code listing set forth in the code listing in section 4.2.6 of the Appendix. The lattice patterns of code listing § 4.2.5 are randomized by simply adding a random shift modulo 1 to each lattice point, i.e., $$\tilde{x}_i = (x_i + \xi) \bmod 1, \text{ for all } 0 \leq i < n.$$

Section 4.2.7 of the Appendix sets forth a code listing for performing the described operation. Further below, these sampling patterns are compared with respect to their convergence.

In order to analyze the convergence of the test patterns, two error norms will be used, namely the $L_p$- and the $H_1$-norm. The $L_p$-norm of a gray-scale image $f(x, y)$ is calculated in the following way:

$$\|f(x, y)\|_p = \sqrt[p]{\sum_{i=0}^{ResX-1} \sum_{j=0}^{ResY-1} |f(i, j)|^p}$$

For example p=1 yields the 1-norm $$\|f(x, y)\|_1 = \sum_{i=0}^{ResX-1} \sum_{j=0}^{ResY-1} |f(i, j)|$$

p=2, the $L_2$ norm (Euclidean norm)

$$\|f(x, y)\|_2 = \sqrt{\sum_{i=0}^{ResX-1} \sum_{j=0}^{ResY-1} f(i, j)^2}$$

and p=∞, the infinity norm $$\|f(x,y)\|_\infty = \max_{0 \leq i < ResX-1, 0 \leq j < ResY-1} |f(i,j)|.$$

By adding the energy of the derivatives, the $H_1$-Sobolev norm additionally takes into account noise and the edges of an image.

$$\|f(x, y)\|_{H_1} = \sqrt{\sum_{i=0}^{ResX-1} \sum_{j=0}^{ResY-1} (f(i, j)^2 + \|\nabla f(i, j)\|_2^2)}$$

The evaluation is done by computing the error norm of a converged reference image to the corresponding test image. The resulting values are then plotted in an error graph with the number of samples on the x-axis and the error norm on the y-axis.

There is now provided a comparison of test patterns presented above with respect to their convergence. The sampling patterns are applied per pixel and over the whole quadratic screen, respectively. The test scene consists of an infinitely expanded checkerboard, as seen in FIG. 33. It is generated by a simple ray caster. According to the sample pattern, for each pixel n rays are shot from the camera to determine the nearest intersection point. If there is intersection of the ray with the checkerboard represented by an infinite plane, the color is determined by adding the x- and the z-coordinate of the hit point. In the case of the sum modulo 2 being zero, 0.75 returned as color value, 0.25 otherwise. The box filter is as a reconstruction filter throughout the present examples. Since this filter is only a coarse approximation of the sinc-function, being the ideal reconstruction filter in time space as discussed above, it should be borne in mind that reconstruction errors may be introduced.

As indicated above, the test patterns are compared by means of an error graph. For an increasing number of sampling points per pixel an error norm of a reference image to a test image is calculated. Then the resulting value is diagrammed in the error graph, thus displaying the number of samples on the x- and the error norm on the y-axis. Thereby both axes are scaled logarithmically. A reference image was computed by applying a jittered grid sampling pattern with 256×256 samples at each pixel. The image still contained aliasing artifacts. This can partly be explained by the choice of the reconstruction filter. But on the other hand, the situation would not change much by still increasing the number of samples per pixel. The reference image thus converged to an incorrect image. This is due to the fact that the wrong integral has been computed, even if the integration was performed analytically.

Walking towards the horizon of the checkerboard, the single cells of the checkerboard become smaller and smaller. Therefore many small cells fall within one pixel near the horizon. Integrating over the pixel, the result is expected to be half gray. But since the black and white, or rather, dark gray and light gray cells do not necessarily cover the same area in one pixel, one color might outweigh the other one. It is important to keep these considerations in mind when comparing the different test patterns.

First, test patterns are applied for each pixel, including: uniform, jittered grid, max-min-dist lattice, randomized lattice, Larcher-Pillichshammer, and randomized Larcher-Pillichshammer. For each pixel, n rays are shot from the camera into the screen and the resulting color values are averaged by means of the box filter. Then, the randomized sampling patterns have to be recreated for each pixel. Taking a look at the curve of the $H_1$ error-norm, it was found that the uniform grid delivers the worst result. Since the edges of the checkerboard cells introduce very high frequencies into the image signal, the checkerboard is not band-limited. Additionally, structure in the signal combines with structure in the sampling points, when a regular pattern is used for sampling. This explains the aliasing artifacts and thus the high error norm. Increasing the number of samples only attenuates aliasing, as discussed above.

Jittered grid sampling produces much better results. This can be explained by examining its Fourier transform. There is a spike at the origin with a small "clear zone" around. Thus, the high frequencies are attenuated. Moreover, the disturbing aliasing artifacts are mostly turned into noise. Although the initial error norm for the max-min-dist lattices almost equals the value of uniform and jittered grid, the error declines very fast for an increasing number of samples. It can also be seen that the error curve of the Larcher-Pillichshammer sampling pattern and the max-min-dist lattice nearly coincide and converge to the same value. These two point sets share the important property of having a low discrepancy. In fact their discrepancy is much smaller than the discrepancy of the regular and jittered grid with the sampling points being much better uniformly distributed.

However, it is important to notice that gcd(n, a)=1 holds true for max-min-dist lattices. Comparing these kinds of lattices with those where n is not necessarily relative prime to a, i.e., gcd(n, a)=1 is not checked for in the search algorithm, reveals that the latter deliver worse results. This might be due to the fact that the relative prime property guarantees perfect low dimensional projections of the lattice points thus providing Latin hypercube properties.

Turning to the randomized quasi-Monte Carlo points, it will be seen that both the randomized lattices and the randomized Larcher-Pillichshammer sampling pattern have a smaller initial error than their deterministic counterparts. But it has been found that the error curves quickly nearly coincide. Also, both of the randomized point sets behave very similarly with respect to their error norm. However, it has been found that the randomized Larcher-Pillichshammer points achieve slightly better results than the randomized max-min-dist lattices. Though the deterministic and randomized point sets hardly differ with respect to their convergence, the images generated by these patterns distinguish from each other with respect to their visual appearance, particularly for smaller sampling rates (<32). For n≧32 the deterministic and randomized quasi-Monte-Carlo sampling patterns deliver the same results, i.e., they converge to the same image.

Next, the (randomized) max-min-dist lattices and Larcher-Pillichshammer points are used over the whole quadratic screen (xRes=yRes), i.e., these sampling patterns are scaled from $[0, 1)^2$ to $[0, xRes) \times [0, yRes)$. To obtain a certain number n of samples per pixel, the number of sampling points has to be chosen as xRes·yRes·n. The test images are created similar to the above scheme. But instead of calling the sampling method for each pixel and looping over the sampling points within that method, all sampling points are looped over once, and it is decided for each point which pixel it belongs to. Thereupon one buffer accumulates the color values and another buffer stores the number of hits for each pixel. After processing all of the sampling points these two buffers are used to average the color values for each pixel in the sense of a box reconstruction filter.

Comparing an error graph with one sampling pattern per pixel with an error graph for the whole screen, it will be seen that the overall error of the latter highly exceeds the first and also converges on a higher level. When the deterministic sampling patterns are applied on pixel basis, neighboring pixels are sampled the same way. The randomization of the max-min-dist lattices brings about a random shift of the lattice pattern within each pixel. The pattern itself stays the same, i.e., every pixel is sampled with the same, but randomly shifted lattice. By using one pattern over the whole screen, this correlation disappears. Thus, each pixel is sampled by different points, which do not necessarily cover the pixel in a uniform way. This makes the image quite noisy, especially for low sampling rates. Considering the randomized Larcher-Pillichshammer points, applied per pixel, it should be remembered that the chosen randomization keeps the net structure of the points. Hence, neighboring pixels are still uniformly sampled. If the randomized Larcher-Pillichshammer points are scaled to the whole screen, this does not apply anymore. This is mostly notable at the edges which get very noisy.

Though sampling the whole screen, the number n of sampling points per pixel is still of interest. It has already been mentioned that xRes·yRes·n samples have to be generated in order to obtain n samples within each pixel. Since the Larcher-Pillichshammer pattern for $n=2^m$ points represents a (0, m, 2)-net in base b=2, the screen resolution must be chosen as a power of 2. If the number of sampling points equals xRes·yRes·n=$2^m$ for n=1, each pixel can be taken as an elementary interval of volume $$b^{-m} = 2^{-m} = \frac{1}{xRes} \cdot \frac{1}{yRes}.$$

For n>1, each pixel contains n elementary intervals of volume $$\frac{1}{xRes} \cdot \frac{1}{yRes} \cdot \frac{1}{n}.$$

So each pixel is sampled by the same number of points. But this does not need to be the case for the max-min-dist lattices, discussed above, and illustrated in the graphs 720 and 730 shown in FIGS. 39A and 39B, which show the first 5×5 pixels of a screen with a resolution of 512×512 covered by the max-min-dist lattice L(262144, 549) in graph 720 and the shifted lattice L(262144, 549) with shift (259, 0) in graph 730. As some pixels contain two points and some only one point there must be pixels not being sampled at all for n=512·512 points in total. Hence xRes·xRes·n sampling points for a resolution of xRes×yRes means only that there are n points per pixel on the average. This provides a motivation to search for shifted lattices, which guarantee the same number of lattice points per pixel, as discussed above. Comparing the resulting checkerboard for the lattice L(262144, 37303) with valid shift $(259, 0) \subset [0, n)^2$, generated by the code listing in section 2.1.4 in the Appendix, the shifted lattice seems to be superior to the pure max-min-dist lattice. But it has been found that the shifted lattices converge much worse than the pure max-min-dist lattices being only inferior for a number of xRes·yRes·1 sampling points. Thus, the checkerboard generated with the shifted lattice L(1048576, 10235) contains more aliasing artifacts than the one generated by sampling the whole screen with the max-min-dist lattice L(10488576, 33919). This might be due to the fact that the shifted lattices are not ideal in the sense of maximum minimum distance, since the first lattice is picked out that provides a valid shift whose min-dist very probably does not equal the maximal possible minimum distance, as discussed above. Therefore only the pure max-min-dist lattices were used for comparison.

In the case of sampling the whole screen it has been noticed that the error curves of the deterministic and randomized sampling pattern completely coincide apart from the initial value of the randomized max-min-dist lattice. As a random shift only has an effect within a lattice cell, i.e., the shift effectively is contained in the fundamental parallelepiped, it only makes a small contribution with respect to the whole lattice thus inducing just a small level of noise to the image. But since the images are quite noisy anyway, as indicated above, the additional noise due to the randomization hardly attracts attention.

At lower sampling rates, the max-min-dist lattices produce much more aliasing than the Larcher-Pillichshammer points. As the rank-1 lattices are in fact uniform, i.e., regular or rather periodic sampling patterns in contrast to the Larcher-Pillichshammer points, structure in the pattern may regularly sample the high frequencies near the horizon and thus create new structure, visible as aliasing. Therefore the Larcher-Pillichshammer points perform slightly better anti-aliasing than the max-min-dist lattices in the limit.

Up to now, the convergence of the test patterns has been evaluated via the $H_1$-norm. The $L_2$-norm could have been chosen instead. The $L_2$-norm delivers very similar results, but on a lower error level, because it does not reflect the energy of the edges. Altogether the test patterns converge to the reference image, which in fact represents the numerical approximation of the wrong integral. However, there has to be taken into account not using an ideal reconstruction filter. The Larcher-Pillichshammer and max-min-dist sampling patterns show the fastest convergence rate, with the first outperforming the latter.

5. ADAPTIVE REFINEMENT AND FILTERING BY RANK-1 LATTICES

Figure 40:
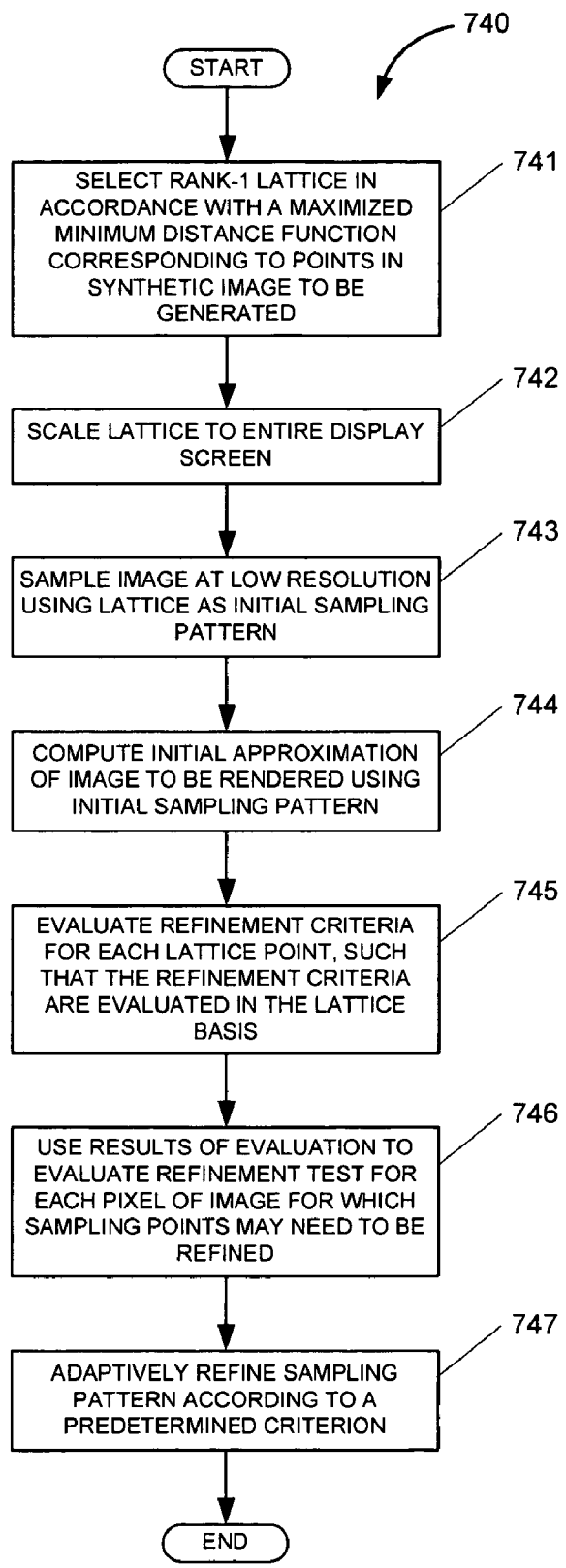
FIG. 40 shows a method for adaptive refinement by rank-1 lattices according to a further aspect of the invention.

There are now described techniques for adaptive refinement and filtering by Rank-1 lattices. FIG. 40 shows a flowchart of a method 740 according to this aspect of the invention. In step 741, a rank-1 lattice is selected in accordance with a maximized minimum distance function corresponding to points in a synthetic image to be generated. In step 742, the lattice is scaled to the entire display screen. In step 743, the image is sampled at low resolution using the lattice as the initial sampling pattern. In step 744, an initial approximation of the image to be rendered is computed using the initial sampling pattern. In step 745, refinement criteria are evaluated for each lattice point, such that the refinement criteria are evaluated in the lattice basis. In step 746, the results of the evaluation are used to evaluate the refinement test for each pixel of the image for which sampling points may need to be refined. In step 747, the sampling pattern is adaptively refined according to a predetermined criterion.

In the immediately preceding discussion, rank-1 lattices providing maximum minimum distance were used for image synthesis by sampling the whole screen. Considering the resulting images, it can be observed that near the camera there are large areas where the single pixels are completely covered by a light or dark gray checkerboard cell, whereas near the horizon many checkerboard cells fall within one pixel. Generalizing, there are many signals in computer graphics containing large regions of constant or slowly changing value. Consequently, in such regions a good approximation of the image to be rendered can be obtained by just using a smaller number of samples. On the other hand, some regions feature sharp edges and changes in value, as it is the case near the horizon of the checkerboard. In such complex regions the sampling rate has to be increased in order to restrict aliasing. This can be accomplished by first sampling the corresponding signal at a low resolution by an "initial sampling pattern" which is "adaptively refined" according to some criteria.

To determine the complex regions requiring a higher sampling rate, a nearby set of samples, the so-called "refinement test geometry," is evaluated with respect to some refinement test which typically tries to estimate the local bandwidth of the signal. Generally, refinement tests can be divided into image space and object space criteria. Image based refinement tests are based on local intensity values of the image. In the simplest form the intensity of the samples in the refinement test geometry are compared. In another test, the maximum and minimum intensity value of four samples forming a small square are compared, suggesting refinement if the difference exceeds a user-defined threshold. Further tests involve, for example, the local contrast or intensity statistics. There are also some object-based refinement tests, which include additional information about the objects in the scene by characterizing every sample as a ray intersecting a particular object or the bounding box which encloses the whole scene. If the refinement test suggests that more samples are needed, the algorithm refines the sampling pattern by generating new sampling points. Some strategies have been developed for placing the new samples, the simplest of which consisting in a random refinement pattern. Usually this cycle of examination and refinement is repeated until the pre-defined criteria are met.

An aspect of the present invention provides a method for adaptive refinement by rank-1 lattices is developed. As an initial sampling pattern, a maximum minimum distance rank-1 lattice is scaled to the whole screen. Typically an initial approximation of the image to be rendered is computed by means of the initial sampling pattern in a first pass. Then the refinement test is evaluated for each pixel, for which the sampling points possibly need to be refined. Since we sample the whole screen, we cannot directly tell for an arbitrary pixel (x, y), which lattice points belong to it. Therefore the refinement criteria are not applied for each pixel, but for each lattice point, i.e., the corresponding criteria are evaluated in the lattice basis. Hence the first rendering pass consists in calculating the image in a lattice point buffer, which means that for each sampling point the result of shooting a ray from the camera into the scene is stored at the corresponding location in the buffer.

Let n be the number of sampling points. Choosing the point buffer as a float array of size n, the resulting value for a sampling point $$\left(\frac{i}{n} \cdot ResX, \left(\frac{a \cdot i}{n} \bmod 1\right) \cdot ResY\right)$$

is stored at position buf[i], which conversely makes it easy to identify the intensity associated to an arbitrary lattice point $$x_i = \left(\frac{i}{n} \cdot ResX, \left(\frac{a \cdot i}{n} \bmod 1\right) \cdot ResY\right), 0 \le i < n$$

by the index i. Three possible refinement criteria used in the code listing set forth in section 4.3.2 of the Appendix comprise a comparison of the following:

the local variation of the function $f(x_1,x_2)$ for the interval $A=[a_1,b_1]\times[a_2,b_2]$ formed by the corners of the lattice cell $\{x+\Lambda\}$ (see section 1.2):

$$V^2(f, A) = \left| \sum_{j_1=0}^{1} \sum_{j_2=0}^{1} (-1)^{\sum_{k=1}^{1} f} \atop (j_1 a_1 + (1-j_1)b_1, j_2 a_2 + (1-j_2)b_2) \right|$$

$$= |f(x) - f(x+b_1) + f(x+b_1+b_2) - f(x+b_2)| > T,$$

the difference of the supremum and infimum of the function for the corners of the lattice cell $\{x+\Lambda\}$ $\sup_{z\in M} f(z) - \inf_{z\in M} f(z) > T, M=\{x, x+b_1, x+b_1+b_2, x+b_2\}$ or the gradient $\|\nabla f(x)\|_2^2 > T$ computed by the central difference or rather the $H_1$ norm against a threshold T.

Figure 41:
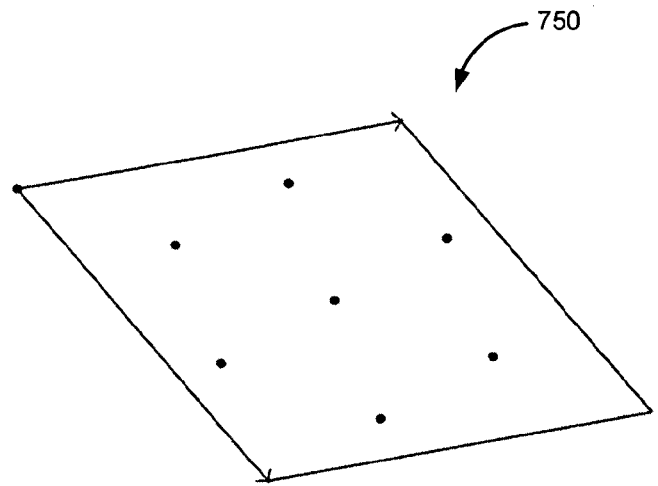
FIG. 41 shows a max-min-dist lattice L(8,5) determined in the sheared basis of the lattice L(1048576, 33919).

Assuming that for an arbitrary sampling point $x_i$ the refinement test indicates to refine the sampling pattern, i.e., the refinement test exceeds a predefined threshold, the refinement pattern is chosen as a further maximum minimum distance rank-1 lattice by exploiting the lattice cell structure of the initial sampling pattern. This means that the refinement pattern is identified by determining a maximum minimum rank-1 lattice L(m, a) within the lattice cell $\{x_i+\Lambda\}$ belonging to $x_i$. Thereby m represents the number of additional samples being added to the initial sampling pattern. This is illustrated by the lattice 750 shown in FIG. 41. As the refinement pattern depends on the basis of the initial sampling pattern, i.e., the initial rank-1 lattice, the lattice L(m, a) has to be searched in a sheared basis.

Therefore, similar to the code listing set forth in section 2.1.2 of the Appendix, the search is performed on $[0, m)^2$ by accounting for the actual region by means of a weighted norm. For that purpose, as discussed above, a lattice point $$\tilde{x}_i = \begin{cases} (i, a \cdot i) \bmod n & \text{if } i \le n - i \text{ and } a \cdot i \le n - a \cdot i \bmod n \\ (i, a \cdot i - n) \bmod n & \text{if } i \le n - i \text{ and } a \cdot i > n - a \cdot i \bmod n \\ (i - n, a \cdot i) \bmod n & \text{if } i > n - i \text{ and } a \cdot i \le n - a \cdot i \bmod n \\ (i - n, a \cdot i - n) \bmod n & \text{if } i > n - i \text{ and } a \cdot i > n - a \cdot i \bmod n \end{cases}$$

has to be transformed into the basis $B=(b_1\ b_2)$, $$\text{with } b_1 = \begin{pmatrix} b_{11} \\ b_{12} \end{pmatrix} \text{ and } b_2 = \begin{pmatrix} b_{21} \\ b_{22} \end{pmatrix}$$

of the initial maximum minimum rank-1 lattice before computing the distance to the origin. For an arbitrary point $(x, y)$ the transformation is given by $$\begin{pmatrix} u \\ v \end{pmatrix} = \begin{pmatrix} xb_{22} - yb_{21} \\ yb_{11} - xb_{12} \end{pmatrix} \cdot \frac{1}{b_{11}b_{22} - b_{21}b_{b12}}.$$

Therefore the weighted norm of the point $(x, y)$ is computed by $$\left\| \begin{pmatrix} x \\ y \end{pmatrix} \right\|_{weighted\ norm} = \left\| \begin{pmatrix} u \\ v \end{pmatrix} \right\|_2^2 = \left( \frac{xb_{22} - yb_{21}}{b_{11}b_{22} - b_{21}b_{b12}} \right)^2 + \left( \frac{yb_{11} - xb_{12}}{b_{11}b_{22} - b_{21}b_{b12}} \right)^2.$$

$$b_1 = \begin{pmatrix} \lambda_x \\ 0 \end{pmatrix} \text{ and } b_2 = \begin{pmatrix} 0 \\ \lambda_x \end{pmatrix}$$

account for a rectangular region yielding the result discussed above.

Since the basis vectors can also take negative values, it is not sufficient to exchange the weighted norm of the § 2.1.2 code with the more general weighted norm of the above equation. The algorithm has to be adapted to long long integers instead, also influencing the overflow test. But as squares are being computed, the absolute values of u and v can be taken. Therefore only the MAXOP in the overflow test has to be set to $\sqrt{\text{MAXNUM\_LLI}}=0\text{xB504F333}$. This is shown in the code listing set forth in section 4.3.1 of the Appendix.

Figure 42:
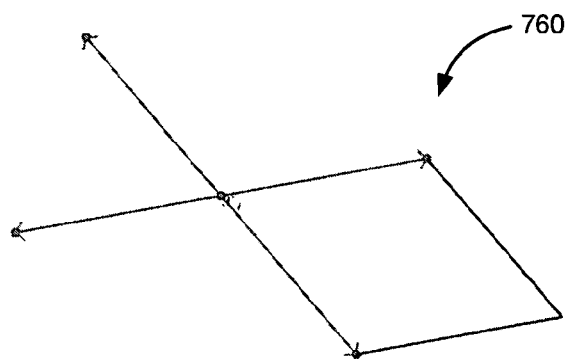
FIG. 42 shows a refinement geometry for a gradient criterion.
Figure 43:
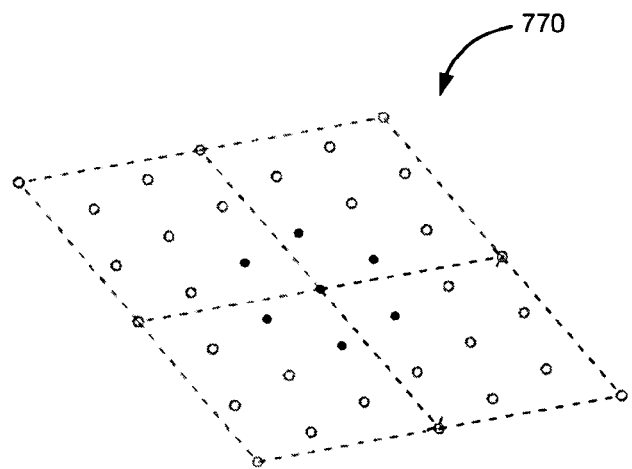
FIG. 43 shows a placement diagram of a refinement max-min-dist lattice for a gradient criterion.

The refinement criteria described above imply how to place the refinement max-min-dist lattice. All three cases being in fact recursive Korobov-filters have in common that the lattice point with the index j=0 is discarded as it coincides with the anchor point $x_i$. In the first two cases the refinement test geometry consists of the four corners of the lattice cell $\{x_i + \Lambda\}$ anchored at the corresponding sampling point $x_i$. Therefore, the refinement pattern is placed within exactly that lattice cell, as illustrated by the lattice 750 in FIG. 41. Using the gradient criterion, the refinement test geometry is given by $\{x, x+b_1, x+b_2, x-b_1, x-b_1\}$ being shown in the refinement geometry 760 shown in FIG. 42 for the point $x_i$. Here the refinement pattern is anchored at the point $$x - \frac{1}{2}b_1 - \frac{1}{2}x$$

so that the lattice points of the refinement pattern are centered around x. The placement of the refinement max-min-dist lattice for the gradient criterion is illustrated by the lattice 770 shown in FIG. 43. One special case of this principle is represented by the so-called "$\sqrt{5}$ sampling scheme" which makes use of a hierarchy of uniform grids scaled by a factor $1/\sqrt{5}$ and rotated by an angle of arctan 1/2. Whereas this sampling technique recursively operates in object space, it has been adapted to an iterative computation of the point samples in image space.

Section 4.3.2 of the Appendix shows a code listing that implements the described method for adaptive refinement by rank-1 lattices for one level of refinement. As arguments, it takes the initial sampling pattern, the initial max-min-dist lattice (lattice, not scaled to screen resolution) and the refinement pattern (refLattice), whose parameters are pre-computed by an initialization method. In a first loop for each point of the initial sampling pattern an intensity value is stored in the point buffer by shooting a ray into the scene. In a second pass for each sampling point the selected refinement criterion is evaluated, generating new samples if the resulting value exceeds a predefined threshold. These samples are added to a copy of the initial sampling pattern. As only one level of refinement is considered no special care has to be taken in order to omit those samples that have already been created in a coarser level. After iterating over all points of the initial maximum minimum distance rank-1 lattice, the refined sampling pattern is used to compute the final image in image space.

In order to evaluate the refinement criteria, the values of the points belonging to the refinement geometry are accessed from the point buffer via their x-coordinate. This yields the source code implementation shown in Sections 4.3.1.1, 4.3.1.2, and 4.3.1.3 of the Appendix, where x represents the actual sampling point and $(b_{1x}, b_{1y})$ and $(b_{2x}, b_{2y})$ are the basis vectors of the initial max-min-dist lattice.

If the corresponding criterion for the lattice point $x_i$ suggests to refine the sampling pattern, the new samples are generated by $$\begin{pmatrix} u_j \\ v_j \end{pmatrix} = \frac{1}{n} \begin{pmatrix} (i + s_1) \cdot ResX \\ (a \cdot i \bmod n + s_2) \cdot ResY \end{pmatrix} +$$
$$\frac{1}{n \cdot m} (j \cdot ResX\ (\tilde{a} \cdot j \bmod m) \cdot ResY) \begin{pmatrix} b_{1r} & b_{2r} \\ b_{1y} & b_{2y} \end{pmatrix},$$

where the initial sampling pattern is characterized by $L(n, a)$ and the refinement pattern is given by $L(m, \tilde{a})$. In the case of centering the refinement pattern around $x_i$ (gradient criterion)

$$s_1 = -\frac{1}{2}b_{1x} - \frac{1}{2}b_{2x}$$

and $$s_2 = -\frac{1}{2}b_{1y} - \frac{1}{2}b_{2y},$$

$$s_1 = 0$$

and $$s_2 = 0$$

otherwise.

This is implemented by the code listing set forth in section 4.3.1.4 of the Appendix. Section 4.3.2 of the Appendix sets forth a code listing illustrating the adaptive refinement technique described herein.

Since the checkerboard scene features only three different intensity values $\{0.25, 0.75, 1.0\}$, a threshold of T=0.25 represents a good choice. Looking at the results of this approach, it has been observed that new aliasing artifacts appear at the horizon. This can be explained by the regular structure of the refinement pattern which tile seamlessly in the "complex" regions of the scene, as it is the case near the horizon of the checkerboard. One possibility to restrict these aliasing effects consists in randomly shifting the lattice points of the refinement pattern within the lattice cell of the initial sampling pattern. Thus neighboring lattice cells are not refined by the same sampling pattern anymore. For example, an image has been computed by using the max-min-dist lattice L(2097152, 193293) scaled to the whole screen. The § 4.3.2 code listing was applied to the image, employing the lattice L(1048576, 33919) as initial sampling pattern and the lattice L(11, 4) shifted randomly within the lattice cell of L(1048576, 33919). As refinement test the variation criterion was applied. After refining, the initial pattern was extended by 679452 to a total number of 1728028 sampling points. Each pixel was sampled by 6.6 points on the average with maximal 48 samples per pixel. Since the sampling rate was increased only in regions featuring sharp changes in value, the quality of the refined image was improved by using a smaller number of sampling points at the same time. However, it should be noted that new aliasing artifacts would have appeared in the resulting image if the refinement pattern had not been shifted randomly.

As discussed above, aliasing is the result of sampling a signal below the Nyquist rate. After sampling, the signal is reconstructed and projected on the medium (TFT, CRT, etc.). Reconstruction errors occur, when the signal is incorrectly recovered from its samples. As we have already seen, the ideal reconstruction filter in time space is given by the sinc-function. However, this function has an infinite support. Therefore approximations like the box, Gauss or triangle filter are used in practice instead.

So far, the discussion has focused on uniform sampling. Since anti-aliasing by non-uniform samples are also examined, it is necessary to consider the non-uniform reconstruction as well. Several approaches have been used, including functional, warping and iteration techniques. The simplest approach is to place a copy of an appropriate reconstruction filter over the resample point, just as in the case of a uniformly sampled signal. This is called local filtering. The filters are designed with regard to some criteria. In the first place they should not attenuate the central copy of the signal spectrum too much. On the other hand they should diminish the influence of additional energy resulting from the spectral replicas as good as possible. Furthermore the reconstruction filters have to be normalized, i.e., $$\int_{supp\, p} p(x)dx = 1,$$

where p(x) is the filter function. In other words, every sample is weighted by the filter, with the total filter response summing up to 1. This means that a weighted integration is performed. In literature several filters have been proposed, like non-uniform cubic B-splines, difference of Gaussians and the Mitchell and Netravali filters.

Based on the Fourier transform of rank-1 lattices the following discussion shows that such lattices act as a filter on the signal to be sampled. There is presented a method for automatically choosing an appropriate B-spline filter depending on a distance parameter. Finally, anti-aliasing on a TFT-screen by means of the ClearType technology is examined.

When generating a synthetic image, a color value has to be determined for each pixel. This is done by calculating the pixel integral. As seen above, a parametric integration is performed $$g(y) = \int_{[0,1]^2} f(x, y)dx \approx \frac{1}{n}\sum_{i=0}^{n-1} f(x_i, y) = Q_N,$$

where g(y) identifies the image function and y parameterizes the pixels in the image.

Let E be the set of functions whose Fourier coefficients decline with increasing frequency. If $f(x, y) \in E$ is integrated by rank-1 lattices, this sampling pattern has a filtering effect on the underlying function, i.e., it filters the high frequencies. This means that there is a small error bound when integrating numerically. The integration error can be expressed by $$\|Q_N - g(y)\| = \left\|\frac{1}{n}\sum_{i=0}^{n-1} f(x_i, y) - \int_{[0,1]^2} f(x, y)dx\right\| \quad (4.12)$$

This error can be computed explicitly by using the Fourier series expansion of $$f(x, y) = \sum_{h \in Z^2} \hat{f}_y(h)e^{2\pi\sqrt{-1}\, h\cdot x}, \quad \text{for all } x \in [0, 1)^2, \quad (4.12)$$

where $$\hat{f}_y(h) = \int_{[0,1]^2} f(x, y)e^{-2\pi\sqrt{-1}\, h\cdot x}$$

represents the Fourier coefficient of f evaluated at h. Inserting the Fourier series expansion of f(x, y) in equation 4.12 yields $$Q_N - g(y) = \frac{1}{n}\sum_{i=0}^{n-1}\sum_{h \in Z^2} \hat{f}_y(h)e^{2\pi\sqrt{-1}\, h\cdot x_i} - \hat{f}_y(0) \quad (4.13)$$

thereby ignoring the norm at the moment. Under the assumption that $$\left\|\sum_{h \in Z^s} |\hat{f}_y(h)|\right\| < \infty$$

the Fourier series expansion of f(x, y) converges absolutely, the order of summation in equation 4.13 can be changed as follows:

$$Q_N - g(y) = \frac{1}{n}\sum_{h \in Z^2} \hat{f}_y(h)\sum_{i=0}^{n-1} e^{2\pi\sqrt{-1}\, h\cdot x_i} - \hat{f}_y(0). \quad (4.14)$$

Now it is possible to exploit the fact that we are dealing with lattices. Recalling that $$z := h \cdot x_i \in \mathbb{Z},$$

if $$h \in L^\perp \text{ for } x_i \in L, 0 \leq i < n$$

and that $$\frac{k}{n} := h \cdot x_i \in \mathbb{Q}, \text{ if } h \notin L^\perp$$

for some integer k, for the inner sum of equation 4.14, then $$\sum_{i=0}^{n-1} e^{2\pi\sqrt{-1}\, h x_i} =$$

$$\begin{cases}
\sum_{i=0}^{n-1} e^{2\pi\sqrt{-1}\, h \frac{k}{n}} = \dfrac{\left(e^{2\pi\sqrt{-1}\frac{k}{n}}\right)^n - 1}{e^{2\pi\sqrt{-1}\frac{k}{n}} - 1} & \text{if } h \notin L^\perp \\
\qquad = \dfrac{\left(e^{2\pi\sqrt{-1}\frac{n}{a}}\right)^k - 1}{e^{2\pi\sqrt{-1}\frac{k}{n}} - 1} \\
\qquad = \dfrac{1^k - 1}{e^{2\pi\sqrt{-1}\frac{k}{n}} - 1} \\
\qquad = 0 \\
\sum_{i=0}^{n-1} e^{2\pi\sqrt{-1}\cdot z} = \sum_{i=0}^{n-1} (\cos(2\pi z) + \sqrt{-1}\sin(2\pi z) + & \text{if } h \in L^\perp \\
\qquad \sqrt{-1}\sin(2\pi z) \\
\qquad = \sum_{i=0}^{n-1} \left(1 + \sqrt{-1}\cdot 0\right) \\
\qquad = n
\end{cases}$$

Therefore the integration error is computed as $$Q_a - g(y) = \frac{1}{n}\hat{f}_y(0)\cdot n + \frac{1}{n}\sum_{0\neq h\in L^\perp}\hat{f}_y(h)\cdot n - \hat{f}_y(0) = \sum_{0\neq h\in L^\perp}\hat{f}_y(h).$$

It will be seen that the error depends only on the Fourier coefficients of $f(x, y)$, evaluated at the points of the dual lattice $L^\perp$. If the Fourier coefficients decrease with increasing h, i.e.

$$\|\hat{f}_y(h)\| \leq \sum_y \frac{c}{(\overline{h}_1 \cdot \overline{h}_2)^a}$$

with $c>0$, $\alpha>1$ and $\overline{h}_j := \max\{1, |h|j\}$, the error is bounded by $$\|Q_n - g(y)\| \leq \sum_y \sum_{0\neq h\in L^\perp} \frac{c}{(\overline{h}_1 \cdot \overline{h}_2)^a}.$$

So the lattices act as filters due to their nice Fourier properties. In combination with a B-spline reconstruction filter, aliasing artifacts are attenuated considerably. In one example, the test function Z:

$$Z: [0, 1)^2 \to [0, 1]$$

$$(x, y) \mapsto \frac{1}{2}(1 + \sin(1600(x^2 + y^2)))$$

was sampled by the max-min-dist lattice L(1048576, 33919) scaled to the whole screen. As reconstruction filters B-spline filters $B_d$ of increasing degree $d \geq 0$ were used.

In a first image the function was reconstructed by a B-spline filter of degree 0, which corresponds to a box filter of 1/2 radius. In a second, third, and fourth images, the filters $B_1$, $B_2$, and $B_3$ were applied. $B_1$ is the triangle filter of pixel radius 1, and $B_2$ corresponds to the quadratic B-spline filter of radius 3/2. $B_3$ is the cubic B-spline filter with a support of 2 pixels (radius). Thus, all of these filters share the property of having a compact support. Depending on the support one sampling point might influence several pixels. Summing up the corresponding weights yielded 1, which means that the energy of one sampling point is completely distributed among those pixels. The higher the degree and accordingly the support of the B-spline filter are, the more the aliasing artifacts are suppressed. But it should also be noted that an increasing support of the filtering kernel also introduces blur into the image.

Looking at the uniformly sampled checkerboard in FIG. 33 it will be seen that aliasing artifacts become more apparent near the horizon. The farther the hit point of a ray with the checkerboard is away from the camera, the more checkerboard cells cover one single pixel. In other words the signal frequency increases towards the horizon. As discussed above, it is not possible to completely get rid of the artifacts by increasing the sampling rate, since on the one hand signals are typically not band-limited and on the other hand the wrong integral may be computed. As the ideal reconstruction filter in time space has an infinite support, it is necessary to carefully choose an appropriate filter approximating the sinc-function, like the triangle, Gauss or B-spline filter, in order to reduce post-aliasing.

In prior approaches, the decision as to which filter to choose has been taken before rendering, i.e., the same reconstruction filter has been applied to each pixel. As stated above, the farther the distance of the camera is, the better should be the approximation to the sinc-filter. Although the aliasing artifacts might get reduced by selecting for example a Gauss-filter of r>0.5 pixel radius, the whole image will be blurred at the same time. This problem can be solved by adapting the filter choice to the level of potential aliasing. This means that for each sampling point, a reconstruction filter is chosen depending on how necessary filtering is, i.e., depending on the length of the ray through the camera to the hit point. Thus, one pixel might get influenced by different filters. As reconstruction filters, the basis B-spline functions of order k are chosen, i.e., of maximum polynomial degree d=k−1, given by the Cox-de-Boor recursion:

$$N_{i,k}(t) = \frac{t-t_i}{t_{i+k}-t_i}N_{i,k-1}(t) + \frac{t_{i+k+1}-t}{t_{i+k+1}-t_{i+1}}N_{i+1,k-1}(t)$$

$$= \frac{t-1}{(i+k)-1}N_{i,k-1(t)} + \frac{(i+k+1)-t}{(i+k+1)-(i+1)}N_{i+1,k-1}(t)$$

$$= \frac{t-1}{k}N_{i,k-1}(t) + \frac{i+k+1-t}{k}N_{i+1,k-1}(t)$$

$$N_{i,0} = \begin{cases} 1 & i \leq t < i+1 \\ 0 & \text{otherwise} \end{cases}$$

In the original definition the parameter i identifies the index of an element $t_i$ of the knot vector. Since we set $t_i$=i, we use uniform B-splines in fact. As mentioned in the last section, these filter functions have a compact support supp $N_{i,k}$=[i, i+k) and completely distribute the contribution of one sampling point among those pixels it influences. Furthermore they have maximum continuity, i.e. they are $C^{k-2}$ continuous. The B-spline functions can be implemented in a straightforward way, as illustrated in the code listing set forth in section 4.4.1 of the Appendix.

Since it is desired to anchor the filter kernel in the center of each pixel, the parameter i in the above process is set to k+1/2, thereby shifting the support from [i, i+k) to [−k/2, k/2). In order to calculate the weight of one sampling point (x, y) by means of a radial, two-dimensional filter kernel, the B-spline basis function is called for $$t = \sqrt{(m+0.5-x)^2+(n+0.5-y)^2},$$

where $0 \leq m <$ ResX and $0 \leq n <$ ResY parameterize the pixels on an integer grid, i.e. (m+0.5, n+0.5) refers to the pixel center. For the weight w of the sampling point (x, y), this means that $$w = getBSplineWeight\left(-\frac{k+1}{2}\sqrt{(m+0.5-x)^2+(n+0.5-y)^2}, k\right). \quad (4.18)$$

where k is the only parameter left to be specified. As image of the test scene is synthesized by shooting rays h(λ)=O+λ$\tilde{\omega}$ where O is the ray origin and $\tilde{\omega}$ is the normalized ray direction, the parameter λ measures the distance from the ray origin along its direction to the plane, i.e., the checkerboard. Hence this parameter t, which results from the ray-plane intersection, can be used as a measure for the degree or rather order of the B-spline to choose. Section 4.4.2 of the Appendix sets forth a source code listing in accordance with the present discussion.

One simple heuristic for the choice of the B-spline degree is given by $\lfloor d(\lambda) \rfloor$, where d(λ)=λ·log(λ)·k, which is illustrated in the graph 780 shown in FIG. 44 for k=0.025. Applying this decision function results in an image being sharp near the camera and blurred near the horizon at the same time, since the approximation of the filter kernel to the sinc-function improves as t increases by also increasing the filter support. Section 4.4.3 of the Appendix provides source code for a filtering scheme in accordance with the present discussion that assumes sampling the whole screen, as discussed above. The source code loops over all sampling points, shooting one ray for each point through the camera into the screen. If the ray intersects the checkerboard, the weight of the sampling point is calculated according to equation 4.18 and the weighted color of the hit point is accumulated in an accumulation buffer (accBuffer). A second buffer (countBuffer) only accumulates the weights. In order to compute the final color for each pixel, the sum of the weighted color values is divided by the sum of the filter weights in the end.

The variable offset in the above algorithm is used to determine the pixels in whose support the corresponding sampling point (x, y) possibly lies. In the case of a radial, two-dimensional filter kernel a sample (x, y) might influence all pixels in the neighborhood $N_{\lfloor supp/2 \rfloor}(\lfloor x \rfloor, \lfloor y \rfloor)$ around the pixel ($\lfloor x \rfloor$, $\lfloor y \rfloor$) which the sample belongs to, with $N_r(x,y)=\{(\tilde{x}, \tilde{y}) | \max\{|\tilde{x}-x|, |\tilde{y}-y|\} \leq r\}$. This is illustrated by the graph 790 shown in FIG. 45, where the central square defines the set of pixels possibly influenced by a sample for both 1-pixel and 1.5-pixel radius of the filter kernel.

As we have seen above, the degree of the filter kernel determines the size of its support, which highly affects the run time of the rendering algorithm. Therefore we bound the degree by a certain constant (which is set to 7 in the code listing in section 4.4.3 of the Appendix). However, both this constant and the computation of the B-spline degree depend on the scene to be rendered.

One disadvantage of the described filtering scheme is that there are no smooth transitions between the filter kernels. This is especially where the different regions representing the filter degree are sharply separated from each other. In order to achieve smooth transitions, the weights of successive filters of degree d and d+1 are linearly interpolated, i.e., $$w=(1-\gamma)w_d+\gamma w_{d+1}. \quad (4.19)$$

Given $\lambda \in \mathbb{R}$, the interpolation parameter $$\gamma = d(\lambda) - \lfloor d(\lambda) \rfloor. \quad (4.20)$$

provides information about how close λ is to the threshold $\lambda_d$ at which the B-spline of degree d is chosen. As γ increases, so does the influence of $w_{d+1}$ by decreasing the influence of $w_d$ at the same time, since λ gets closer to $\lambda_{d+1}$. This is shown illustrated in the graph 800 shown in FIG. 46 for the interpolation between the B-splines of degree 0 and 1. The code listing in section 4.4.4 of the Appendix expands the adaptive filtering scheme of the code listing sets forth in section 4.4.3 by incorporating the interpolation between the filter kernels according to the equations 4.19 and 4.20. The variable offset is again used to determine the neighborhood of pixels in whose support a sample (x, y) lies. Since we interpolate between two filter kernels of degree d and d+1 differing in size with respect to the radius of their support, we have to consider the neighborhoods $$N_{\lfloor \frac{d+1}{2} \rfloor} \text{ and } N_{\lfloor \frac{(d+1)+1}{2} \rfloor}.$$

As the difference between the radius of the two filter kernels just equals $$r_{d+1} - r_d = 0.5,$$

$$N_{\lfloor \frac{d+1}{2} \rfloor} \subseteq N_{\lfloor \frac{(d+1)+1}{2} \rfloor}.$$

Therefore it is sufficient to loop over the neighborhood $$N_{\left\lfloor \frac{(d+1)+1}{2} \right\rfloor},$$

which is accomplished by the two nested for-loops in the code listing set forth in section 4.4.4 of the Appendix. The if-else statement within the two for-loops takes account of the different size of the filter kernels. If $r_d < t \leq r_{d+1}$ the weight w of the sampling point (x, y) is given by $w_{d+1}$, whereas it is necessary to interpolate between $w_d$ and $w_{d+1}$ if $t <= r_d$.

Returning to the checkerboard image, in order to verify that the contribution of one sampling point does not exceed 1, i.e., that the weights for one sample sum to 1, the color in each hit point is set to half gray. Then both the code listings set forth in sections 4.4.4 and 4.4.3 of the Appendix must result in an infinite plane of uniform gray being blurred at the horizon.

There is now discussed ClearType technology as it relates to the present invention. In contrast to a CRT display, where a pixel is assumed to represent a single square, a single pixel of a TFT (thin film transistor) or LCD (liquid crystal display) display consists of three separate "sub-pixels": a red, a green and a blue one. The human eye perceives such a triplet as one pixel. The ClearType technology makes use of those directly addressable subpixels in order to triple the horizontal screen resolution. This means that the horizontal luminance resolution is given by the subpixel resolution, i.e., three times the horizontal screen resolution. However, each subpixel does not only represent a luminance source, but is also characterized by its color. So the luminance resolution is tripled on different color channels. Whereas "traditional" image synthesis supposes that the light for each pixel is emitted from a single spot on the screen, i.e., that the three colors red, green and blue lie on top of each other, ClearType takes into account the different structure of the screen for anti-aliasing. ClearType was introduced as a technique for font anti-aliasing in order to improve the readability of text on patterned displays, such as a LCD screen. A similar technique was already used in the Apple II personal computer in order to double the effective horizontal resolution of the video display. But in contrast to ClearType, this sub-pixel technology composed one single pixel of two sub-pixels, namely a green and a purple one.

Figure 47A:
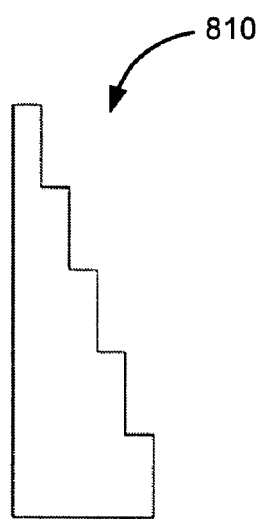
FIG. 47A shows a diagram of a rendering of a sloped diagonal line without knowledge of the sub-pixel structure.
Figure 47B:
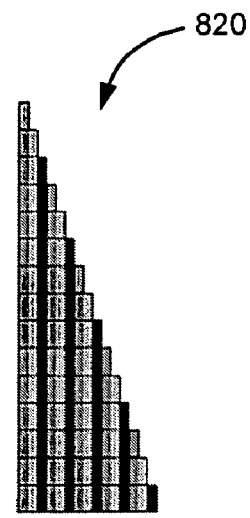
FIG. 47B shows the rendering after tripling the horizontal resolution.
Figure 48:
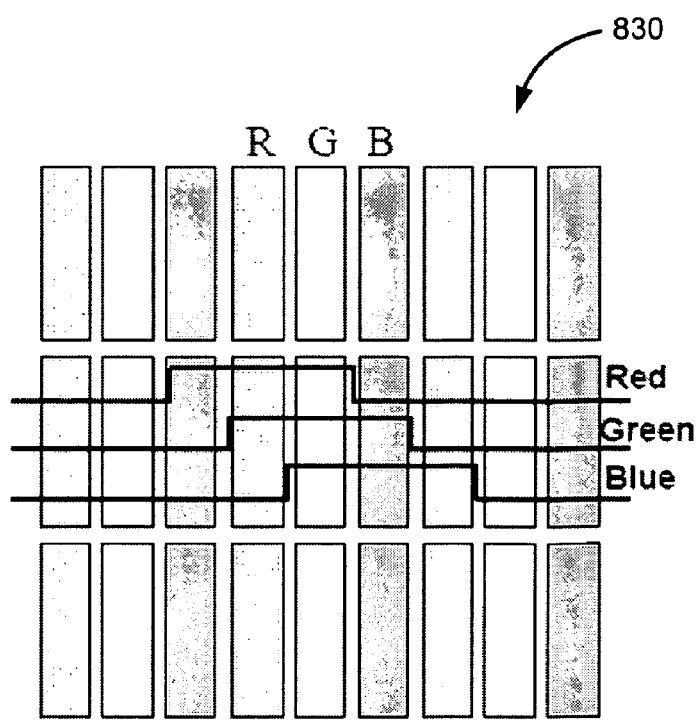
FIG. 48 shows a diagram of an RGB decimation using one-pixel-wide box filters.

"Traditionally," a pixel is either "on" or "off" which is the reason why sloped lines appear quite jagged, as it is the line section 810 shown in FIG. 47A. Standard anti-aliasing procedures tend to blur such edges. ClearType takes advantage of the subpixel structure by using a part of an adjacent pixel to extend an existing pattern of subpixels, as shown in the line section 820 shown in FIG. 47B. However, ignoring the subpixel color results in color fringing due to a color imbalance. ClearType balances the trade-off between the color error and spatial resolution by means of a perceptual error metric. This means that a filtering technique is developed on the basis of a model of the human visual system in order to choose the brightness values of the individual sub-pixels. The resulting nine filters, one for every combination of input and sub-pixel color, minimize the perceived error when reconstructing on a TFT or LCD display. In order to achieve a real time implementation, the nine-filter method is further simplified, yielding the so-called "RGB-decimation." After prefiltering each color channel of the input image by a low-pass filter, samples are taken at the spatial locations of the same colored subpixels, i.e., sampling is performed by considering the displacement of the subpixels (displaced sampling). The principle of RGB decimation is clarified in FIG. 48, which illustrates a low-pass filter 830 comprising a one-pixel-wide box filter centered on each output subpixel. Implementing this algorithm, it is necessary to take care of the RGB-ordering of the display device, since some LCD or rather TFT displays arrange their sub-pixels in B-G-R instead of R-G-B. Furthermore we have to keep in mind, that CRT displays are not addressable on sub-pixel level. Therefore the ClearType technology only works on TFT or LCD displays. Nevertheless it also slightly improves the visual quality on a CRT display, since ClearType incorporates aspects of anti-aliasing.

The following code listing implements the ClearType technology, originally designed for enhancing font rendering, for rendering the checkerboard by sampling the whole screen. This means that the number of sampling points must be at least 3·num·ResX·ResY, where num represents the desired number of samples per subpixel. In order to generate an appropriate max-min-dist sampling pattern, we have to account for the tripled horizontal resolution by using a weighted norm, as implemented in the code listing set forth in section 2.1.2 of the Appendix. Similar as described in the last section for depth-adaptive filtering, the clear type rendering algorithm makes use of an accumulation buffer (tmpBuffer) which accumulates the weighted color values and an additional buffer (countBuffer) for accumulating the filter weights. Both buffers are initialized with tripled horizontal resolution. By means of these two buffers the checkerboard is rendered in sub-pixel resolution. Thus the red and green subpixel values of each pixel of a TFT or LCD screen are computed in the same place, where they will be displayed afterwards. This does not hold true for standard anti-aliasing, which computes the red and green subpixel values as if they were displayed on the same place as the green subpixel. In consequence this leads to blurring, as the red and blue components are shifted a third of a pixel to the right and to the left, respectively. The filter weights result from a five-sub-pixel-wide box-filter $$\left[ \frac{1}{9}, \frac{2}{9}, \frac{3}{9}, \frac{2}{9}, \frac{1}{9} \right]$$

being anchored on each output subpixel. This filter was chosen for the RGB decimation in order to reduce the energy of the side subpixels while still upholding the local color balance. After performing the RGB decimation we return to pixel resolution by assigning each pixel the color of its three subpixels. In other words the TFT display is directly addressed on sub-pixel level in this step. This is done in the last nested for-loop.

In applying the ClearType algorithm to the infinite sized checkerboard image, it has been found that the filtering technique suppresses color aliasing visible in the checkerboard image and produces smooth edges. Nearly horizontal edges were found to appear smoother than almost vertical ones, since ClearType only enlarges the horizontal resolution. However, since the signal frequency increases with increasing distance from the camera, tripling the horizontal resolution cannot make up for the aliasing artifacts near the horizon.

Figure 49:
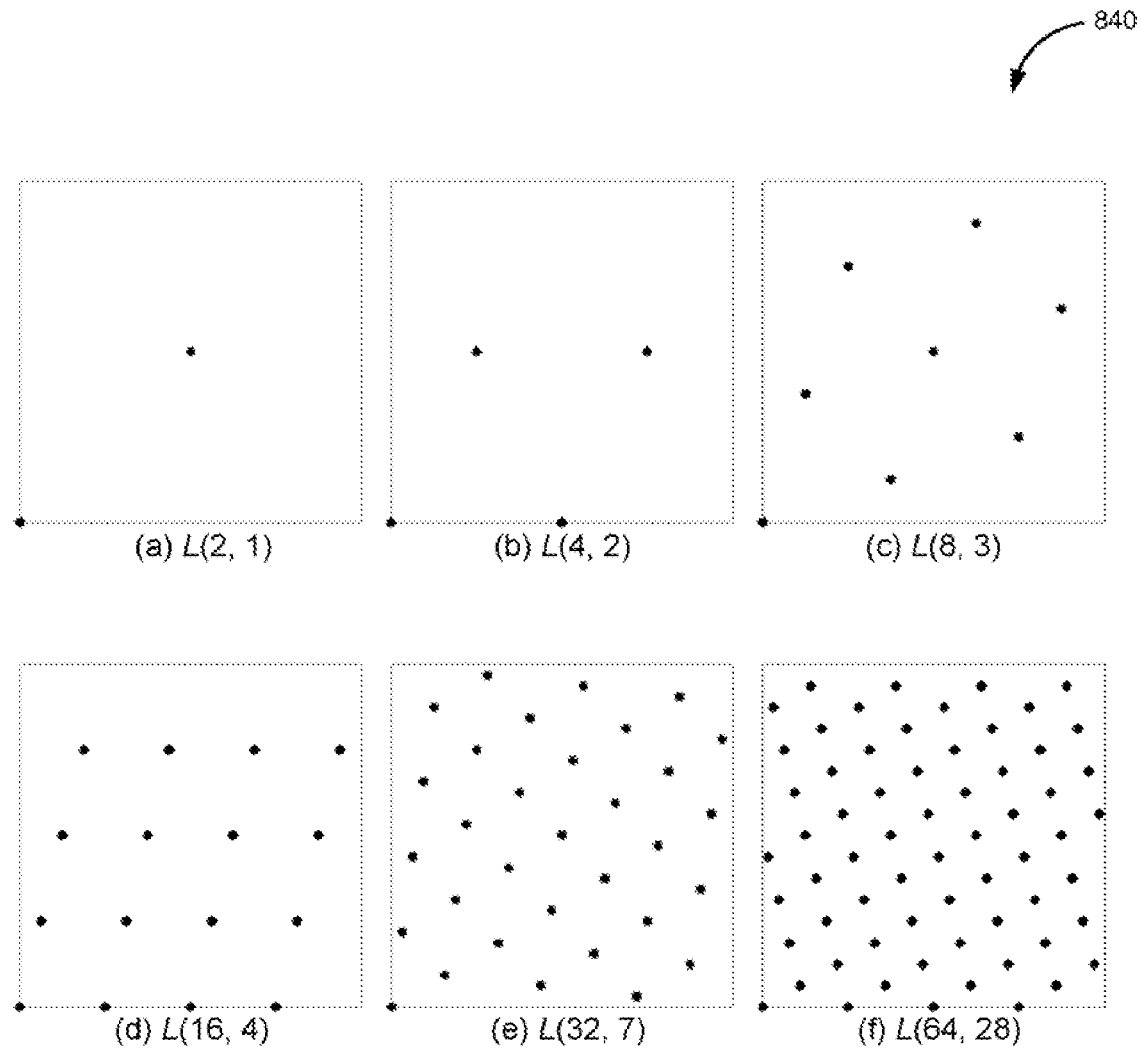
FIGS. 49-51 are a series of drawings illustrating lattices used to render an infinite checkerboard image.
Figure 50:
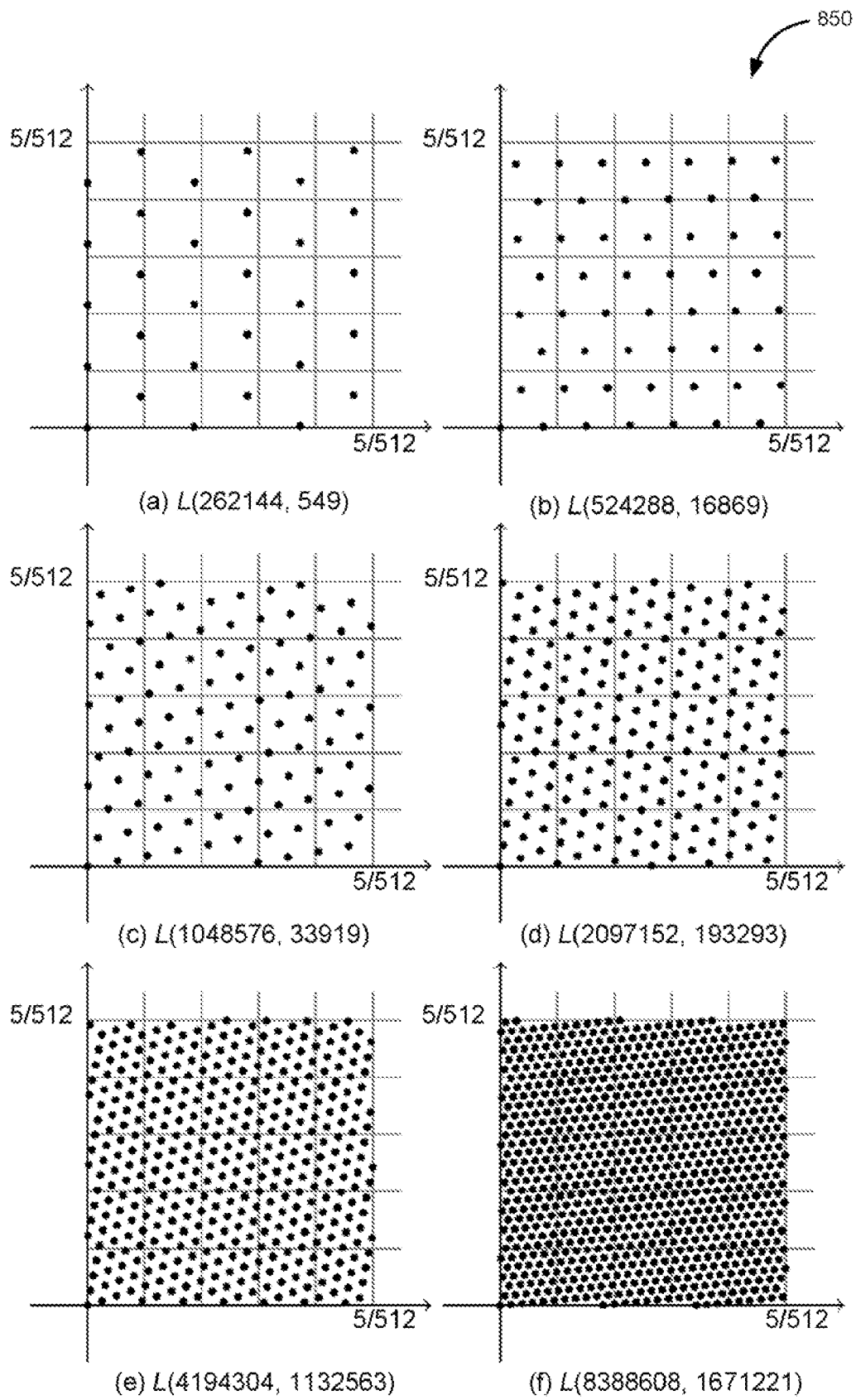
Figure 51:
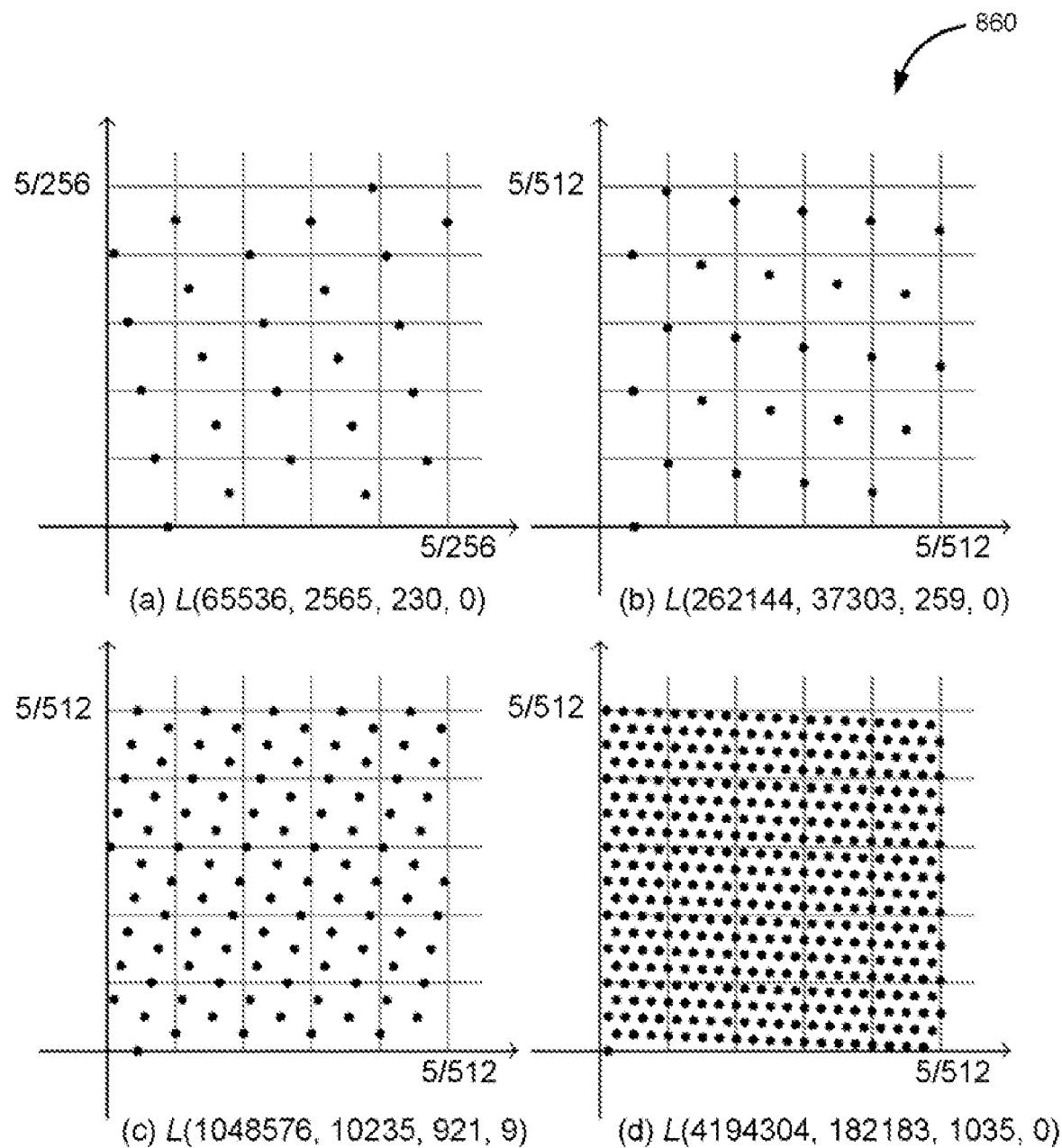

FIGS. 49-51 are a series of drawings illustrating some lattices used to render an infinite checkerboard image. FIG. 49 shows a set of lattices 840 with $L(n, a) \in [0, 1]^2$, with gcd(n, a)≠1. FIG. 50 shows a set of lattices 850, scaled to 512×512, with $n=512 \cdot 512 \cdot 2^i$, $0 \leq i \leq 7$ and gcd(n, a)=1. FIG. 51 shows a set of lattices 860 with gcd(n, a)=1, given a resolution of ResX×ResY.

6. CONCLUSION

Various aspects of the invention described herein have been described with respect to two-dimensional rank-1 lattices. However, it is not intended to limit the scope of the invention to this particular case. For example, the techniques described herein may be expanded to search for maximum minimum distance rank-1 lattices in s-dimensions, s>2. In addition, the spectral test described herein may be extended to domains other than the unit square for the purpose of searching maximum minimum distance rank-1 lattices in arbitrary domains. With respect to anti-aliasing, the described techniques may be expanded to the use of several lattices for sampling a whole display screen in order to avoid aliasing at the horizon of a particular image due to the regular structure of lattices. The adaptive refinement algorithm described herein can be extended to several levels of refinement. Also, anisotropic filtering can be included in the adaptive filtering method in order to get control of the blur induced by the B-spline filters, especially at the horizon a particular image.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A method executable in a digital processing system operable to generate synthetic images, the method comprising:
   selecting a rank-1 lattice in accordance with a maximized minimum distance function (max-min-dist lattice) corresponding to points in the synthetic image to be generated;
   calculating pixel values in accordance with the selected rank-1 lattice;
   generating a display-controlling electronic output signal based on the calculated pixel values, wherein the electronic output signal is operable to enable the display of the synthetic image on a display screen;
   searching for max-min-dist lattices on the unit square, and applying the resulting lattice points for numerical integration; and
   modifying the squared Euclidean norm associated with the unit square by a linear transformation.

2. A method, executable in a digital processing system operable to generate synthetic images, the method comprising:
   selecting a rank-1 lattice in accordance with a maximized minimum distance function (max-min-dist lattice) corresponding to points in the synthetic image to be generated;
   calculating pixel values in accordance with the selected rank-1 lattice;
   generating a display-controlling electronic output signal based on the calculated pixel values, wherein the electronic output signal is operable to enable the display of the synthetic image on a display screen; and
   utilizing lattices to sample pixels corresponding to an entire display screen, wherein the utilizing comprises determining a valid shift for a given max-min-dist lattice, valid being defined to mean that for the shifted lattice there are an equal number of lattice points per interval of display screen.

3. The method of claim 2 wherein the determining of a valid shift comprises (1) iterating over all possible shifts and counting the number of lattice points per pixel, (2) aborting and switching to a next lattice shift when one of the counts does not equal the number of lattice points in the first pixel, and (3) stopping when a valid shift is found.

4. A method, executable in a digital processing system operable to generate synthetic images, the method comprising:
   selecting a rank-1 lattice in accordance with a maximized minimum distance function (max-min-dist lattice) corresponding to points in the synthetic image to be generated;
   calculating pixel values in accordance with the selected rank-1 lattice;
   generating a display-controlling electronic output signal based on the calculated pixel values, wherein the electronic output signal is operable to enable the display of the synthetic image on a display screen;
   searching for max-min-dist lattices on the unit square, and applying the resulting lattice points for numerical integration; and
   utilizing a two-dimensional spectral test in searching max-min-dist lattices on the unit square.

5. The method of claim 4 further comprising applying a Euclidean step with respect to a spectral test in dimensions higher than two.

6. A method, executable in a digital processing system operable to generate synthetic images, the method comprising:
   selecting a rank-1 lattice in accordance with a maximized minimum distance function (max-min-dist lattice) corresponding to points in the synthetic image to be generated;
   calculating pixel values in accordance with the selected rank-1 lattice;
   generating a display-controlling electronic output signal based on the calculated pixel values, wherein the electronic output signal is operable to enable the display of the synthetic image on a display screen; and
   selecting a basis for a given lattice according to a predetermined criterion, the predetermined criterion being determined such that the basis vectors are as short as possible.

7. The method of claim 6 wherein selecting the basis comprises utilizing a basis reduction technique.

8. The method of claim 7 wherein selecting the basis comprises determining a Minkowsky reduced basis in two dimensions.

9. The method of claim 8 wherein determining a Minkowsky reduced basis in two dimensions comprises first determining a shortest non-zero lattice vector, then determining a next-shortest lattice vector that is linearly independent to the first determined, shortest non-zero lattice vector.

10. The method of claim 9 further wherein the distance of the second shortest vector is maximized.

11. The method of claim 10 further comprising determining a Korobov lattice in two dimensions by maximized minimum distance.

12. A method, executable in a computer graphics system operable to generate a synthetic image by generating a respective pixel value for each of a plurality of respective pixels in an image, the pixel value being representative of a point in a scene as recorded on an image plane of a virtual camera, the computer graphics system comprising a sampling point generator configured to generate a set of sampling points, the computer graphics system being configured to generate the pixel value for an image using a selected ray-tracing methodology in which simulated rays are shot from respective pixels on an image plane of a virtual camera, the method comprising:

selecting a rank-1 lattice in accordance with a maximized minimum distance function (max-min-dist lattice) corresponding to points in the synthetic image to be generated, calculating pixel values in accordance with the selected rank-1 lattice, and generating a display-controlling electronic output signal based on the calculated pixel values, wherein the electronic output signal is operable to enable the display of the synthetic image, wherein a selected sampling pattern in accordance with the selected rank-1 lattice has a filtering effect on the underlying function, such that high frequencies are filtered and aliasing artifacts are attenuated.

13. The method of claim 12 further wherein:

the calculating of pixel values in accordance with the selected rank-1 lattice includes the use of sampling points, the generating of a display-controlling electronic output signal includes the use of a reconstruction filter, and further comprising:

for each sampling point, selecting a reconstruction filter depending on the length of the ray through the virtual camera to the point at which the ray strikes a surface in the scene, to enable anisotropic, depth-adaptive filtering, and utilizing a B-spline reconstruction filter.

14. The method of claim 13 further wherein utilizing a B-spline reconstruction filter comprises interpolation between successive B-spline filters to provide smooth transitions between filter kernels.

15. The method of claim 14 further wherein:

the generating of a display-controlling electronic output signal is adapted to control the display of an image on a display device comprising multiple sub-pixels of different colors, so as to enable a tripled horizontal display resolution, and the calculating of pixel values in accordance with the selected rank-1 lattice comprises applying a sub-pixel-based filtering technique to select brightness values of individual sub-pixels, the filtering technique comprising utilizing a weighted norm to account for the tripled horizontal resolution of the display device, the filtering technique further comprising:

using an accumulation buffer to accumulate weighted color values and a count buffer for accumulating the filter weights, and wherein both buffers are initialized with the tripled horizontal resolution.

16. A method, executable in a digital processing system operable to generate synthetic images, the method comprising:

selecting a rank-1 lattice in accordance with a maximized minimum distance function (max-min-dist lattice) corresponding to points in the synthetic image to be generated, calculating pixel values in accordance with the selected rank-1 lattice, structuring a pixel layout for a synthetic image to be generated, in accordance with a rasterization scheme defined by the selected rank-1 lattice, wherein the number of lattice points is selected to be a power of two, and generating a display-controlling electronic output signal based on the calculated pixel values, wherein the electronic output signal is operable to enable the display of the synthetic image.

17. A display-controlling signal generating method executable in a digital processing system operable to generate synthetic images, the method comprising:

selecting a rank-1 lattice in accordance with a maximized minimum distance function (max-min-dist lattice) corresponding to points in the synthetic image to be generated, calculating pixel values in accordance with the selected rank-1 lattice, structuring a pixel layout for a synthetic image to be generated, in accordance with a rasterization scheme defined by the selected rank-1 lattice, wherein the number of lattice points is selected to be a power of two, and generating a display-controlling electronic output signal based on the calculated pixel values, wherein the electronic output signal is operable to enable the display of the synthetic image.

18. A computer program product operable in a digital processing system comprising a computer processor adapted to enable the generation of synthetic images, the computer program product comprising a computer-readable medium having encoded thereon instructions executable by the computer processor to enable the computer processor to generate display-controlling signals, the computer program product comprising:

first computer program instructions encoded on the computer-readable medium and executable by the computer processor to enable the computer processor to select a rank-1 lattice in accordance with a maximized minimum distance function (max-min-dist lattice) corresponding to points in the synthetic image to be generated, second computer program instructions encoded on the computer-readable medium and executable by the computer processor to enable the computer processor to calculate pixel values in accordance with the selected rank-1 lattice, third computer program instructions encoded on the computer-readable medium and executable by the computer processor to enable the computer processor to structure a pixel layout for a synthetic image to be generated, in accordance with a rasterization scheme defined by the selected rank-1 lattice, wherein the number of lattice points is selected to be a power of two, and fourth computer program instructions encoded on the computer-readable medium and executable by the computer processor to enable the computer processor to generate a display-controlling electronic output signal based on the calculated pixel values, wherein the electronic output signal is operable to enable the display of the synthetic image.

* * * * *